US011254082B2

(12) United States Patent
Nakamura et al.

(10) Patent No.: US 11,254,082 B2
(45) Date of Patent: Feb. 22, 2022

(54) MULTI-LAYER TUBE

(71) Applicant: UBE INDUSTRIES, LTD., Ube (JP)

(72) Inventors: Koji Nakamura, Ube (JP); Shigekazu Okamura, Ube (JP); Hiroaki Fujii, Ube (JP)

(73) Assignee: UBE INDUSTRIES, LTD., Ube (JP)

( * ) Notice: Subject to any disclaimer, the term of this patent is extended or adjusted under 35 U.S.C. 154(b) by 269 days.

(21) Appl. No.: 14/916,461

(22) PCT Filed: Sep. 3, 2014

(86) PCT No.: PCT/JP2014/073258
§ 371 (c)(1),
(2) Date: Mar. 3, 2016

(87) PCT Pub. No.: WO2015/033982
PCT Pub. Date: Mar. 12, 2015

(65) Prior Publication Data
US 2016/0214343 A1   Jul. 28, 2016

(30) Foreign Application Priority Data
Sep. 4, 2013 (JP) .............................. JP2013-182719

(51) Int. Cl.
| | |
|---|---|
| *B32B 1/08* | (2006.01) |
| *B32B 27/34* | (2006.01) |
| *F16L 9/12* | (2006.01) |
| *B32B 27/08* | (2006.01) |
| *F16L 9/133* | (2006.01) |
| *C08L 77/00* | (2006.01) |
| *C08L 101/06* | (2006.01) |
| *C08L 77/06* | (2006.01) |
| *C08L 77/02* | (2006.01) |
| *B32B 27/32* | (2006.01) |

(52) U.S. Cl.
CPC .............. *B32B 1/08* (2013.01); *B32B 27/08* (2013.01); *B32B 27/322* (2013.01); *B32B 27/34* (2013.01); *C08L 77/00* (2013.01); *C08L 77/02* (2013.01); *C08L 77/06* (2013.01); *C08L 101/06* (2013.01); *F16L 9/12* (2013.01); *F16L 9/133* (2013.01); *B32B 2250/24* (2013.01); *B32B 2307/202* (2013.01); *B32B 2307/558* (2013.01); *B32B 2307/7265* (2013.01); *B32B 2597/00* (2013.01); *B32B 2605/08* (2013.01)

(58) Field of Classification Search
CPC ........ B32B 1/08; B32B 27/322; B32B 27/08; B32B 27/34; B32B 2605/08; B32B 2597/00; B32B 2307/202; B32B 2307/558; B32B 2250/24; F16L 9/133; F16L 9/12; C08L 77/02; C08L 77/06; C08L 77/00; C08L 101/06; C08G 69/26; C09J 177/00; C09J 177/08

USPC .................... 428/36.91, 36.9, 34.1
See application file for complete search history.

(56) References Cited

U.S. PATENT DOCUMENTS

| | | | |
|---|---|---|---|
| 3,444,026 A * | 5/1969 | Peerman ................ | C08G 69/34 156/331.8 |
| 5,554,425 A | 9/1996 | Krause et al. | |
| 5,804,670 A * | 9/1998 | Stoeppelmann ........ | B32B 27/08 525/420 |
| 7,089,952 B2 * | 8/2006 | Nakamura .............. | B32B 27/34 137/15.01 |
| 8,778,472 B2 | 7/2014 | Kawai et al. | |
| 2004/0126523 A1 | 7/2004 | Masuda et al. | |
| 2004/0191440 A1 * | 9/2004 | Funaki ...................... | B32B 1/08 428/34.6 |
| 2007/0104907 A1 | 5/2007 | Nishioka et al. | |
| 2007/0148389 A1 * | 6/2007 | Nishioka .................. | B32B 1/08 428/36.91 |
| 2007/0172670 A1 * | 7/2007 | Mutsuda ............. | B29C 45/0001 428/423.5 |

(Continued)

FOREIGN PATENT DOCUMENTS

| | | | | |
|---|---|---|---|---|
| CN | 102365488 A | 2/2012 | | |
| EP | 1 741 549 A1 | 1/2007 | | |
| EP | 1 741 553 A1 | 1/2007 | | |
| JP | 2004-203012 A | 7/2004 | | |
| JP | 1741553 A1 * | 1/2007 | .............. | B32B 1/08 |
| JP | 2007-216387 A | 8/2007 | | |
| JP | 2011-201081 A | 10/2011 | | |
| JP | 2011-214592 A | 10/2011 | | |
| JP | 2012-20571 A | 2/2012 | | |

(Continued)

OTHER PUBLICATIONS

Chinese Office Action and Search Report, dated Dec. 6, 2016, for Chinese Application No. 201480048946.3, along with a Partial English translation.

(Continued)

*Primary Examiner* — Eli D. Strah
(74) *Attorney, Agent, or Firm* — Birch, Stewart, Kolasch & Birch, LLP

(57) ABSTRACT

The present invention is a multi-layer tube comprising at least two layers having an (a) layer containing an aliphatic polyamide composition (A) and a (b) layer containing a semi-aromatic polyamide composition (B) containing a specific semi-aromatic polyamide (B1), wherein the aliphatic polyamide composition (A) contains a specific amount of an aliphatic polyamide (A1) and a specific amount of an elastomer polymer (A2) containing an unsaturated compound having a carboxyl group and/or acid anhydride group, and the product of the terminal amino group concentration [X] of the aliphatic polyamide (A1) per g of the aliphatic polyamide composition (A) and the total concentration [Y] of the carboxyl group and acid anhydride group of the elastomer polymer (A2) per g of the aliphatic polyamide composition (A) is a specific amount.

16 Claims, No Drawings

(56) References Cited

U.S. PATENT DOCUMENTS

| | | | |
|---|---|---|---|
| 2008/0038499 A1* | 2/2008 | Ono | C08G 69/265 |
| | | | 428/36.9 |
| 2012/0003416 A1 | 1/2012 | Mizutani et al. | |
| 2012/0012222 A1 | 1/2012 | Mizutani et al. | |
| 2012/0021157 A1 | 1/2012 | Kawai et al. | |
| 2013/0295308 A1* | 11/2013 | Kumazawa | C08L 77/06 |
| | | | 428/36.9 |

FOREIGN PATENT DOCUMENTS

| | | |
|---|---|---|
| WO | WO 2005/058600 A1 | 6/2005 |
| WO | WO 2005/071301 A1 | 8/2005 |
| WO | WO 2005/102681 A1 | 11/2005 |
| WO | WO 2005/102694 A1 | 11/2005 |

OTHER PUBLICATIONS

Extended European Search Report dated Apr. 18, 2017, for European Application No. 14842597.8.
International Search Report, issued in PCT/JP2014/073258, dated Dec. 9, 2014.

* cited by examiner

MULTI-LAYER TUBE

TECHNICAL FIELD

The present invention relates to a multi-layer tube.

BACKGROUND ART

Tubes used for automobile lines have conventionally had the problem of becoming rusted by road deicers, and in response to demands for preventing global warming and conservation of energy, the metal conventionally used for the primary material thereof is being replaced with lightweight plastic having superior rust resistance. Although examples of resins normally used for line tubes include polyamide-based resins, saturated polyester-based resins, polyolefin-based resins and thermoplastic polyurethane-based resins, in the case of single-layer tubes using these resins, the application range thereof is limited due to inadequate heat resistance, chemical resistance and the like.

In addition, the tubes used for automobile lines are used to transfer low boiling point alcohols such as methanol or ethanol, or oxygen-containing gasoline blended with ethers such as ethyl-t-butyl ether, from the viewpoints of reducing gasoline consumption and increasing performance. Moreover, stricter emissions regulations are being implemented that include the prevention of escape of volatile hydrocarbons and the like into the atmosphere as a result of diffusing through the walls of tubes used for automobile lines from the viewpoint of preventing environmental pollution. With respect to these stricter regulations, single-layer tubes using conventional polyamide-based resins such as Polyamide 11 or Polyamide 12 in particular, which have superior strength, toughness, chemical resistance and flexibility, are inadequate with respect to preventing permeation of the aforementioned chemicals, and improvements are required particularly with respect to preventing permeation of alcohol-containing gasoline.

Multi-layer tubes have been proposed as a method for solving this problem that incorporate a resin that is favorable for preventing chemical permeation, examples of which include saponified ethylene-vinyl acetate copolymer (EVOH), poly(meta-xylylene adipamide) (Polyamide MXD6), polybutylene terephthalate (PBT), polyethylene naphthalate (PEN), polybutylene naphthalate (PBN), polyphenylene sulfide (PPS), polyvinylidene fluoride (PVDF), ethylene-tetrafluoroethylene copolymer (ETFE), ethylene-chlorotrifluoroethylene copolymer (ECTFE), tetrafluoroethylene-hexafluoropropylene copolymer (TFE/HFP, FEP), tetrafluoroethylene-hexafluoropropylene-polyvinylidene fluoride copolymer (TFE/HFP/VDF, THV), tetrafluoroethylene-hexafluoropropylene-polyvinylidene fluoride-perfluoro(alkyl vinyl ether) copolymer (TFE/HFP/VDF/PAVE), tetrafluoroethylene-perfluoro(alkyl vinyl ether) copolymer (TFE/PAVE, PFA), tetrafluoroethylene-hexafluoropropylene-perfluoro(alkyl vinyl ether) copolymer (TFE/HFP/PAVE) and chlorotrifluoroethylene-perfluoro(alkyl vinyl ether)-tetrafluoroethylene copolymer (CTFE/PAVE/TFE, CPT) (see, for example, Patent Document 1).

Poly(nonamethylene terephthalamide) (PA9T) in particular is attracting attention as a tube constituent member that demonstrates superior prevention of chemical permeation, has low specific gravity and is inexpensive. The inventors of the present invention proposed a multi-layer tube structure comprising at least two layers having a layer composed of an aliphatic polyamide and a layer composed of a semi-aromatic polyamide comprising a diamine unit, containing 60 mol % or more of a 1,9-nonanediamine unit and/or 2-methyl-1,8-octanediamine unit based on all diamine units, and a dicarboxylic acid unit, containing 60% or more of a terephthalic acid unit and/or naphthalenedicarboxylic acid unit based on all dicarboxylic acid units (see Patent Documents 2 to 5).

A multi-layer tube has also been proposed for improving interlayer adhesion between a layer composed of an aliphatic polyamide and a layer composed of poly(nonamethylene terephthalamide) (PA9T) that has a layer composed of an aliphatic polyamide such as Polyamide 12 and a layer composed of a semi-aromatic polyamide composition containing a specific organic acid salt (organic acid salt having 10 to 24 carbon atoms) in a semi-aromatic polyamide such as poly(nonamethylene terephthalamide) (PA9T) demonstrating superior prevention of chemical permeation (see Patent Document 6).

BACKGROUND ART DOCUMENTS

Patent Documents

Patent Document 1: U.S. Pat. No. 5,554,425
Patent Document 2: Japanese Unexamined Patent Publication No. 2004-203012
Patent Document 3: International Publication No. WO 2005-58600
Patent Document 4: International Publication No. WO 2005-102681
Patent Document 5: International Publication No. WO 2005-102694
Patent Document 6: Japanese Unexamined Patent Publication No. 2011-214592

DISCLOSURE OF THE INVENTION

Problems to be Solved by the Invention

The multi-layer tubes described in the aforementioned Patent Documents 2 to 5 have adequate initial interlayer adhesion without requiring the providing of an adhesive layer between the layer composed of an aliphatic polyamide and the layer composed of poly(nonamethylene terephthalamide) (PA9T). However, there is still room for improvement regarding the durability of interlayer adhesion after having been in contact or immersed in fuel for a long period of time or after heat treatment and the like, hi addition, it is also desired to further improve the durability of interlayer adhesion in the same manner as the aforementioned technology with respect to the multi-layer tube described in Patent Document 6.

An object of the present invention is to solve the aforementioned problems by providing a multi-layer tube that demonstrates superior prevention of chemical permeation, low-temperature impact resistance, interlayer adhesion and interlayer adhesion durability.

Means for Solving the Problems

As a result of conducting extensive studies to solve the aforementioned problems, the inventors of the present invention found that a multi-layer tube that demonstrates various superior properties such as superior prevention of chemical permeation, low-temperature impact resistance, interlayer adhesion and interlayer adhesion durability can be obtained with a multi-layer tube having a layer comprising a specific aliphatic polyamide composition and a layer comprising a semi-aromatic polyamide composition containing a semi-aromatic polyamide having a specific structure, wherein the aliphatic polyamide composition comprises an aliphatic polyamide (such as Polyamide 11 or Polyamide 12) and an elastomer polymer containing an unsaturated compound having a carboxyl group and/or acid anhydride group, and the product of the concentration of the terminal amino group of the aliphatic polyamide and the total concentration of the carboxyl groups and acid anhydride group of the elastomer polymer is within a specific range.

Namely, the present invention provides the inventions indicated below.

(1) A multi-layer tube comprising at least two layers having an (a) layer containing an aliphatic polyamide composition (A) and a (b) layer containing a semi-aromatic polyamide composition (B); wherein, the aliphatic polyamide composition (A) contains 70% by weight to 95% by weight of an aliphatic polyamide (A1) and 5% by weight to 30% by weight of an elastomer polymer (A2) containing an unsaturated compound having a carboxyl group and/or acid anhydride group, the aliphatic polyamide composition (A) is such that $[X] \times [Y]$ is 200 $(\mu eq/g)^2$ to 1,300 $(\mu eq/g)^2$ when the concentration of the terminal amino group of the aliphatic polyamide (A1) per g of the aliphatic polyamide composition (A) is defined as $[X]$ ($\mu eq/g$), and the total concentration of the carboxyl group and acid anhydride group of the elastomer polymer (A2) per g of the aliphatic polyamide composition (A) is defined as $[Y]$ ($\mu eq/g$), and the semi-aromatic polyamide composition (B) contains a semi-aromatic polyamide (B1), and the semi-aromatic polyamide (B1) comprises a diamine unit containing 60 mol % or more of a 1,9-nonanediamine unit and/or 2-methyl-1,8-octanediamine unit based on all diamine units, and a dicarboxylic acid unit containing 60 mol % or more of a terephthalic acid unit and/or naphthalenedicarboxylic acid unit based on all dicarboxylic acid units.

(2) The multi-layer tube described in (1) above, wherein the aliphatic polyamide (A1) is such that $[A1] > [B1] + 10$ when the concentration of the terminal amino group of the aliphatic polyamide (A1) per g of the aliphatic polyamide (A1) is defined as $[A1]$ ($\mu eq/g$) and the concentration of the terminal carboxyl group per g of the aliphatic polyamide (A1) is defined as $[B1]$ ($\mu eq/g$).

(3) The multi-layer tube described in (1) or (2) above, wherein the aliphatic polyamide (A1) is at least one type of homopolymer selected from the group consisting of polycaproamide (Polyamide 6), polyundecaneamide (Polyamide 11), polydodecaneamide (Polyamide 12), polyhexamethylene adipamide (Polyamide 66), polyhexamethylene decamide (Polyamide 610), polyhexamethylene dodecamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212), and/or copolymers using a plurality of types of raw materials that form these.

(4) The multi-layer tube described in any of (1) to (3) above, wherein the aliphatic polyamide (A1) is an aliphatic polyamide mixture composed of at least two types of aliphatic polyamides having different terminal group concentrations, the aliphatic polyamide mixture is such that $[A1] > [B1] + 10$ when the concentration of the terminal amino group of the aliphatic polyamide mixture per g of the aliphatic polyamide mixture is defined as $[A1]$ ($\mu eq/g$) and the concentration of the terminal carboxyl group of the aliphatic polyamide mixture per g of the aliphatic polyamide mixture is defined as $[B1]$ ($\mu eq/g$), an aliphatic polyamide (A11), which is one component of the aliphatic polyamide mixture, is at least one type of homopolymer selected from the group consisting of polyundecaneamide (Polyamide 11), polydodecaneamide (Polyamide 12), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212), and/or copolymers using a plurality of types of raw materials that form these, and an aliphatic polyamide (A12), which is the remaining component of the aliphatic polyamide mixture, is such that $[A12] > [B12] + 40$ when the concentration of the terminal amino group of the aliphatic polyamide (A12) per g of the aliphatic polyamide (A12) is defined as $[A12]$ ($\mu eq/g$) and the concentration of the terminal carboxyl group of the aliphatic polyamide (A12) per g of the aliphatic polyamide (A12) is defined as $[B12]$ ($\mu eq/g$), and the aliphatic polyamide (A12) is at least one type of homopolymer selected from the group consisting of polycaproamide (Polyamide 6), polyundecaneamide (Polyamide 11), polydodecaneamide (Polyamide 12), polyhexamethylene adipamide (Polyamide 66), polyhexamethylene decamide (Polyamide 610), polyhexamethylene dodecamide (Polyamide 612), polydecamethylene decamide (Polyamide 1010), polydecamethylene dodecamide (Polyamide 1012) and polydodecamethylene dodecamide (Polyamide 1212), and/or copolymers using a plurality of types of raw materials that form these.

(5) The multi-layer tube described in any of (1) to (4) above, wherein the semi-aromatic polyamide composition (B) contains an elastomer polymer containing an unsaturated compound having a carboxyl group and/or acid anhydride group.

(6) The multi-layer tube described in any of (1) to (5) above, wherein the semi-aromatic polyamide composition (B) is an electrically conductive semi-aromatic polyamide composition (B) imparted with electrical conductivity.

(7) The multi-layer tube described in any of (1) to (6) above, wherein the multi-layer tube has a (c) layer containing a fluorine-containing polymer (C) in which a functional group having reactivity with an amino group is introduced into the molecular chain.

(8) The multi-layer tube described in (7) above, wherein the fluorine-containing polymer (C) is an electrically conductive fluorine-containing polymer (C) imparted with electrical conductivity.

(9) The multi-layer tube described in any of (1) to (8) above, wherein the (a) layer containing the aliphatic polyamide composition (A) is arranged as the outermost layer, and the (b) layer containing the semi-aromatic polyamide composition (B) is arranged to the inside of the (a) layer.

(10) The multi-layer tube described in any of (1) to (9) above, wherein the (b) layer containing the semi-aromatic polyamide composition (B) is arranged as the innermost layer.

(11) The multi-layer tube described in (9) or (10) above, further having a (c) layer containing a fluorine-containing polymer (C) in which a functional group having reactivity with an amino group is introduced into the molecular chain, and the (c) layer is arranged to the inside of the (b) layer.

(12) The multi-layer tube described in any of (1) to (11) above, wherein an electrically conductive layer comprising a thermoplastic resin composition containing an electrically conductive filler is arranged as the innermost layer of the multi-layer tube.

(13) The multi-layer tube described in any of (1) to (12) above, which is produced by co-extrusion molding.

(14) The multi-layer tube described in any of (1) to (13) above, which is used as a fuel tube.

Effects of the Invention

The multi-layer tube of the present invention demonstrates superior prevention of chemical permeation, low-temperature impact resistance, interlayer adhesion and interlayer adhesion durability by having a layer comprising an aliphatic polyamide composition comprising an aliphatic polyamide and an elastomer polymer containing an unsaturated compound having a carboxyl group and/or acid anhydride group, in which the product of the concentration of the terminal amino group of the aliphatic polyamide and the total concentration of the carboxyl group and/or acid anhydride group of the elastomer polymer is within a prescribed range, and a layer comprising a semi-aromatic polyamide composition containing a semi-aromatic polyamide having a specific structure. Since the multi-layer tube inhibits alcohol-blended hydrocarbons that evaporate by permeating through the tube walls in particular, it is capable of accommodating strict environmental regulations, thereby making it preferable as a fuel tube. Moreover, the durability of interlayer adhesion is improved after having been in contact or immersed in fuel for a long period of time or after heat treatment and the like. Accordingly, the multi-layer tube of the present invention can be used in all types of environments, demonstrates high reliability and has high utility value.

BEST MODE FOR CARRYING OUT THE INVENTION

The multi-layer tube of the present invention is a multi-layer tube that comprises at least two layers having an (a) layer containing an aliphatic polyamide composition (A) and a (b) layer containing a semi-aromatic polyamide composition (B), wherein the aliphatic polyamide composition (A) contains 70% by weight to 95% by weight of an aliphatic polyamide (A1) and 5% by weight to 30% by weight of an elastomer polymer (A2) containing an unsaturated compound having a carboxyl group and/or acid anhydride group, the aliphatic polyamide composition (A) is such that $[X] \times [Y]$ is 200 $(\mu eq/g)^2$ to 1,300 $(\mu eq/g)^2$ when the concentration of the terminal amino group of the aliphatic polyamide (A1) per g of the aliphatic polyamide composition (A) is defined as $[X]$ $(\mu eq/g)$ and the total concentration of the carboxyl group and acid anhydride group of the elastomer polymer (A2) per g of the aliphatic polyamide composition (A) is defined as $[Y]$ $(\mu eq/g)$, the semi-aromatic polyamide composition (B) contains a semi-aromatic polyamide (B1), and the semi-aromatic polyamide (B1) is composed of a diamine unit containing 60 mol % or more of a 1,9-nonanediamine unit and/or 2-methyl-1,8-octanediamine unit based on all diamine units, and a dicarboxylic acid unit containing 60 mol % or more of a terephthalic acid unit and/or naphthalenedicarboxylic acid unit based on all dicarboxylic acid units.

1. (a) Layer

The (a) layer of the multi-layer tube of the present invention contains an aliphatic polyamide composition (A).

[Aliphatic Polyamide Composition (A)]

The aliphatic polyamide composition (A) used in the present invention contains 70% by weight to 95% by weight of an aliphatic polyamide (A1) and 5% by weight to 30% by weight of an elastomer polymer (A2) containing an unsaturated compound having a carboxyl group and/or acid anhydride group (to also be referred to as aliphatic polyamide composition (A)).

Moreover, the aliphatic polyamide composition (A) is such that $[X] \times [Y]$ is 200 $(\mu eq/g)^2$ to 1,300 $(\mu eq/g)^2$ when the concentration of the amino group of the aliphatic polyamide (A1) per g of the aliphatic polyamide composition (A) is defined as $[X]$ $(\mu eq/g)$ and the total concentration of the carboxyl group and acid anhydride group of the elastomer polymer per g of the aliphatic polyamide composition (A) is defined as $[Y]$ $(\mu eq/g)$.

The aliphatic polyamide (A1) has a amide bond (—CONH—) in its main chain, and is obtained by polymerization or copolymerization using a known method such as melt polymerization, solution polymerization or solid phase polymerization by using as raw materials an aliphatic polyamide structural unit in the form of a lactam, aminocarboxylic acid, or aliphatic diamine and aliphatic dicarboxylic acid (to also be referred to as aliphatic polyamide (A1)).

Examples of lactams include caprolactam, enantholactam, undecanelactam, dodecanelactam, α-pyrrolidone and α-piperidone, while examples of aminocarboxylic acids include 6-aminocaproic acid, 7-aminoheptanoic acid, 9-aminononanoic acid, 11-aminoundecanoic acid and 12-aminododecanoic acid. One type or two or more types of these compounds can be used.

Examples of aliphatic diamines include 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine and 5-methyl-1,9-nonanediamine. One type or two or more types of these compounds can be used.

Examples of aliphatic dicarboxylic acids include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioc acid. One type or two or more types of these compounds can be used.

Examples of the aliphatic polyamide (A1) include homopolymers such as polycaproamide (Polyamide 6), polyundecaneamide (Polyamide 11), polydodecaneamide (Polyamide 12), polyethylene adipamide (Polyamide 26), polytetramethylene succinamide (Polyamide 44), polytetramethylene glutamide (Polyamide 45), polytetramethylene adipamide (Polyamide 46), polytetramethylene suberamide (Polyamide 48), polytetramethylene azelamide (Polyamide 49), polytetramethylene sebacamide (Polyamide 410), polytetramethylene dodecamide (Polyamide 412), polypentamethylene succinamide (Polyamide 54), polypentamethylene glutamide (Polyamide 55), polypentamethylene adipamide (Polyamide 56), polypentamethylene suberamide (Polyamide 58), polypentamethylene azelamide (Polyamide 59), polypentamethylene sebacamide (Polyamide 510), polypentamethylene dodecamide (Polyamide 512), polyhexamethylene succinamide (Polyamide 64), polyhexamethylene glutamide (Polyamide 65), polyhexamethylene adipamide (Polyamide 66), polyhexamethylene suberamide (Polyamide 68), polyhexamethylene azelamide (Polyamide 69), polyhexamethylene sebacamide (Polyamide 610), polyhexamethylene dodecamide (Polyamide 612), polyhexamethylene tetradecamide (Polyamide 614), polyhexamethylene hexadecamide (Polyamide 616), polyhexamethylene octadecamide (Polyamide 618), polynonamethylene adipamide (Polyamide 96), polynonamethylene suberamide (Polyamide 98), polynonamethylene azelamide (Polyamide 99), polynonamethylene sebacamide (Polyamide 910), polynonamethylene dodecamide (Polyamide 912), polydecamethylene adipamide (Polyamide 106), polydecamethylene suberamide (Polyamide 108), polydecamethylene azelamide (Polyamide 109), polydecamethylene sebacamide (Polyamide 1010), polydecamethylene dodecamide (Polyamide 1012), polydodecamethylene adipamide Polyamide 126), polydodecamethylene suberamide (Polyamide 128), polydodecamethylene azelamide (Polyamide 129), polydodecamethylene (Polyamide 1210) and polydodecamethylene dodecamide (Polyamide 1212), and copolymers using a plurality of types of raw materials that form these.

Among these, polycaproamide (Polyamide 6), polyundecaneamide (Polyamide 11), polydodecaneamide (Polyamide 12), polyhexamethylene adipamide (Polyamide 66), polyhexamethylene azelamide (Polyamide 69), polyhexamethylene sebacamide (Polyamide 610), polyhexamethylene dodecamide (Polyamide 612), polynonamethylene sebacamide (Polyamide 910), polynonamethylene dodecamide (Polyamide 912), polydecamethylene sebacamide (Polyamide 1010), polydecamethylene dodecamide (Polyamide 1012), polydodecamethylene dodecamide (Polyamide 1212) and copolymers using a plurality of types of raw materials that form these are preferable from the viewpoints of adequately ensuring various properties such as mechanical properties or heat resistance of the resulting multi-layer tube, economy and availability. At least one type of homopolymer selected from the group consisting of polycaproamide (Polyamide 6), polyundecaneamide (Polyamide 11), polydodecaneamide (Polyamide 12), polyhexamethylene adipamide (Polyamide 66), polyhexamethylene sebacamide (Polyamide 610), polyhexamethylene dodecamide (Polyamide 612), polynonamethylene sebacamide (Polyamide 910), polynonamethylene dodecamide (Polyamide 912), polydecamethylene sebacamide (Polyamide 1010), polydecamethylene dodecamide (Polyamide 1012) and polydodecamethylene dodecamide (Polyamide 1212), and/or copolymers using a plurality of types of raw materials that form these are more preferable.

Examples of devices used to produce the aliphatic polyamide (A1) include known polyamide production devices such as batch-type reactors, single-tank and/or multi-tank continuous reactors, tubular continuous reactors and kneading reaction extruders such as single-screw kneading extruders or twin-screw kneading extruders. A known polymerization method can be used such as melt polymerization, solution polymerization or solid phase polymerization, and polymerization can be carried out by repeating normal pressure, reduced pressure and increased pressure operations. These polymerization methods can be used alone or suitably used in combination.

The relative viscosity of the aliphatic polyamide (A1) as measured basically in compliance with JIS K-6920 under conditions of 96% sulfuric acid, a polymer concentration of 1% and 25° C. is preferably 1.5 to 5.0 and more preferably 2.0 to 4.5 from the viewpoints of ensuring mechanical properties of the resulting multi-layer tube and ensuring preferable moldability of the multi-layer tube over the proper range of viscosity when melted.

The aliphatic polyamide (A1) preferably satisfies the relationship $[A1]>[B1]+10$, more preferably satisfies the relationship $[A1]>[B1]+20$, and even more preferably satisfies the relationship $[A1]>[B1]+25$, from the viewpoints of interlayer adhesion with the semi-aromatic polyamide composition (B) to be subsequently described and the interlayer adhesion durability, when the concentration of the terminal amino group per g of the aliphatic polyamide (A1) is defined as $[A1]$ (μeq/g) and the concentration of the terminal carboxyl group per g of the aliphatic polyamide (A1) is defined as $[B1]$ (μeq/g). Moreover, it is preferable that $[A1]>30$, and more preferable that $30<[A1]<140$, from the viewpoints of melt stability of the polyamide and inhibition of the formation of gelatinous materials.

Furthermore, the concentration of the terminal amino group $[A1]$ (μeq/g) can be measured by dissolving the polyamide in a mixed solution of phenol and methanol and titrating with 0.05 N hydrochloric acid. The concentration of the terminal carboxyl group $[B1]$ (μeq/g) can be measured by dissolving the polyamide in benzyl alcohol and titrating with a 0.05 N sodium hydroxide solution.

The aliphatic polyamide (A1) is produced by polymerizing or copolymerizing the aforementioned polyamide raw materials in the presence of an amine using a known method such as melt polymerization, solution polymerization or solid phase polymerization. Alternatively, the aliphatic polyamide (A1) is produced by melt-kneading in the presence of an amine following polymerization. In this manner, although an amine can be added at an arbitrary stage during polymerization or at an arbitrary stage during melt-kneading following polymerization, when considering the interlayer adhesion of the multi-layer tube, the amine is preferably added at an arbitrary stage during polymerization.

Examples of the aforementioned amines include monoamines, diamines, triamines and polyamines. In addition, carboxylic acids such as monocarboxylic acids, dicarboxylic acids or tricarboxylic acids may also be added as necessary in addition to amines provided they do not result in deviation from the ranges of the terminal group concentration conditions described above. These amines and carboxylic acids may be added simultaneously or separately. In addition, one type of two or more types of the amino acids and carboxylic acids exemplified below can be used.

Specific examples of monoamines added include aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine or docosylamine, alicyclic monoamines such as cyclohexylamine or methylcyclohexylamine, aromatic monoamines such as benzylamino or β-phenylmethylamine, symmetrical secondary amines such as N,N-dimethylamine, N,N-diethylamine, N,N-dipropylamine, N,N-dibutylamine, N,N-dihexylamine or N,N-dioctylamine, and mixed secondary amines such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine or N-propyl-N-benzylamine. One type or two or more types of these compounds can be used.

Specific examples of diamines added include aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine or 5-methyl-1,9-nonanediamine, alicyclic diamines such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane or 4,9-bis(aminomethyl)tricyclodecane, and aromatic diamines such as m-xylylenediamine or p-xylylenediamine. One type or two or more types of these compounds can be used.

Specific examples of triamines added include 1,2,3-triaminopropane, 1,2,3-triamino-2-methylpropane, 1,2,4-triaminobutane, 1,2,3,4-tetraminobutane, 1,3,5-tetraminocyclohexane, 1,2,4-triaminocyclohexane, 1,2,3-triaminocyclohexane, 1,2,4,5-tetraminocyclohexane, 1,3,5-triaminobenzene, 1,2,4-triaminobenzene, 1,2,3-triaminobenzene, 1,2,4,5-tetraminobenzene, 1,2,4-triaminonaphthalene, 2,5,7-triaminonaphthalene, 2,4,6-triaminopyridine, 1,2,7,8-tetraminonaphthalene and 1,4,5,8-tetraminonaphthalene. One type or two or more types of these compounds can be used.

The polyamines added are only required to be compounds that have a plurality of primary amino groups (—NH$_2$) and/or secondary amino groups (—NH—), and examples thereof include polyalkyleneimines, polyalkylene polyamines, polyvinylamines and polyallylamines. Amino groups provided with an active hydrogen serve as the reactive sites of polyamines.

Polyalkyleneimines are produced by a method in which an alkyleneimine such as ethyleneimine or propyleneimine is subjected to ionic polymerization, or a method in which an alkyloxazoline is polymerized followed by partially hydrolyzing or completely hydrolyzing the polymer. Examples of polyalkyleneimines include diethylenetriamine, triethylenetetramine, pentaethylenehexamine and reaction products of ethylenediamine and a polyfunctional compound. Polyvinylamines are obtained by, for example, polymerizing N-vinylformamide to obtain poly(N-vinylformamide) followed by partially hydrolyzing or completely hydrolyzing the polymer with an acid such as hydrochloric acid. Polyallylamines are typically obtained by polymerizing a hydrochloride of an allylamine monomer followed by removing the hydrochloric acid. One type or two or more types of these compounds can be used. Among these, polyalkyleneimines are preferable.

Examples of polyalkyleneimines include homopolymers and copolymers obtained by polymerizing one type or two or more types of alkyleneimines having 2 to 8 carbon atoms, such as ethyleneimine, propyleneimine, 1,2-butyleneimine, 2,3-butyleneimine or 1,1-dimethylethyleneimine using an ordinary method. Among these, polyethyleneimine is more preferable. Polyalkyleneimines may be any of a branched polyalkyleneimine comprising a primary amine, secondary amine and tertiary amine obtained by using an alkyleneimine as raw material and subjecting to ring-opening polymerization, or a linear polyalkyleneimine comprising only a primary amine and secondary amine obtained by using an alkyloxazoline as raw material and subjecting to polymerization, or polyalkyleneimine having a three-dimensional crosslinked structure. Moreover, polyalkyleneimine may also contain ethylenediamine, propylenediamine, diethylenetriamine, triethylenetetramine, tetraethylenepentamine, dipropylenetriamine, tripropylenetetramine, dihexamethylenetriamine, aminopropylethylenediamine or bis(aminopropylethylenediamine) and the like. In addition to a tertiary amino group, polyalkyleneimines normally have a primary amino group or secondary amino group (imino group) having an active hydrogen atom that is derived from the reactivity of active hydrogen atoms on the nitrogen atom contained therein.

There are no particular limitations on the number of nitrogen atoms in the polyalkyleneimine, and the number of nitrogen atoms is preferably 4 to 3,000, more preferably 8 to 1,500, and even more preferably 11 to 500. In addition, the number average molecular weight of the polyalkyleneimine is preferably 100 to 20,000, more preferably 200 to 10,000, and even more preferably 500 to 8,000.

On the other hand, examples of carboxylic acids added include aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, rinoleic acid, arachic acid, behenic acid or erucic acid, alicyclic monocarboxylic acids such as cyclohexanecarboxylic acid or methylcyclohexanecarboxylic acid, aromatic monocarboxylic acids such as benzoic acid, toluic acid, ethylbenzoic acid or phenylacetic acid, aliphatic dicarboxylic acids such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid or 2,4,4-trimethyladipic acid, alicyclic dicarboxylic acids such as 1,3-cyclohexanedicarboxylic acid, 1,4-cyclohexanedicarboxylic acid or norbornanedicarboxylic acid, aromatic dicarboxylic acids such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid or 2,7-naphthalenedicarboxylic acid, and tricarboxylic acids such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid or trimesic acid. One type or two or more types of these compounds can be used.

The amount of added amine used is suitably determined by a known method in consideration of the terminal amino group concentration, terminal carboxyl group concentration and relative viscosity of the aliphatic polyamide (A1) to be produced. Normally, the amount of amine added per mole of polyamide raw material (1 mole of monomer or monomer unit composing a repeating unit) is preferably 0.5 meq/mol to 20 meq/mol and more preferably 1.0 meq/mol to 10 meq/mol from the viewpoints of obtaining adequate reactivity and facilitating the production of polyamide having a desired viscosity (one equivalent (eq) of an amino group is the amount of amino group that forms an amide group by reacting at a 1:1 ratio with a carboxyl group).

In the aliphatic polyamide (A1), a diamine and/or polyamine among the aforementioned examples of amines is preferably added during polymerization to satisfy the terminal group concentration conditions. At least one type of compound selected from the group consisting of aliphatic diamines, alicyclic diamines and polyamines is more preferably added during polymerization from the viewpoint of inhibiting gelling. A polyamine is even more preferably added during polymerization in order to simultaneously satisfy the desired relative viscosity in extrusion applications and the terminal amino group concentration conditions of the present invention.

In addition, the aliphatic polyamide (A1) is preferably also a aliphatic polyamide mixture composed of two or more types of aliphatic polyamides having different terminal group concentrations provided the aforementioned terminal group concentrations are satisfied. In this case, the terminal amino group concentration and terminal carboxyl group concentration of the aliphatic polyamide mixture is determined by the concentrations of terminal amino groups and terminal carboxyl groups of the aliphatic polyamides which are components of the mixture along with the blending ratios thereof.

The aliphatic polyamide (A1) for which relative viscosity is within the preferable range while having the terminal group concentrations within the range of the terminal group concentrations defined in the present invention can be obtained with a single aliphatic polyamide. However, prolonged polymerization is required in the case of attempting to obtain that having a high relative viscosity, thereby making this industrially disadvantageous. In addition, even when polymerization time is attempted to be shortened, since polymerization temperature and the like must be raised, there are cases in which phenomena such as the formation of large numbers of gelatinous materials occur when tube production is continued for a long period of time. On the other hand, although an aliphatic polyamide (A1) having low relative viscosity is easily produced, there are cases in which it is not possible to obtain adequate mechanical properties for the resulting multi-layer tube.

In the aliphatic polyamide mixture composed of two or more types of aliphatic polyamides having different terminal group concentrations, although all aliphatic polyamides may satisfy the aforementioned terminal group concentrations, an aliphatic polyamide mixture composed of an aliphatic polyamide, which is one component of the aliphatic polyamide (A1), having a low terminal amino group concentration and comparatively high relative viscosity, and an aliphatic polyamide, which is the remaining component of the aliphatic polyamide (A1), having a high terminal amino group concentration and a comparatively low relative viscosity is preferable from the viewpoint of productivity of the aliphatic polyamide (A1).

Namely, it is preferable that the aliphatic polyamide (A1) is an aliphatic polyamide mixture composed of at least two types of aliphatic polyamides having different terminal group concentrations, wherein when the terminal amino group concentration of the aliphatic polyamide mixture per g of the aliphatic polyamide mixture is defined as [A1] (µeq/g) and the terminal carboxyl group concentration of the aliphatic polyamide mixture per g of the aliphatic polyamide mixture is defined as [B1] (µeq/g), the aliphatic polyamide mixture is such that [A1]>[B1]+10, more preferably such that [A1]>[B1]+20 and even more preferably such that [A1]>[B1]+25 from the viewpoints of obtaining adequate interlayer adhesion with the semi-aromatic polyamide composition (B) to be subsequently described along with adequate interlayer adhesion durability. An aliphatic polyamide (A11) which is one component of the aliphatic polyamide mixture is preferably at least one type of homopolymer selected from the group consisting of polyundecamide (Polyamide 11), polydodecamide (Polyamide 12), polynonamethylene sebacamide (Polyamide 910), polynonamethylene dodecamide (Polyamide 912), polydecamethylene sebacamide (Polyamide 1010), polydecamethylene dodecamide (Polyamide 1012) and polydodecamethylene dodecamide (Polyamide 1212), and/or copolymers using a plurality of types of raw materials that form these, and more preferably polyundecamide (Polyamide 11) or polydodecamide (Polyamide 12), from the viewpoint of obtaining a multi-layer tube having superior mechanical properties, chemical resistance and flexibility.

When an aliphatic polyamide (A12) is the remaining component of the aliphatic polyamide mixture and the terminal amino group concentration of the aliphatic polyamide (A12) per g of the aliphatic polyamide (A12) is defined as [A12] (µeq/g) and the terminal carboxyl group concentration of the aliphatic polyamide (A12) per g of the aliphatic polyamide (A12) is defined as [B12] (µeq/g), the aliphatic polyamide (A12) is preferably such that [A12]>[B12]+40, more preferably such that [A12]>[B12]+45 and even more preferably such that [A12]>[B12]+50 from the viewpoints of obtaining adequate interlayer adhesion with the semi-aromatic polyamide composition (B) to be subsequently described and adequate interlayer adhesion durability. From the viewpoints of obtaining superior mechanical properties, chemical resistance and flexibility of the resulting multi-layer tube and obtaining adequate interlayer adhesion with the semi-aromatic polyamide composition (B) to be subsequently described and adequate interlayer adhesion durability, the aliphatic polyamide (A12) which is the remaining component of the aliphatic polyamide mixture is preferably at least one type of homopolymer selected from the group consisting of polycaproamide (Polyamide 6), polyundecaneamide (Polyamide 11), polydodecaneamide (Polyamide 12), polyhexamethylene adipamide (Polyamide 66), polyhexamethylene sebacamide (Polyamide 610), polyhexamethylene dodecamide (Polyamide 612), polydecamethylene sebacamide (Polyamide 1010), polydecamethylene dodecamide (Polyamide 1012) and polydodecamethylene dodecamide (Polyamide 1212), and/or copolymers using a plurality of types of raw materials that form these, and more preferably at least one type of homopolymer selected from the group consisting of polyundecaneamide (Polyamide 11), polydodecaneamide (Polyamide 12), polycaproamide (Polyamide 6), polyhexamethylene adipamide (Polyamide 66), polyhexamethylene sebacamide (Polyamide 610) and polyhexamethylene dodecamide (Polyamide 612), and/or copolymers using a plurality of types of raw materials that form these.

The relative viscosity of the aliphatic polyamide (A11) as measured basically in compliance with JIS K-6920 under conditions of 96% sulfuric acid, a polymer concentration of 1% and 25° C. is preferably 2.0 to 5.0 and more preferably 2.1 to 4.5 from the viewpoints of ensuring mechanical properties of the resulting multi-layer tube and ensuring preferable moldability of the multi-layer tube over the proper range of viscosity when melted. The relative viscosity of the aliphatic polyamide (A12) is preferably 1.5 to 3.0 and more preferably 1.7 to 2.8 from the viewpoint of productivity during polymerization.

The mixing ratio of both the aliphatic polyamide (A11) and the aliphatic polyamide (A12) is determined in consideration of the terminal group concentrations and relative viscosity of the resulting aliphatic polyamide mixture, and the content of the aliphatic polyamide (A11) in the aliphatic polyamide mixture is preferably 10% by weight to 97% by weight, more preferably 12% by weight to 95% by weight, and even more preferably 15% by weight to 90% by weight, while the content of the aliphatic polyamide (A12) in the aliphatic polyamide mixture is preferably 3% by weight to 90% by weight, more preferably 5% by weight to 88% by weight, and even more preferably 10% by weight to 85% by weight, from the viewpoints of obtaining a multi-layer tube having superior mechanical properties, chemical resistance and flexibility, and obtaining adequate interlayer adhesion and adhesion durability with the semi-aromatic polyamide composition (B) to be subsequently described.

The aliphatic polyamide composition (A) contains an elastomer polymer (A2) that contains an unsaturated compound having a carboxyl group and/or acid anhydride group (to also be referred to as the elastomer polymer (A2)).

Examples of the elastomer polymer (A2) include (ethylene and/or propylene)-α-olefin copolymers, (ethylene and/or propylene)-(α,β-unsaturated carboxylic acid ester)-based copolymers and aromatic vinyl compound-conjugated diene compound-based block copolymers, and one type or two or more types can be used.

The aforementioned (ethylene and/or propylene)-α-olefin-based copolymers are copolymers obtained by copolymerizing ethylene and/or propylene with an α-olefin having 3 or more carbon atoms, and examples thereof include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexane, 4,4-dimethyl-1-pentene, 4-ethyl-1-hexene, 3-ethyl-1-hexene, 9-methyl-1-decene, 11-methyl-1-dodecene and 12-ethyl-1-tridecene. One type of two or more types of these compounds can be used. In addition, polyenes of unconjugated dienes may also be copolymerized, examples of which include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,5-norbornadiene. One type or two or more types of these compounds can be used.

The aforementioned (ethylene and/or propylene)-(α,β-unsaturated carboxylic acid ester)-based copolymers are copolymers obtained by copolymerizing ethylene and/or propylene with an α,β-unsaturated carboxylic acid ester monomer, and examples of α,β-unsaturated carboxylic acid ester monomers include methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, 2-ethylhexyl acrylate, 2-ethylhexyl methacrylate, hydroxyethyl acrylate, hydroxyethyl methacrylate, monomethyl maleate, monomethyl itaconate, dimethyl maleate and dimethyl itaconate. One type or two or more types of these compounds can be used.

The aforementioned aromatic vinyl compound-conjugated diene compound-based copolymers are block copolymers composed of an aromatic vinyl compound-based polymer block and a conjugated diene compound-based polymer block, and block copolymers are used that have at least one aromatic vinyl compound-based polymer block and at least one conjugated diene compound-based polymer block. In the aforementioned block copolymers, an unsaturated bond in the conjugated diene compound-based polymer block may be hydrogenated.

The aromatic vinyl compound-based polymer block is a polymer block consisting mainly of units derived from an aromatic vinyl compound. Examples of aromatic vinyl compounds in this case include styrene, o-methylstyrene, m-methylstyrene, p-methylstyrene, 1,5-dimethylstyrene, 2,4-dimethylstyrene, vinylnaphthalene, vinylanthracene, 4-propylstyrene, 4-cyclohexylstyrene, 4-dodecylstyrene, 2-ethyl-4-benzylstyrene and 4-(phenylbutyl)styrene, and one type or two or more types of these compounds can be used. The aromatic vinyl compound-based polymer block may also have a small amount of a unit composed of another unsaturated monomer depending on the case.

The conjugated diene compound-based polymer block is a polymer block formed from one type or two or more types of conjugated diene-based compounds such as 1,3-butadiene, chloroprene, isoprene, 2,3-dimethyl-1,3-butadiene, 1,3-pentadiene, 4-methyl-1,3-pentadiene or 1,3-hexadiene. In the hydrogenated aromatic vinyl compound-conjected diene compound-based block copolymer, a portion or all of the unsaturated bonds in the conjugated diene compound-based polymer block may be in the form of saturated bonds due to hydrogenation.

The molecular structure of the aromatic vinyl compound-conjugated diene compound-based block copolymer and its hydrogenated form may be any of linear, branched, radial or an arbitrary combination thereof. Among these, one type or two or more types of a diblock copolymer in which a single aromatic vinyl compound polymer block and a single conjugated diene compound-based polymer block are bound linearly, a triblock copolymer in which three polymer blocks consisting of an aromatic vinyl compound-based polymer block, conjugated diene compound-based polymer block and aromatic vinyl compound-based polymer block are bound linearly in that order, and hydrogenated forms thereof, are preferably used for the aromatic vinyl compound-conjugated diene compound-based block copolymer and/or hydrogenated forms thereof, and examples thereof include non-hydrogenated or hydrogenated styrene-butadiene block copolymers, styrene-isoprene block copolymers, non-hydrogenated or hydrogenated styrene-butadiene-styrene block copolymers, non-hydrogenated or hydrogenated styrene-isoprene-styrene block copolymers, non-hydrogenated or hydrogenated styrene-(ethylene/butadiene)-styrene block copolymers and non-hydrogenated or hydrogenated styrene-(isoprene/butadiene)-styrene block copolymers.

Examples of unsaturated compounds having a carboxyl group in the elastomer polymer (A2) include α,β-unsaturated carboxylic acids such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endo-bicyclo[2.2.1]-5-heptene-2,3-dicarboxylic acid and metal salts of these carboxylic acids. Examples of unsaturated compounds having an acid anhydride group include dicarboxylic acid anhydrides having an α,β-unsaturated bond such as maleic anhydride, itaconic anhydride, citraconic anhydride or endobicyclo[2.2.1]-5-pentene-2,3-dicarboxylic acid anhydride. One type or two or more types of these compounds can be used. Among these, dicarboxylic acid anhydrides having an α,β-unsaturated bond are preferable, and maleic anhydride and itaconic anhydride are more preferable.

The carboxyl group and/or acid anhydride group concentration in the elastomer polymer (A2) is preferably 25 μeq/g to 200 μeq/g and more preferably 50 μeq/g to 150 μeq/g from the viewpoints of obtaining adequate interlayer adhesion and adhesion durability with the semi-aromatic polyamide composition (B) to be subsequently described as well as fluidity of the resulting aliphatic polyamide composition (A).

Furthermore, the carboxyl group and/or acid anhydride group concentration in the elastomer polymer (A2) can be measured by using a sample solution prepared by dissolving the elastomer polymer in a toluene solution and further adding ethanol followed by titrating the sample solution with a 0.1 N ethanol solution of KOH using phenolphthalein for the indicator.

The mixing ratio of the aliphatic polyamide (A1) and elastomer polymer (A2) in the aliphatic polyamide composition (A) is such that the content of the aliphatic polyamide (A1) is 70% by weight to 95% by weight, preferably 75% by weight to 93% by weight and more preferably 80% by weight to 90% by weight, while the content of the elastomer polymer (A2) is 5% by weight to 30% by weight, preferably 7% by weight to 25% by weight and more preferably 10% by weight to 20% by weight, from the viewpoints of maintaining the mechanical properties of the resulting tube, ensuring adequate low-temperature impact resistance, fluidity, prevention of chemical permeation and interlayer adhesion and adequate adhesion durability with the semi-aromatic polyamide composition (B) to be subsequently described.

There are no particular limitations on the method used to mix the aliphatic polyamide (A1) and the elastomer polymer (A2), various types of additives can be incorporated as necessary, and various types of conventionally known methods can be used. A mixture of the aliphatic polyamide (A1) and the elastomer polymer (A2) can be produced by, for example, a method comprising uniformly dry-blending pellets of the aliphatic polyamide (A1) and elastomer polymer (A2) to the aforementioned mixing ratios using a tumbler or mixer, or a method comprising preliminarily dry-blending the two components with other components added as necessary at a concentration used during molding followed by melt-kneading. Melt-kneading can be carried out using a kneading machine such as a single-screw extruder, twin-screw extruder, kneader or Banbury mixer.

In the aliphatic polyamide composition (A) comprising the aliphatic polyamide (A1) and the elastomer polymer (A2) of the present invention, the product of $[X] \times [Y]$ wherein $[X]$ (μeq/g) is the terminal amino group concentration of the aliphatic polyamide (A1) per g of the aliphatic polyamide composition (A) and $[Y]$ (μeq/g) is the total concentration of the carboxyl group and acid anhydride group of the elastomer polymer (A2) per g of the aliphatic polyamide composition (A) is 200 (μeq/g)$^2$ to 1,300 (μeq/g)$^2$, preferably 250 (μeq/g)$^2$ to 1,200 (μeq/g)$^2$ and more preferably 300 (μeq/g)$^2$ to 1,100 (μeq/g)$^2$ from the viewpoints of obtaining adequate interlayer adhesion and adhesion durability with the semi-aromatic polyamide composition (B) to be subsequently described as well as fluidity of the resulting aliphatic polyamide composition (A).

Furthermore, the terminal amino group concentration $[X]$ (μeq/g) and total concentration (Y) (μeq/g) of the carboxyl group and acid anhydride group of the elastomer polymer (A2) per g of the aliphatic polyamide composition (A) comprising the aliphatic polyamide (A1) and the elastomer polymer (A2) can be respectively determined by neutralization titration using an indicator as previously described, and can be further determined by calculation using the weight ratio of the aliphatic polyamide (A1) to the elastomer polymer (A2).

A plasticizer is preferably added to the aliphatic polyamide composition (A). Examples of plasticizers include benzenesulfonic acid alkyl amides, toluenesulfonic acid alkyl amides and hydroxybenzoic acid alkyl esters.

Examples of benzenesulfonic acid alkyl amides include benzenesulfonic acid propylamide, benzensulfonic acid butyl amide and benzenesulfonic acid 2-ethylhexylamide. Examples of toluenesulfonic acid alkyl amides include N-ethyl-o-toluenesulfonic acid butylamide, N-ethyl-p-toluenesulfonic acid butylamide, N-ethyl-o-toluenesulfonic acid 2-ethylhexylamide and N-ethyl-p-toluenesulfonic acid 2-ethylhexylamide. Examples of hydroxybenzoic acid alkyl esters include ethylhexyl o-hydroxybenzoate, ethylhexyl p-hydroxybenzoate, hexyldecyl o-hydroxybenzoate, hexyldecyl p-hydroxybenzoate, ethyldecyl o-hydroxybenzoate, ethyldecyl p-hydroxybenzoate, octyloctyl o-hydroxybenzoate, octyloctyl p-hydroxybenzoate, decyldodecyl o-hydroxybenzoate, decyldodecyl p-hydroxybenzoate, methyl o-hydroxybenzoate, methyl p-hydroxybenzoate, butyl o-hydroxybenzoate, butyl p-hydroxybenzoate, hexyl o-hydroxybenzoate, hexyl p-hydroxybenzoate, n-octyl o-hydroxybenzoate, n-octyl p-hydroxybenzoate, decyl o-hydroxybenzoate, decyl p-hydroxybenzoate, dodecyl o-hydroxybenzoate and dodecyl p-hydroxybenzoate. One type or two or more types of these compounds can be used.

Among these, benzenesulfonic acid alkyl amides such as benzenesulfonic acid butylamide or benzenesulfonic acid 2-ethylhexyl amide, toluenesulfonic acid alkyl amides such as N-ethyl-p-toluenesulfonic acid butylamide or N-ethyl-p-toluenesulfonic acid 2-ethyhexylamide, and hydroxybenzoic acid alkyl esters such as ethylhexyl p-hydroxybenzoate, hexyldecyl p-hydroxybenzoate or ethyldecyl p-hydroxybenzoate are preferable, while benzenesulfonic acid butylamide, ethylhexyl p-hydroxybenzoate and hexyldecyl p-hydroxybenzoate are more preferable.

The plasticizer content is preferably 1 part by weight to 30 parts by weight and more preferably 2 parts by weight to 20 parts by weight based on 100 parts by weight of the aliphatic polyamide composition (A) from the viewpoint of adequate ensuring flexibility and low-temperature impact resistance of the multi-layer tube.

In addition to the aliphatic polyamide (A1) and elastomer polymer (A2), other polyamide-based resins or other thermoplastic resins may be added to the aliphatic polyamide composition (A).

Examples of other polyamide-based resins include poly(meta-xylene adipamide) (Polyamide MXD6), poly(meta-xylene suberamide) (Polyamide MXD8), poly(meta-xylene azelamide) (Polyamide MXD9), poly(meta-xylene sebacamide) (Polyamide MXD10), poly(meta-xylene dodecamide) (Polyamide MXD12), poly(meta-xylene terephthalamide) (Polyamide MXDT), poly(meta-xylene isophthalamide) (Polyamide MXDI), poly(meta-xylene hexahydroterephthalamide) (Polyamide MXDT(H)), poly(meta-xylene naphthalamide) (Polyamide MXDN), poly (para-xylene adipamide) (Polyamide PXD6), poly(para-xylene suberamide) (Polyamide PXD8), poly(para-xylene azelamide) (Polyamide PXD9), poly(para-xylene sebacamide) (Polyamide PXD10), poly(para-xylene dodecamide) (Polyamide PXD12), poly(para-xylene terephthalamide) (Polyamide PXDT), poly(para-xylene isophthalamide) (Polyamide PXDI), poly(para-xylene hexahydroterephthalamide) (Polyamide PXDT(H)), poly(para-xylene naphthalamide) (Polyamide PXDN), poly(para-phenylene terephthalamide) (Polyamide PPTA), poly(para-phenylene isophthalamide) (Polyamide PPIA), poly(meta-phenylene terephthalamide) (Polyamide PMTA), poly(meta-phenylene isophthalamide) (Polyamide PMIA), poly(2,6-naphthalenedimethylene adipamide) (Polyamide 2,6-BANG), poly(2,6-naphthalenedimethylene suberamide) (Polyamide 2,6-BAN8), poly(2,6-naphthalenedimethylene azelamide) (Polyamide 2,6-BANS), poly(2,6-naphthalenedimethylene sebacamide) (Polyamide 2,6-BAN10), poly(2,6-naphthalenedimethylene dodecamide) (Polyamide 2,6-BAN12), poly(2,6-naphthalenedimethylene terephthalamide) (Polyamide 2,6-BANT), poly(2,6-naphthalenedimethylene isophthalamide) (Polyamide 2,6-BANI), poly(2,6-naphthalenedimethylene hexahydroterephthalamide) (Polyamide 2,6-BANT(H)), poly(2,6-naphthalenedimethylene naphthalamide) (Polyamide 2,6-BANN), poly(1,3-cyclohexanedimethylene adipamide) (Polyamide 1,3-BAC6), poly(1,3-cyclohexanedimethylene suberamide) (Polyamide 1,3-BAC8), poly(1,3-cyclohexanedimethylene azelamide) (Polyamide 1,3-BAC9), poly(1,3-cyclohexanedimethylene sebacamide) (Polyamide 1,3-BAC10), poly(1,3-cyclohexanedimethylene dodecamide) (Polyamide 1,3-BAC12), poly(1,3-cyclohexanedimethylene terephthalamide) (Polyamide 1,3-BACT), poly(1,3-cyclohexanedimethylene isophthalamide) (Polyamide 1,3-BACI), poly(1,3-cyclohexanedimethylene hexahydroterephthalamide) (Polyamide 1,3-BACT(H)), poly(1,3-cyclohexanedimethylene naphthalamide) (Polyamide 1,3-BACN), poly(1,4-cyclohexanedimethylene adipamide) (Polyamide 1,4-BAC6), poly(1,4-cyclohexanedimethylene suberamide) (Polyamide 1,4-BAC8), poly(1,4-cyclohexanedimethylene azelamide) (Polyamide 1,4-BAC9), poly(1,4-cyclohexanedimethylene sebacamide) (Polyamide 1,4-BAC10), poly(1,4-cyclohexanedimethylene dodecamide) (Polyamide 1,4-BAC12), poly(1,4-cyclohexanedimethylene terephthalamide) (Polyamide 1,4-BACT), poly(1,4-cyclohexanedimethylene isophthalamide) (Polyamide 1,4-BACI), poly(1,4-cyclohexanedimethylene hexahydroterephthalamide) (Polyamide 1,4-BACT(H)), poly(1,4-cyclohexanedimethylene naphthalamide) (Polyamide 1,4-BACN), poly(4,4'-methylenebiscyclohexylene adipamide) (Polyamide PACM6), poly(4,4'-methylenebiscyclohexylene suberamide) (Polyamide PACM8), poly(4,4'-methylenebiscyclohexylene azelamide) (Polyamide PACM9), poly(4,4'-methylenebiscyclohexylene sebacamide) (Polyamide PACM10), poly(4,4'-methylenebiscyclohexylene dodecamide) (Polyamide PACM12), poly(4,4'-methylenebiscyclohexylene tetradecamide) (Polyamide PACM14), poly(4,4'-methylenebiscyclohexylene hexadecamide) (Polyamide PACM16), poly(4,4'-methylenebiscyclohexylene octadecamide) (Polyamide PACM18), poly(4,4'-methylenebiscyclohexylene terephthalamide) (Polyamide PACMT), poly(4,4'-methylenebiscyclohexylene isophthalamide) (Polyamide PACMI), poly(4,4'-methylenebiscyclohexylene hexahydroterephthalamide) (Polyamide PACMT(H)), poly(4,4'-methylenebiscyclohexylene naphthalamide) (Polyamide PACMN), poly(4,4'-methylenebis(2-methyl-cyclohexylene) adipamide) (Polyamide MACM6), poly(4,4'-methylenebis(2-methyl-cyclohexylene) suberamide) (Polyamide MACM8), poly(4,4'-methylenebis(2-methyl-cyclohexylene) azelamide) (Polyamide MACM9), poly(4,4'-methylenebis(2-methyl-cyclohexylene) sebacamide) (Polyamide MACM10), poly(4,4'-methylenebis(2-methyl-cyclohexylene) dodecamide) (Polyamide MACM12), poly(4,4'-methylenebis(2-methyl-cyclohexylene) tetradecamide) (Polyamide MACM14), poly(4,4'-methylenebis(2-methyl-cyclohexylene) hexadecamide) (Polyamide MACM16), poly(4,4'-methylenebis(2-methyl-cyclohexylene) octadecamide) (Polyamide MACM18), poly(4,4'-methylenebis(2-methyl-cyclohexylene) terephthalamide) (Polyamide MACMT), poly(4,4'-methylenebis(2-methyl-cyclohexylene) isophthalamide) (Polyamide MACMI), poly(4,4'-methylenebis(2-methyl-cyclohexylene) hexahydroterephthalamide) (Polyamide MACMT(H)), poly(4,4'-methylenebis(2-methyl-cyclohexylene) naphthalamide) (Polyamide MACMN), poly(4,4'-propylenebiscyclohexylene adipamide) (Polyamide PACP6), poly(4,4'-propylenebiscyclohexylene suberamide) (Polyamide PACP8), poly(4,4'-propylenebiscyclohexylene azelamide) (Polyamide PACP9), poly(4,4'-propylenebiscyclohexylene sebacamide) (Polyamide PACP10), poly(4,4'-propylenebiscyclohexylene dodecamide) (Polyamide PACP12), poly(4,4'-propylenebiscyclohexylene tetradecamide) (Polyamide PACP14), poly(4,4'-propylenebiscyclohexylene hexadecamide) (Polyamide PACP16), poly(4,4'-propylenebiscyclohexylene octadecamide) (Polyamide PACP18), poly(4,4'-propylenebiscyclohexylene terephthalamide) (Polyamide PACPT), poly(4,4'-propylenebiscyclohexylene isophthalamide) (Polyamide PACPI), poly(4,4'-propylenebiscyclohexylene hexahydroterephthalamide) (Polyamide PACPT(H)), poly(4,4'-propylenebiscyclohexylene naphthalamide) (Polyamide PACPN), poly(isophorone adipamide) (Polyamide IPD6), poly(isophorone suberamide) (Polyamide IPD8), poly(isophorone azelamide) (Polyamide IPD9), poly(isophorone sebacamide) (Polyamide IPD10), poly(isophorone dodecamide) (Polyamide IPD12), poly(isophorone terephthalamide) (Polyamide IPDT), poly(isophorone isophthalamide) (Polyamide IPDI), poly(isophorone hexahydroterephthalamide) (Polyamide IPDT(H)), poly(isophorone naphthalamide) (Polyamide IPDN), poly(tetramethylene terephthalamide) (Polyamide 4T), poly(tetramethylene isophthalamide) (Polyamide 4I), poly(tetramethylene hexahydroterephthalamide) (Polyamide (4T(H)), poly(tetramethylene naphthalamide) (Polyamide 4N), poly(pentamethylene terephthalamide) (Polyamide 5T), poly(pentamethylene isophthalamide) (Polyamide 5I), poly(pentamethylene hexahydroterephthalamide) (Polyamide 5T(H)), poly(pentamethylene naphthalamide) (Polyamide 5N), poly(hexamethylene terephthalamide) (Polyamide 6T), poly(pentamethylene isophthalamide) (Polyamide 6I), poly(pentamethylene hexahydroterephthalamide) (Polyamide 6T(H)), poly(pentamethylene naphthalamide (Polyamide 6N), poly(2-methylpentarnethylene terephthalamide) (Polyamide M5T), poly(2-methylpentamethylene isophthalamide) (Polyamide M5I), poly(2-methylpentamethylene hexahydroterephthalamide) (Polyamide M5T(H)), poly(2-methylpentamethylene naphthalamide) (Polyamide M5N), poly(nonamethylene isophthalamide) (Polyamide 9I), poly(nonamethylene hexahydroterephthalamide (Polyamide 9T(H)), poly(2-methyloctamethylene isophthalamide) (Polyamide M8I), poly(2-methyloctamethylene hexahydroterephthalamide) (Polyamide M8T(H)), poly(trimethylhexamethylene terephthalamide) (Polyamide TMHT), poly(trimethylhexamethylene isophthalamide) (Polyamide TMHI), poly(trimethylhexamethylene hexahydroterephthalamide) (Polyamide TMHT(H)), poly(trimethylhexamethylene naphthalamide) (Polyamide TMHN), poly(decamethylene terephthalamide) (Polyamide 10T), poly(decamethylene isophthalamide) (Polyamide 10I), poly(decamethylene hexahydroterephthalamide) (Polyamide 10T(H)), poly (decamethylene naphthalamide) (Polyamide 10N), poly(un-decamethylene terephthalamide) (Polyamide 11T), poly(un-decamethylene isophthalamide) (Polyamide 11I), poly (undecamethylene hexahydroterephthalamide (Polyamide 11T(H)), poly(undecamethylene naphthalamide) (Polyamide 11N), poly(dodecamethylene terephthalamide) (Polyamide 12T), poly(dodecamethylene isophthalamide) (Polyamide 12I), poly(dodecamethylene hexahydroterephthalamide) (Polyamide 12T(H)), poly(dodecamethylene naphthalamide) (Polyamide 12N) and copolymers using a plurality of types of these polyamide raw materials. One type of two or more types of these compounds can be used.

Examples of other thermoplastic resins that may be mixed into the aliphatic polyamide composition (A) include thermoplastic resins other than the elastomer polymer (A2) containing an unsaturated compound having a carboxyl group and/or acid anhydride group, including polyolefin-based resins such as high-density polyethylene (HDPE), medium-density polyethylene (MDPE), low-density polyethylene (LDPE), linear low-density polyethylene (LLDPE), ultra-high-molecular weight polyethylene (UHMWPE), polypropylene (PP), polybutene (PB) and polymethylpentene (TPX), polystyrene-based resins such as polystyrene (PS), syndiotactic polystyrene (SPS), methyl methacrylate-styrene copolymer (MS) or methyl methacrylate-styrene-polybutadiene (MBS), the aforementioned polyolefin-based resins or polystyrene-based resins containing a functional group such as a carboxyl group or salt thereof, acid anhydride group or epoxy group, polyester-based resins such as polybutylene terephthalate (PBT), polyethylene terephthalate (PET), polyethylene isophthalate (PEI), poly(ethylene terephthalate-ethylene isophthalate) copolymer (PET/PEI), polytrimethylene terephthalate (PTT), polycyclohexene dimethylene terephthalate (PCT), polyethylene naphthalate (PEN), polybutene naphthalate (PBN), polyarylate (PAR), liquid crystal polyester (LCP), polylactic acid (PLA) or polyglycolic acid (PGA), polyether-based resins such as polyacetal (POM) or polyphenylene ether (PPO), polysulfone-based resins such as polysulfone (PSU), polyethersulfone (PESU) or polyphenylsulfone (PPSU), polythio-ether-based resins such as polyphenylenesulfide (PPS) or polythioethersulfone (PTES), polyketone-based resins such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK) or polyether ketone ether ketone ketone (PEKEKK), polynitrile-based resins such as polyacrylonitrile (PAN), polymethacrylonitrile, acrylonitrile-styrene copolymer (AS), methacrylonitrile-styrene copolymer, acrylonitrile-butadiene-styrene copolymer (ABS) or acrylonitrile-butadiene copolymer (NBR), polymethacrylate-based resins such as polymethyl methacrylate (PMMA) or polyethyl methacrylate (PEMA), polyvinyl-based resins such as polyvinyl alcohol (PVA), polyvinylidene chloride (PVDC), polyvinyl chloride (PVC), vinyl chloride-vinylidene chloride copolymer or vinylidene chloride-methyl acrylate copolymer, cellulose-based resins such as cellulose acetate or cellulose butyrate, fluorine-based resins such as polyvinylidene fluoride (PVDF), polyvinyl fluoride (PVF), polychlorotrifluoroethylene (PCTFE), tetrafluoroethylene-ethylene copolymer (ETFE), ethylene-chlorotrifluoroethylene copolymer (ECTFE), tetrafluoroethylene-hexafluoropropylene copolymer (FEP), tetrafluoroethylene-hexafluoropropylene-vinylidene fluoride copolymer (THV), tetrafluoroethylene-hexafluoropropylene-vinylidene fluoride-perfluoro (alkylvinylether) copolymer (PFA), tetrafluoroethylene-hexafluoropropylene-perfluoro(alkylvinylether) copolymer, or chlorotrifluoroethylene-perfluoro(alkylvinylether)-tetrafluoroethylene copolymer (CPT), polycarbonate-based resins such as polycarbonate (PC), polyimide-based resins such as thermoplastic polyimide (TPI), polyetherimide, polyesterimide, polyamide imide (PAI) or polyester amide imide, thermoplastic polyurethane-based resins, polyamide elastomers, polyurethane elastomers and polyester elastomers. One type or two or more types of these compounds can be used.

The content of other polyamide-based resins or other thermoplastic resins is preferably 20 parts by weight or less and more preferably 10 parts by weight or less based on 100 parts by weight of the aliphatic polyamide composition (A).

Moreover, an antioxidant, heat stabilizer, ultraviolet absorber, photo stabilizer, lubricant, inorganic filler, anti-static agent, flame retardant, crystallization promoter or colorant and the like may also be added to the aliphatic polyamide composition (A) as necessary.

2. (b) Layer

The (b) layer of the multi-layer tube of the present invention contains a semi-aromatic polyamide composition (B), and the semi-aromatic polyamide composition (B) contains a semi-aromatic polyamide (B1).

<Semi-Aromatic Polyamide (B1)>

The semi-aromatic polyamide (B1) used in the present invention comprises a diamine unit containing 60 mol % or more of a 1,9-nonanediamine unit and/or 2-methyl-1,8-octanediamine unit based on all diamine units, and a dicarboxylic acid unit containing 60 mol % or more of terephthalic acid unit and/or naphthalene dicarboxylic acid unit based on all dicarboxylic acid units (to also be referred to as semi-aromatic polyamide (B1)).

The content of the 1,9-nonanediamine unit and/or 2-methyl-1,8-octanediamine unit in the semi-aromatic polyamide (B1) is 60 mol % or more, preferably 75 mol % or more and more preferably 90 mol % or more based on all diamine units from the viewpoint of adequately ensuring various physical properties such as heat resistance, chemical resistance, impact resistance or prevention of chemical permeation of the resulting multi-layer tube. Moreover, in the case of using the 1,9-nonanediamine unit and 2-methyl-1, 8-octanediemine unit in combination, the molar ratio of the 1,9-nonanediamine unit to the 2-methyl-1,8-octanediamine unit is preferably 30 mol %:70 mol % to 98 mol %:2 mol % and more preferably 40 mol %:60 mol % to 95 mol %:5 mol % from the viewpoints of balance between moldability and impact resistance.

The diamine unit of the semi-aromatic polyamide (B1) may also contain a diamine unit other than the 1,9-nonane-diamine unit and 2-methyl-1,8-nonanediamine unit within a range that does not impair the various superior properties of the multi-layer tube of the present invention. Examples of other diamine units include units derived from aliphatic diamines such as 1,2-ethanediamine, 1,3-propanediamine, 1,4-butanediamine, 1,5-pentanediamine, 1,6-hexanediamine, 1,7-heptanediamine, 1,8-octanediamine, 1,10-decanediamine, 1,11-undecanediamine, 1,12-dodecanediamine, 1,13-tridecanediamine, 2-methyl-1,5-pentanediamine, 3-methyl-1,5-pentanediamine, 2,2,4-trimethyl-1,6-hexanediamine, 2,4,4-trimethyl-1,6-hexanediamine or 5-methyl-1,9-nonanediamine, units derived from alicyclic diamines such as 1,3-cyclohexanediamine, 1,4-cyclohexanediamine, 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane or 4,9-bis(aminomethyl)tricyclodecane, and units derived from aromatic diamines such as m-phenylenediamine, p-phenylenediamine, m-xylylenediamine, p-xylylenediamine, 1,4-bis(aminomethyl)naphthalene, 1,5-bis(aminomethyl)naphthalene, 2,6-bis(aminomethyl)naphthalene, 2,7-bis(aminomethyl)naphthalene, 4,4'-diaminophenylmethane, 2,2-bis(4-aminophenyl)propane, 4,4'-diaminodiphenylsulfone or 4,4'-diaminodiphenylether, and one type or two or more types of these compounds can be used. The content of these other diamine units is 40 mol % or less, preferably 25 mol % or less and more preferably 10 mol % or less based on all diamine units.

In addition, the content of the terephthalic acid unit and/or naphthalene dicarboxylic acid unit in the semi-aromatic polyamide (B1) is 60 mol % or more, preferably 75 mol % or more and more preferably 90 mol % or more based on all dicarboxylic acid units from the viewpoint of adequately ensuring heat resistance, chemical resistance and prevention of chemical permeation and the like of the resulting multi-layer tube.

Examples of naphthalene dicarboxylic acid units include units derived from 2,6-naphthalenedicarboxylic acid, 2,7-naphthalenedicarboxylic acid, 1,4-naphthalenedicarboxylic acid or 1,5-naphthalenedicarboxylic acid and the like. One type or two more types of these compounds can be used. Among the aforementioned naphthalene dicarboxylic acid units, units derived from 2,6-naphthalenedicarboxylic acid and 2,7-naphthalenedicarboxylic acid are preferable in consideration of economy and availability.

The dicarboxylic acid unit in the semi-aromatic polyamide (B1) may also contain other dicarboxylic acid units other than the terephthalic acid unit and/or naphthalenedicarboxylic acid unit within a range that does not impair the various superior properties of the multi-layer tube of the present invention. Examples of other dicarboxylic acid units include units derived from aliphatic dicarboxylic acids such as malonic acid, dimethylmalonic acid, succinic acid, glutaric acid, adipic acid, 2-methyladipic acid, pimelic acid, 2,2-dimethylglutaric acid, 2,2-diethylsuccinic acid, suberic acid, azelaic acid, 2,2,4-trimethyladipic acid, 2,4,4-trimethyladipic acid, sebacic acid, undecanedioic acid, dodecanedioic acid, tridecanedioic acid, tetradecanedioic acid, pentadecanedioic acid, hexadecanedioic acid, octadecanedioic acid or eicosanedioic acid, units derived from alicyclic dicarboxylic acids such as 1,3-cyclopentanedicarboxylic acid, 1,3-cyclohexanedicarboxylic acid or 1,4-cyclohexanedicarboxylic acid, and units derived from aromatic dicarboxylic acids such as phthalic acid, isophthalic acid, 1,3-phenylenediacetic acid, 1,4-phenylenedioxydiacetic acid, 4,4'-oxydibenzoic acid, diphenylmethane-4,4'-dicarboxylic acid, diphenylethane-4,4'-dicarboxylic acid, diphenylpropane-4,4'-dicarboxylic acid, diphenylether-4,4'-dicarboxylic acid, diphenylsulfone-4,4'-dicarboxylic acid, 4,4'-biphenyldicarboxylic acid or 4,4'-triphenyldicarboxylic acid, and one type or two or more types of these compounds can be used. Among the aforementioned units, units derived from aromatic dicarboxylic acids are preferable. The content of these other dicarboxylic acid units is 40 mol % or less, preferably 25 mol % or less and more preferably 10 mol % or less based on all dicarboxylic acid units. Moreover, polyhydric carboxylic acids such as trimellitic acid, trimesic acid or pyromellitic acid can also be used within the range over which they can be melt-molded.

The semi-aromatic polyamide (B1) may contain other units other than the dicarboxylic acid unit and diamine unit within a range that does impair the various superior properties of the multi-layer tube of the present invention. Examples of other units include units derived from lactams such as caprolactam, enantholactam, undecanelactam, dodecanelactam, α-pyrrolidone or α-piperidone, units derived from aliphatic aminocarboxylic acids such as 6-aminocaproic acid, 7-aminoheptanoic acid, 9-aminononanoic acid, 11-aminoundecanoic acid or 12-aminododecanoic acid, and units derived from aromatic aminocarboxylic acids such as p-aminomethylbenzoic acid. One type or two or more types of these compounds can be used. The content of these other units is preferably 30 mol % or less and more preferably 10 mol % or less based on all dicarboxylic acid units.

The relative viscosity of the semi-aromatic polyamide (B1) as measured basically in compliance with JIS K-6920 under conditions of 96% sulfuric acid, a polymer concentration of 1% and 25° C. is preferably 1.5 to 4.0, more preferably 1.8 to 3.5 and even more preferably 2.0 to 3.0 from the viewpoints of ensuring mechanical properties of the resulting multi-layer tube and ensuring preferable moldability of the multi-layer tube over the proper range of viscosity when melted.

There are no particular limitations on the type and concentration or molecular weight distribution of terminal groups of the semi-aromatic polyamide (B1). One type or two or more types in a suitable combination of a monoamine, diamine, polyamine, monocarboxylic acid or dicarboxylic acid can be added as the terminal groups to modify molecular weight or stabilize the melt during molding processing. Examples of the terminal groups of the semi-aromatic polyamide (B1) include aliphatic monoamines such as methylamine, ethylamine, propylamine, butylamine, hexylamine, octylamine, decylamine, stearylamine, dimethylamine, diethylamine, dipropylamine or dibutylamine, alicyclic monoamines such as cyclohexylamine or dicyclohexylamine, aromatic monoamines such as aniline, toluidine, diphenylamine or naphthylamine, aliphatic diamines such as 1,4-butanediamine, 1,5-pentanediamine, 1,6-hexanediamine, 1,10-decanediamine or 1,12-dodecanediamine, alicyclic diamines such as cyclohexanediamine, bis(aminomethyl)cyclohexane or 5-amino-1,3,3-trimethylcyclohexanemethylamine, aromatic diamines such as m-phenylenediamine, p-phenylenediamine, m-xylylenediamine or p-xylylenediamine, polyamines such as polyalkyleneimine, polyalkylene polyamine, polyvinylamine or polyallylamine, aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid or isobutyric acid, alicyclic monocarboxylic acids such as cyclohexanecarboxylic acid, aromatic monocarboxylic acids such as benzoic acid, toluic acid, α-naphthalenecarboxylic acid, β-naphthalenecarboxylic acid, methylnaphthalenecarboxylic acid or phenylacetic acid, aliphatic dicarboxylic acids such as adipic acid, 2,2,4-trimethyladipic acid, 2,4,4-trimethyladipic acid, pimelic acid, suberic acid, azelaic acid, sebacic acid, undecanedioic acid or dodecanedioic acid, alicyclic dicarboxylic acids such as 1,3-cyclopentanedicarboxylic acid, 1,3-cyclohexanedicarboxylic acid or 1,4-cyclohexanedicarboxylic acid, and aromatic dicarboxylic acids such as phthalic acid or isophthalic acid. One type or two or more types of these compounds can be used. Although varying according to the reactivity of the molecular weight modifier and polymerization conditions, the amount of these molecular weight modifiers used is suitably determined so that the relative viscosity of the polyamide to ultimately be obtained is within the aforementioned ranges.

In consideration of melt stability, terminal groups of the molecular chain of the semi-aromatic polyamide (B1) are preferably blocked with a terminal blocking agent, and more preferably 10% or more, and even more preferably 20% or more, of the terminal groups are blocked. Although there are no particular limitations on the terminal blocking agent provided it is a monofunctional compound having reactivity with the amino group or carboxyl group of the polyamide terminal, a monocarboxylic acid or monoamine is preferable from the viewpoints of reactivity and stability of the blocked terminal, and a monocarboxylic acid is more preferable from the viewpoint of handling ease and the like. In addition, acid anhydrides such as phthalic anhydride, monoisocyanates, monoacid halides, monoesters or monoalcohols can also be used.

There are no particular limitations on the monocarboxylic acid used as a terminal blocking agent provided it has reactivity with an amino group, and examples thereof include the aforementioned aliphatic monocarboxylic acids, alicyclic monocarboxylic acids and aromatic monocarboxylic acids. From the viewpoint of reactivity, stability of the blocked terminal, price and the like, acetic acid, propionic acid, butyric acid, valeric acid, caproic acid, caprylic acid, lauric acid, tridecylic acid, myristic acid, palmitic acid, stearic acid and benzoic acid are preferable. There are also no particular limitations on the monoamine used as a terminal blocking agent provided it has reactivity with a carboxyl group, and examples thereof include the aforementioned aliphatic monoamines, alicyclic monoamines and aromatic monoamines. Among these, butylamine, hexylamine, octylamine, decylamine, stearylamine, cyclohexylamine and aniline are preferable from the viewpoints of reactivity, boiling point, stability of the blocked terminal, price and the like.

The amount of terminal blocking agent used can be suitably selected in consideration of the reactivity and boiling point of the terminal blocking agent used, reactor, reaction conditions and the like. From the viewpoint of adjusting degree of polymerization, 0.1 mol % to 15 mol % of terminal blocking agent is used based on the total number of moles of the raw material components in the form of dicarboxylic acid and amine.

Examples of devices used to produce the semi-aromatic polyamide (B1) include known polyamide production devices such as batch-type reactors, single-tank and/or multi-tank continuous reactors, tubular continuous reactors and kneading reaction extruders such as single-screw kneading extruders or twin-screw kneading extruders. A known polymerization method can be used such as melt polymerization, solution polymerization or solid phase polymerization, and polymerization can be carried out by repeating normal pressure, reduced pressure and increased pressure operations. These polymerization methods can be used alone or suitably used in combination.

Phosphoric acid, phosphorous acid, hypophosphorous acid and the like, salts thereof or esters thereof can be added as catalyst when producing the semi-aromatic polyamide (B1). Examples of salts or esters of phosphoric acid, phosphorous acid and hypophosphorous acid include metal salts of phosphoric acid, phosphorous acid or hypophosphorous acid with potassium, sodium, magnesium, vanadium, calcium, zinc, cobalt, manganese, tin, tungsten, germanium, titanium and antimony, ammonium salts of phosphoric acid, phosphorous acid or hypophosphorous acid, and ethyl esters, isopropyl esters, butyl esters, hexyl esters, isodecyl esters, decyl esters, stearyl esters and phenyl esters of phosphoric acid, phosphorous acid or hypophosphorous acid. One type or two or more types of these compounds can be used.

The semi-aromatic polyamide (B1) may also contain other polyamide-based resins or other thermoplastic resins in addition to the semi-aromatic polyamide (B1). Examples of other polyamide-based resins or other thermoplastic resins include the same resins as in the case of the aforementioned aliphatic polyamide composition (A). Moreover, the semi-aromatic polyamide (B1) may also be a mixture with the aliphatic polyamide (A1). The content of the semi-aromatic polyamide (B1) in the mixture is preferably 60% by weight or more.

Moreover, an antioxidant, heat stabilizer, ultraviolet absorber, photostabilizer, lubricant, inorganic filler, antistatic agent, flame retardant, crystallization promoter, plasticizer, colorant, wetting agent or impact resistance improver and the like may also be added as necessary to the semi-aromatic polyamide composition (B). An impact resistance improver is preferably added to the semi-aromatic polyamide composition (B) in order to improve low-temperature impact resistance of the semi-aromatic polyamide (B1), and the elastomer polymer (A2) containing an unsaturated compound having a carboxyl group and/or acid anhydride group described in the explanation of the aliphatic polyamide composition (A) is more preferable as an impact resistance improver. In addition, the semi-aromatic polyamide composition (B) may be an electrically conductive semi-aromatic polyamide composition (B) imparted with electrical conductivity, and the use of an electrically conductive semi-aromatic polyamide composition (B) enables the resulting multi-layer tube to have superior antistatic performance. The electrically conductive semi-aromatic polyamide composition (B) can be obtained by adding an electrically conductive filler as will be subsequently described with respect to an electrically conductive layer comprising a thermoplastic resin composition containing an electrically conductive filler.

3. Multi-Layer Tube

The multi-layer tube according to the present invention comprises at least two layers having an (a) layer containing the aliphatic polyamide composition (A) and a (b) layer containing the semi-aromatic polyamide composition (B). It is essential that the multi-layer tube have the (b) layer containing the semi-aromatic polyamide composition (B) since this serves to improve prevention of chemical permeation.

In a preferable embodiment, the (a) layer containing the aliphatic polyamide composition (A) is arranged as the outermost layer of the multi-layer tube. A multi-layer tube having superior chemical resistance and flexibility can be obtained by arranging the (a) layer containing the aliphatic polyamide composition (A) as the outermost layer.

In a more preferable embodiment, the (b) layer containing the semi-aromatic polyamide composition (B) is arranged to the inside of the (a) layer containing the aliphatic polyamide composition (A). In an even more preferable embodiment, the (b) layer containing the semi-aromatic polyamide composition (B) is arranged as the innermost layer of the multi-layer tube. In addition to obtaining a multi-layer tube having superior deteriorated fuel resistance, elution of low molecular weight components such as monomers or oligomers caused by contact with alcohol-containing gasoline can be inhibited by arranging the (b) layer containing the semi-aromatic polyamide composition (B) as the innermost layer. In the case the (b) layer containing the semi-aromatic polyamide composition (B) is arranged as the innermost layer, the semi-aromatic polyamide composition (B) may be an electrically conductive semi-aromatic polyamide composition (B) imparted with electrical conductivity, and the resulting multi-layer tube demonstrates superior antistatic resistance as a result of using the electrically conductive semi-aromatic polyamide composition (B).

In the multi-layer tube of the present invention, although there are no particular limitations on the thickness of each layer, and can be adjusted corresponding to the type of polymer that composes each layer and the number of layers, application and so forth of the entire multi-layer tube, the thickness of each layer is determined in consideration of properties such prevention of chemical permeation, low-temperature impact resistance and flexibility of the multi-layer tube. In general, the thicknesses of the (a) layer and (b) layer are respectively 3% to 90% of the total thickness of the multi-layer tube. The thickness of the (b) layer is more preferably 5% to 80% and even more preferably 7% to 50% of the total thickness of the multi-layer tube in consideration of the balance between low-temperature impact resistance and prevention of chemical permeation.

There are no particular limitations on the total number of layers of the multi-layer tube of the present invention provided it comprises at least two layers having the (a) layer containing the aliphatic polyamide composition (A) and the (b) layer containing the semi-aromatic polyamide composition (B). The multi-layer tube of the present invention may also have one layer or two or more layers comprising other thermoplastic resins in addition to the two layers consisting of the (a) layer and the (b) layer in order to obtain a multi-layer tube that imparts additional functions or is economically advantageous. Although the number of layers of the multi-layer tube of the present invention is two or more, the number of layers is preferably 8 or less and more preferably 2 to 7 layers judging from the mechanism of tube production devices.

The multi-layer tube of the present invention preferably further comprises a (c) layer containing a fluorine-containing polymer (C), in which a functional group having reactivity with an amino group is introduced into the molecular chain thereof, in addition to the (a) layer containing the aliphatic polyamide composition (A) and the (b) layer containing the semi-aromatic polyamide composition (B). In the multi-layer tube of the present invention, a preferable embodiment of a multi-layer tube is a multi-layer tube having a layer configuration in which the (b) layer containing the semi-aromatic polyamide composition (B) is arranged to the inside of the (a) layer containing the aliphatic polyamide composition (A), and further comprises a (c) layer containing a fluorine-containing polymer (C) in which a functional group having reactivity with an amino group is introduced into the molecular chain thereof, the (c) layer being arranged to the inside of the (b) layer. The fluorine-containing polymer (C) may be an electrically conductive fluorine-containing polymer (C) imparted with electrical conductivity, and the use of an electrically conductive fluorine-containing polymer (C) enables the resulting multi-layer tube to demonstrate superior antistatic performance. The electrically conductive fluorine-containing polymer (C) can be obtained by adding an electrically conductive filler as will be subsequently described with respect to an electrically conductive layer comprising a thermoplastic resin composition containing an electrically conductive filler.

The fluorine-containing polymer (C) used in the present invention is a fluorine-containing polymer in which a functional group having reactivity with an amino group is introduced into the molecular chain thereof (to also be referred to as the fluorine-containing polymer (C)).

The fluorine-containing polymer (C) is a polymer (homopolymer or copolymer) having at least one type of repeating unit derived from a fluorine-containing monomer. There are no particular limitations thereon provided it is a fluorine-containing polymer that can be processed by hot-melting.

Here, examples of fluorine-containing monomers include tetrafluoroethylene (TFE), trifluoroethylene, polyvinylidene fluoride (VDF), vinyl fluoride (VF), chlorotrifluoroethylene (CTFE), trichlorofluoroethylene, hexafluoropropylene (HFP), $CF_2=CFOR^{f1}$ (wherein, $R^{f1}$ represents a perfluoroalkyl group having 1 to 10 carbon atoms that may contain an etheric oxygen atom), $CF_2=CF-OCH_2-R^{f2}$ (wherein, $R^{f2}$ represents a perfluoroalkylene group having 1 to 10 carbon atoms that may contain an etheric oxygen atom), $CF_2=CF(CF_2)_pOCF=CF_2$ (wherein, p is 1 or 2), and $CH_2=CX^1(CF_2)_nX^2$ (wherein, $X^1$ and $X^2$ mutually and independently represent a hydrogen atom or fluorine atom, and n is an integer of 2 to 10). One type or two or more types of these compounds can be used.

Specific examples of the aforementioned $CF_2=CFOR^{f1}$ include perfluoro(alkyl vinyl ethers) (also abbreviated as PAVE) such as $CF_2=CFOCF^2$ (perfluoro(methyl vinyl ether): PMVE), $CF_2=CFOCF_2CF_3$ (perfluoro(ethyl vinyl ether): PEVE), $CF_2=CFOCF_2CF_2CF_3$ (perfluoro(propyl vinyl ether): PPVE), $CF_2=CFOCF_2CF_2CF_2CF_3$ (perfluoro(butyl vinyl ether): PBVE) or $CF_2=CFO(CF_2)_8F$ (perfluoro(octyl vinyl ether): POVE). Among these, $CF_2=CFOCF^2$ and $CF_2=CFOCF_2CF_2CF_3$ are preferable.

n in compounds represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10) is an integer of 2 to 10 from the viewpoints of ensuring the effect of modifying the fluorine-containing polymer (such as inhibiting the formation of cracks during molding of a copolymer and in molded products thereof) and obtaining adequate polymerization reactivity. Specific examples include $CH_2=CF(CF_2)_2F$, $CH_2=CF(CF_2)_3F$, $CH_2-CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_3H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$, $CH_2=CH(CF_2)_8H$. One type of two or more types of these compounds can be used. Compounds represented by $CH_2=CH(CF_2)_nF$ or $CH_2=CF(CF_2)_nH$ are preferable, and compounds in which n is 2 to 4 in these formulas are preferable from the viewpoint of the balance between prevention of chemical permeation and resistance to cracking caused by environmental stress of the fluorine-containing polymer (C).

The fluorine-containing polymer (C) may also further contain a polymer unit based on a non-fluorine-containing monomer in addition to the aforementioned fluorine-containing monomer. Examples of non-fluorine-containing monomers include olefins having 2 to 4 carbon atoms such as ethylene, propylene or isobutene, vinyl esters such as vinyl chloride, vinylidene chloride, vinyl acetate, vinyl chloroacetate, vinyl lactate, vinyl butyrate, vinyl pivalate, vinyl benzoate, vinyl crotonate, methyl (meth)acrylate, ethyl (meth)acrylate, n-butyl (meth)acrylate or methyl crotonate, and vinyl ethers such as methyl vinyl ether (MVE), ethyl vinyl ether (EVE), butyl vinyl ether (BVE), isobutyl vinyl ether (IBVE), cyclohexyl vinyl ether (CHVE) or glycidyl vinyl ether. One type or two or more types of these compounds can be used. Among these, ethylene, propylene and vinyl acetate are preferable and ethylene is more preferable.

From the viewpoints of heat resistance, chemical resistance and prevention of chemical permeation, the fluorine-containing polymer (C) is preferably a copolymer (C1) at least comprising a vinylidene fluoride unit (VDF unit), a copolymer (C2) at least comprising a tetrafluoroethylene unit (TFE unit) and ethylene unit (E unit), a copolymer (C3) at least comprising a tetrafluoroethylene unit (TFE unit) and hexafluoropropylene unit (HFP unit) and/or PAVE unit derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom), a copolymer (C4) at least comprising a chlorotrifluoroethylene unit (CTFE unit), or a copolymer (C5) at least comprising a chlorotrifluoroethylene unit (CTFE unit) and tetrafluoroethylene unit (TFE unit).

Examples of the copolymer (C1) at least comprising a vinylidene fluoride unit (VDF unit) (to also be referred to as VDF copolymer (C1)) include:

vinylidene fluoride homopolymers (polyvinylidene fluoride (PVDF) (C1-1);

copolymers comprising a VDF unit and TFE unit, wherein the VDF unit content is 30 mol % to 99 mol % and the TFE unit content is 1 mol % to 70 mol % based on all monomers excluding the functional group-containing monomer to be subsequently described (C1-2);

copolymers comprising a VDF unit, TFE unit and trichlorofluoroethylene unit, wherein the VDF unit content is 10 mol % to 90 mol %, the TFE unit content is 0 mol % to 90 mol %, and the trichlorofluoroethylene unit content is 0 mol % to 30 mol % based on all monomers excluding the functional group-containing monomer to be subsequently described (C1-3); and, copolymers composed of a VDF unit, TFE unit and HFP unit, wherein the VDF unit content is 10 mol % to 90 mol %, the TFE unit content is 0 mol % to 90 mol %, and the HFP unit content is 0 mol % to 30 mol % based on all monomers excluding the functional group-containing monomer to be subsequently described (C1-4).

In the aforementioned copolymer (C1-4), the VDF unit content is preferably 15 mol % to 84 mol %, the TFE unit content is preferably 15 mol % to 84 mol %, and the HFP unit content is preferably 0 mol % to 30 mol % based on all monomers excluding the functional group-containing monomer to be subsequently described.

Examples of the copolymer (C2) at least comprising a tetrafluoroethylene unit (TFE unit) and ethylene unit (E unit) (to also be referred to as TFE copolymer (C2)) include copolymers in which the TFE unit content is 20 mol % or more based on all monomers excluding the functional group-containing monomer to be subsequently described, and additionally copolymers in which the TFE unit content is 20 mol % to 80 mol %, the E unit content is 20 mol % to 80 mol %, and the content of units derived from monomers capable of copolymerizing therewith is 0 mol % to 60 mol % based on all monomers excluding the functional group-containing monomer to be subsequently described.

Examples of the aforementioned copolymerizable monomers include hexafluoropropylene (HFP), those represented by the aforementioned general formula $CF_2=CFOR^{f1}$ (wherein, $R^{f1}$ represents a perfluoroalkyl group having 1 to 10 carbon atoms that may contain an etheric oxygen atom) and those represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10). One type of two or more types of these compounds can be used.

Examples of the TFE copolymer (C2) include:

copolymers comprising a TFE unit, E unit and fluoroolefin unit derived from a fluoroolefin represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10), wherein the TFE unit content is 30 mol % to 70 mol %, the E unit content is 20 mol % to 55 mol %, and the content of a fluoroolefin unit derived from a fluoroolefin represented by the general formula $CH_2=CX^3(CF_2)_nX^4$ (wherein, $X^3$ and $X^4$ mutually and independently represent a hydrogen atom or fluorine atom and n is an integer of 2 to 10) is 0 mol % to 10 mol % based on all monomers excluding the functional group-containing monomer to be subsequently described (C2-1);

copolymers comprising a TFE unit, E unit, HFP unit and unit derived from a monomer copolymerizable therewith, wherein the TFE unit content is 30 mol % to 70 mol %, the E unit content is 20 mol % to 55 mol %, the HFP unit content is 1 mol % to 30 mol % and the content of the unit derived from a monomer copolymerizable therewith is 0 mol % to 10 mol % based on all monomers excluding the functional group-containing monomer to be subsequently described (C2-2); and copolymers comprising a TFE unit, E unit and PAVE unit derived from PAVE represented by the aforementioned general formula $CF_2-CFOR^{f1}$ (wherein, $R^{f1}$ represents a perfluoroalkyl group having 1 to 10 carbon atoms that may contain an etheric oxygen atom), wherein the TFE unit content is 30 mol % to 70 mol %, the E unit content is 20 mol % to 55 mol %, and the content of the PAVE unit derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is 0 mol % to 10 mol % based on all monomers excluding the functional group-containing monomer to be subsequently described (C2-3).

Examples of the copolymer (C3) at least comprising a tetrafluoroethylene unit (TFE unit), hexafluoropropylene unit (HFP unit) and/or PAVE unit derived from PAVE represented by the aforementioned general formula $CF_2-CFOR^{f1}$ (wherein, $R^{f1}$ represents a perfluoroalkyl group having 1 to 10 carbon atoms that may contain an etheric oxygen atom) (to also be referred to as TFE polymer (C3)) include:

copolymers comprising a TFE unit and HFP unit, wherein the TFE unit content is 70 mol % to 95 mol % and preferably 85 mol % to 93 mol %, and the HFP unit content is 5 mol % to 30 mol % and preferably 7 mol % to 15 mol % based on all monomers excluding the functional group-containing monomer to be subsequently described (C3-1);

copolymers comprising a TFE unit and one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom), wherein the TFE unit content is 70 mol % to 95 mol % and the content of one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is 5 mol % to 30 mol % (C3-2); and, copolymers comprising a TFE unit, HFP unit and one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom), wherein the TFE unit content is 70 mol % to 95 mol % and the total content of the HFP unit and the one type or two or more types of PAVE units derived from PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is 5 mol % to 30 mol % (C3-3).

A copolymer at least comprising a chlorotrifluoroethylene unit (CTFE unit) refers to a chlorotrifluoroethylene copolymer that has a CTFE unit ($-CFCl-CF_2-$) and is composed of an ethylene unit (E unit) and/or fluorine-containing monomer unit (to also be referred to as CTFE copolymer (C4)).

There are no particular limitations on the fluorine-containing monomer in the aforementioned CTFE copolymer (C4) provided it is not CTFE, and examples thereof include vinylidene fluoride (VDF), hexafluoropropylene (HFP), PAVE represented by the aforementioned general formula $CF_2=CFOR^{f1}$ (wherein, $R^{f1}$ represents a perfluoroalkyl group having 1 to 10 carbon atoms that may contain an etheric oxygen atom), and fluoroolefins represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10). One type or two or more types of these compounds can be used.

There are no particular limitations on the CTFE copolymer (C4), and examples thereof include CTFE-PAVE copolymers, CTFE-VDF copolymers, CTFE-HFP copolymers, CTFE-E copolymers, CTFE-PAVE-E copolymers, CTFE-VDF-E copolymers and CTFE-HFP-E copolymers.

The content of the CTFE unit in the CTFE copolymer (C4) is preferably 15 mol % to 70 mol % and more preferably 18 mol % to 65 mol % based on all monomers excluding the functional group-containing monomer to be subsequently described. On the other hand, the content of the E unit and/or fluorine-containing monomer unit is preferably 30 mol % to 85 mol % and more preferably 35 mol % to 82 mol %.

A copolymer at least comprising a chlorotrifluoroethylene unit (CTFE unit) and tetrafluoroethylene unit (TFE) unit refers to a chlorotrifluoroethylene copolymer (C5) comprising a CTFE unit ($-CFCl-CF_2-$), TFE unit ($-CF_2-CF_2-$) and a monomer unit copolymerizable with CTFE and TFE (to also be referred to as CTFE-TFE copolymer (C5)).

There are no particular limitations on the copolymerizable monomer in the aforementioned CTFE-TFE copolymer (C5) provided it is not CTFE or TFE, and examples thereof include vinylidene fluoride (VDF), hexafluoropropylene (HFP), PAVE represented by the aforementioned general formula $CF_2=CFOR^{f1}$ (wherein, $R^{f1}$ represents a perfluoroalkyl group having 1 to 10 carbon atoms that may contain an etheric oxygen atom), fluorine-containing monomers such as fluoroolefins represented by the aforementioned general formula $CH_2=CX^1(CF_2)_nX^2$ (wherein, $X^1$ and $X^2$ mutually and independently represent a hydrogen atom or fluorine atom, and n is an integer of 2 to 10), and non-fluorine-containing monomers such as olefins having 2 to 4 carbon atoms such as ethylene, propylene or isobutene, vinyl esters such as vinyl acetate, methyl (meth)acrylate or ethyl (meth)acrylate, or vinyl ethers such as methyl vinyl ether (MVE), ethyl vinyl ether (EVE) or butyl vinyl ether (BVE). One type or two or more types of these compounds can be used. Among these, PAVE represented by the aforementioned general formula $CF_2=CFOR^{f1}$ (wherein, $R^{f1}$ represents a perfluoroalkyl group having 1 to 10 carbon atoms that may contain an etheric oxygen atom) is preferable, perfluoro(methyl vinyl ether) (PMVE) and perfluoro(propyl vinyl ether) (PPVE) are more preferable, and PPVE is even more preferable from the viewpoint of ensuring adequate heat resistance.

There are no particular limitations on the CTFE-TFE copolymer (C5), and examples thereof include CTFE-TFE copolymers, CTFE-TFE-HFP copolymers, CTFE-TFE-VDF copolymers, CTFE-TFE-PAVE copolymers, CTFE-TFE-E copolymers, CTFE-TFE-HFP-PAVE copolymers and CTFE-TFE-VDF-PAVE copolymers. Among these, CTFE-TFE-PAVE copolymers and CTFE-TFE-HFP-PAVE copolymers are preferable.

The total content of the CTFE unit and TFE unit in the CTFE-TFE copolymer (C5) is preferably 90 mol % to 99.9 mol %, and the content of the aforementioned monomer unit polymerizable with CTFE and TFE is preferably 0.1 mol % to 10 mol % based on all monomers excluding the functional group-containing monomer to be subsequently described from the viewpoints of ensuring favorable moldability, resistance to cracking caused by environmental stress, prevention of chemical permeation, heat resistance and mechanical properties.

The content of the CTFE unit in the CTFE-TFE copolymer (C5) is preferably 15 mol % to 80 mol %, more preferably 17 mol % to 70 mol %, and even more preferably 19 mol % to 65 mol % based on a value of 100% for the total amount of the aforementioned CTFE unit and TFE unit from the viewpoints of ensuring favorable moldability, resistance to cracking caused by environmental stress and prevention of chemical permeation.

In the CTFE-FTE copolymer (C5), in the case the aforementioned monomer polymerizable with CTFE and FTE is PAVE, the content of the PAVE unit is preferably 0.5 mol % to 7.0 mol % and more preferably 1.0 mol % to 5.0 mol % based on all monomers excluding the functional group-containing monomer to be subsequently described.

In the CTFE-FTE copolymer (C5), in the case the aforementioned monomer polymerizable with CTFE and TFE is HFP and PAVE, the total content of the HFP unit and PAVE unit is preferably 0.5 mol % to 7.0 mol % and more preferably 1.0 mol % to 5.0 mol % based on all monomers excluding the functional group-containing monomer to be subsequently described.

TFE copolymer (C3), CTFE copolymer (C4) and CTFE-TFE copolymer (C5) demonstrate superior prevention of chemical permeation and have significantly superior barrier properties with respect to alcohol-containing gasoline. The permeability coefficient with respect to alcohol-containing gasoline is the value that is calculated from the change in mass as measured at 60° C. by placing a sheet obtained from the resin to be measured in a permeability coefficient measuring cup containing a mixed solvent of isooctane, toluene and ethanol mixed at a volume ratio of isooctane:toluene:ethanol of 45:45:10. The gasoline-containing alcohol permeability coefficient of the TFE copolymer (C3), CTFE copolymer (C4) and CTFE-TFE copolymer (C5) is preferably 1.5 g·mm/(mm²·day) or less, more preferably 0.01 g·mm/(mm²·day) to 1.0 g·mm/(mm²·day), and even more preferably 0.02 g·mm/(mm²·day) to 0.8 g·mm/(mm²·day).

The fluorine-containing polymer (C) used in the present invention can be obtained by (co)polymerizing a monomer composing the polymer by a conventional polymerization method. Among these, radical polymerization is used primarily. Namely, there are no particular limitations on the means used to initiate polymerization provided it allows radical polymerization to proceed, and polymerization is initiated by, for example, an organic or inorganic radical polymerization initiator, heat, light or ionizing radiation.

There are no particular limitations on the method used to produce the fluorine-containing polymer (C), and a polymerization method is used that uses a commonly used radical polymerization initiator. A known polymerization method can be used, examples of which include block polymerization, solution polymerization using an organic solvent such as a fluorohydrocarbon, chlorohydrocarbon, fluorochlorohydrocarbon, alcohol or hydrocarbon, suspension polymerization using an aqueous medium and suitable organic solvent as necessary, and emulsification polymerization using an aqueous medium and an emulsifier.

In addition, polymerization can be carried out by batch or continuous procedure using a single-tank or multi-tank stirring-type polymerization reactor or tubular polymerization reactor.

The 10 hour half-life decomposition temperature of the radical polymerization initiator is preferably 0° C. to 100° C. and more preferably 20° C. to 90° C. Specific examples thereof include azo compounds such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile] or 4,4'-azobis(4-cyanopentanoic acid), hydroperoxides such as hydrogen peroxide, t-butyl hydroperoxide or cumene hydroperoxide, dialkyl peroxides such as di-t-butyl peroxide or dicumyl peroxide, non-fluorine-based dialkyl peroxides such as acetyl peroxide, isobutyryl peroxide, octanoyl peroxide, benzoyl peroxide or lauroyl peroxide, ketone peroxides such as methyl ethyl ketone peroxide or cyclohexanone peroxide, peroxydicarbonates such as diisopropyl peroxydicarbonate, peroxyesters such as t-butyl peroxypivalate, t-butyl peroxyisobutyrate or t-butyl peroxyacetate, fluorine-containing diacylperoxides such as compounds represented by $(Z(CF_2)_p(COO))_2$ (wherein, Z represents a hydrogen atom, fluorine atom or chlorine atom, and p is an integer of 1 to 10), and inorganic peroxides such as potassium persulfate, sodium persulfate or ammonium persulfate. One type or two or more types of these compounds can be used.

In addition, when producing the fluorine-containing polymer (C), an ordinary chain transfer agent is preferably used to adjust molecular weight. Examples of chain transfer agents include alcohols such as methanol or ethanol, chlorofluorohydrocarbons such as 1,3-dichloro-1,1,2,2,3-pentafluoropropane, 1,1-dichloro-1-fluoroethane, 1,2-dichloro-1,1,2,2-tetrafluoroethane, 1,1-dichloro-1-fluoroethane or 1,1,2-trichloro-1,2,2-trifluoroethane, hydrocarbons such as pentane, hexane or cyclohexane, and chlorohydrocarbons such as carbon tetrachloride, chloroform, methylene chloride or methyl chloride. One type or two or more types of these compounds can be used.

There are no particular limitations on the polymerization conditions, and the polymerization temperature is preferably 0° C. to 100° C. and more preferably 20° C. to 90° C. In general, a low temperature is preferable to avoid decreases in heat resistance attributable to the formation of ethylene-ethylene chains in the polymer. Although suitably determined corresponding to the type and amount of solvent used, vapor pressure, polymerization temperature and other polymerization conditions, polymerization pressure is preferably 0.1 MPa to 10 MPa and more preferably 0.5 MPa to 3 MPa. Polymerization time is preferably 1 hour to 30 hours.

In addition, although there are no particular limitations on the molecular weight of the fluorine-containing polymer (C), the polymer is preferably a solid at room temperature, and the polymer per se can be used as a thermoplastic resin or elastomer and the like. In addition, molecular weight is controlled by the concentration of monomer used in polymerization, concentration of the polymerization initiator, concentration of the chain transfer agent and temperature.

In the case the fluorine-containing polymer (C) is co-extruded with the aforementioned aliphatic polyamide composition (A) and semi-aromatic polyamide composition (B) and the like, in order to ensure adequate melt stability over a kneading temperature range and molding temperature range that do not cause significant deterioration thereof, the melt flow rate at a temperature 50° C. higher than the melting point of the fluorine-containing polymer (C) and at a load of 5 kg is preferably 0.5/10 minutes to 200 g/10 minutes and more preferably 1 g/10 minutes to 100 g/10 minutes.

In addition, the melting point and glass transition point of the fluorine-containing polymer (C) can be adjusted by selecting the type, composite ratio and so forth of the fluorine-containing monomer and other monomers. Although the melting point of the fluorine-containing monomer (C) is suitably selected according to the purpose, application and usage method, in the case of co-extruding with the aforementioned aliphatic polyamide composition (A), semi-aromatic polyamide composition (B) and the like, the melting point is preferably close to the molding temperature of the resin. Consequently, the melting point of the fluorine-containing polymer (C) is preferably optimized by suitably adjusting the ratios of the aforementioned fluorine-containing monomer, non-fluorine-containing monomer and functional group-containing monomer to be subsequently described. The melting point of the fluorine-containing polymer (C) is preferably 150° C. to 320° C., more preferably 170° C. to 310° C. and eve more preferably 180° C. to 300° C. from the viewpoints of ensuring adequate heat-melting stability when co-extruding with the aliphatic polyamide composition (A) and semi-aromatic polyamide composition (B) as well as adequate continuous moldability, heat resistance of the fluorine-containing polymer (C), chemical resistance and prevention of chemical permeation.

Here, melting point is defined as the temperature of the peak value of a melting curve measured by using a differential scanning calorimeter and heating a sample to a temperature equal to or higher than the predicted melting point, cooling the sample to 30° C. by lowering the temperature at the rate of 10° C. per minute and allowing to stand for 1 minute, and then raising the temperature at the rate of 10° C. per minute for 1 minute.

The fluorine-containing polymer (C) used in the present invention has a functional group having reactivity with an amino group within the molecular structure thereof, and the functional group may be contained in the molecular terminal, side chain or main chain of the fluorine-containing polymer (C). In addition, the functional group may be used alone in the fluorine-containing polymer (C) or two or more types of functional groups may be used in combination. The type and content of the functional group is suitably determined according to the type, shape and application of the counter material adhered to the fluorine-containing polymer (C), the required level of interlayer adhesion, adhesion method, functional group introduction method and the like.

Examples of functional groups having reactivity with an amino group include at least one type selected from the group consisting of a carboxyl group, acid anhydride group or carboxylate, hydroxyl group, sulfo group or sulfonate, epoxy group, cyano group, carbonate group and haloformyl group. At least one type selected from the group consisting of a carboxyl group, acid anhydride groups or carboxylate, epoxy group, carbonate group and haloformyl group is particularly preferable.

Examples of methods used to introduce the functional group having reactivity with an amino group into the fluorine-containing polymer (C) include: (i) a method of copolymerizing a copolymerizable monomer having a functional group when polymerizing the fluorine-containing polymer (C), (ii) a method of introducing a functional group into the molecular terminal of the fluorine-containing polymer (C) during polymerization by using a polymerization initiator or chain transfer agent and the like, and (iii) a method of grafting a compound having a functional group, which enables grafting of a functional group having reactivity with an amino group (grafting compound), to the fluorine-containing polymer. These introduction methods may be used alone or may be suitably used in combination. In the case of considering interlayer adhesion in the multi-layer tube, the fluorine-containing polymer (C) is preferably produced according to the aforementioned method (i) or (ii). The production methods proposed by Japanese Unexamined Patent Publication No. H7-18035, Japanese Unexamined Patent Publication No. H7-25952, Japanese Unexamined Patent Publication No. H7-25954, Japanese Unexamined Patent Publication No. H7-173230, Japanese Unexamined Patent Publication No. H7-173446, Japanese Unexamined Patent Publication No. H7-173447 and Japanese Unexamined Patent Publication No. H10-503236 should be referred to with respect to method (iii). The contents of these unexamined patent publications are incorporated in the present description in their entirety by reference. The following provides an explanation of method (i) of copolymerizing a copolymerizable monomer having a functional group when polymerizing a fluorine-containing polymer, and method (ii) of introducing a functional group into the molecular terminal of a fluorine-containing polymer by using a polymerization initiator and the like.

In the method of copolymerizing a copolymerizable monomer having a functional group (to also be abbreviated as the functional group-containing monomer) when producing the fluorine-containing polymer (C), a functional group-containing monomer containing at least one type of functional group selected from the group consisting of a carboxyl group, acid anhydride group or carboxylate, hydroxyl group, sulfo group or sulfonate, epoxy group and cyano group is used for the polymerized monomer. Examples of functional group-containing monomers include functional group-containing and non-fluorine-containing monomers and functional group-containing and fluorine-containing monomers.

Examples of functional group-containing and non-fluorine-containing monomers include unsaturated carboxylic acids and ester derivatives thereof such as acrylic acid, halogenated acrylic acids (excluding fluoroacrylic acid), methacrylic acid, halogenated methacrylic acids (excluding fluoromethacrylic acid), maleic acid, halogenated maleic acids (excluding fluoromaleic acid), fumaric acid, halogenated fumaric acids (excluding fluorofumaric acid), itaconic acid, citraconic acid, crotonic acid or endobicyclo-[2.2.1]-5-heptene-2,3-dicarboxylic acid, carboxyl group-containing monomers such as maleic anhydride, itaconic anhydride, succinic anhydride, citraconic anhydride or endobicyclo-[2.2.1]-5-heptene-2,3-dicarboxylic anhydride (5-norbornene-2,3-dicarboxylic anhydride), and epoxy group-containing monomers such as glycidyl acrylate, glycidyl methacrylate or glycidyl ether. One type or two or more types of these compounds can be used. The functional group-containing and non-fluorine-containing monomer is determined in consideration of copolymerization reactivity with the fluorine-containing monomer used. Selection of a suitable functional group-containing and non-fluorine-containing monomer allows polymerization to proceed favorably and facilitates uniform introduction of the functional group-containing and non-fluorine-containing monomer into the main chain, and as a result thereof, offers the advantage of being able to reduce the levels of unreacted monomer and impurities.

Examples of functional group-containing and fluorine-containing monomers include unsaturated compounds represented by the general formula $CX^3=CX^4-(R^1)_n-Y$ (wherein, Y represents a functional group selected from the group consisting of $-OH$, $-CH_2OH$, $-COOM$ (wherein, M represents a hydrogen atom or alkaline metal), carboxyl group-derived group, $-SO_3M$ (wherein, M represents a hydrogen atom or alkaline metal), sulfonic acid-derived group, epoxy group and $-CN$, $X^3$ and $X^4$ may be the same or different and represent hydrogen atoms or fluorine atoms (provided that in the case $X^3$ and $X^4$ are both hydrogen atoms, n=1 and $R^1$ includes a fluorine atom), and $R^1$ represents an alkylene group having 1 to 40 carbon atoms, fluorine-containing oxyalkylene group having 1 to 40 carbon atoms, fluorine-containing alkylene group having 1 to 40 carbon atoms and having an ether bond, or fluorine-containing oxyalkylene group having 1 to 40 carbon atoms and having an ether bond, and n is 0 or 1).

Examples of carboxyl group-derived groups represented by Y in the aforementioned general formula include groups represented by the general formula $-C(=O)Q^1$ (wherein, $Q^1$ represents $-OR^2$, $-NH_2$, F, Cl, Br or I, and $R^2$ represents an alkyl group having 1 to 20 carbon atoms or an aryl group having 6 to 22 carbon atoms).

Examples of sulfonic acid-derived groups represented by Y in the aforementioned general formula include groups represented by the general formula $-SO_2Q^2$ (wherein, $Q^2$ represents $-OR^3$, $-NH_2$, F, Cl, Br or I, and $R^3$ represents an alkyl group having 1 to 20 carbon atoms or an aryl group having 6 to 22 carbon atoms).

The aforementioned Y preferably represents $-COOH$, $-CH_2OH$, $-SO_3H$, $-SO_3Na$, $-SO_2F$ or $-CN$.

Examples of functional group-containing and fluorine-containing monomers in the case, for example, the functional group has a carbonyl group, include perfluoroacrylic acid fluoride, 1-perfluoroacrylic acid fluoride, acrylic acid fluoride, 1-trifluoromethacrylic acid fluoride and perfluorobutenoic acid. One type or two or more types of these compounds can be used.

The content of the functional group-containing monomer in the fluorine-containing polymer (C) is preferably 0.05 mol % to 20 mol %, more preferably 0.05 mol % to 10 mol %, and even more preferably 0.1 mol % to 5 mol % from the viewpoints of ensuring adequate interlayer adhesion, ensuring adequate heat resistance without inviting a decrease in interlayer adhesion attributable to usage and environmental conditions, and preventing the occurrence of defective adhesion, coloring and foaming when processing at high temperatures as well as the occurrence of separation, coloring, foaming and elution attributable to decomposition during use at high temperatures. If the content of the functional group-containing monomer is within the aforementioned ranges, there are no decreases in the polymerization rate during production and the fluorine-containing polymer (C) demonstrates superior adhesion to counter material. There are no particular limitations on the method used to add the functional group-containing monomer, and it may be added all at once at the start of polymerization or may be added continuously during the course of polymerization. Although the addition method is suitably selected according to the decomposition reactivity of the polymerization initiator and the polymerization temperature, during polymerization the amount of functional group-containing monomer that is consumed is preferably supplied to the polymerization tank either continuously or intermittently as the amount thereof is consumed by polymerization to maintain the concentration of the functional group-containing monomer within this range.

In addition, as long as the aforementioned contents are satisfied, the fluorine-group containing polymer may be a mixture of a fluorine-containing polymer having a functional group introduced therein and a fluorine-containing polymer not having a functional group introduced therein.

In the method (ii) of introducing a functional group into the molecular terminal of a fluorine-containing polymer by using a polymerization initiator and the like, the functional group is introduced into one terminal or both terminals of the molecular chain of the fluorine-containing polymer. The functional group introduced into the terminal is preferably a carbonate group or haloformyl group.

The carbonate group introduced as a terminal group of the fluorine-containing polymer (C) is typically a group having a —OC(=O)O— bond, and specific examples thereof include those having the structure of an —OC(=O)O—$R^4$ group (wherein, $R^4$ represents a hydrogen group, organic group (such as an alkyl group having 1 to 20 carbon atoms or alkyl group having 2 to 20 carbon atoms and an ether bond), or an element of group I, II or VII), such as —OC(=O)OCH$_3$, —OC(=O)OC$_3$H$_7$, —OC(=O)OC$_8$H$_{17}$ or —OC(=O)OCH$_2$CH$_2$OCH$_2$CH$_3$. The haloformyl group specifically has a structure represented by —COZ (wherein, Z represents a halogen atom), and examples thereof include —COF and —COCl. One type or two or more types of these compounds can be used.

In addition, although various methods using a polymerization initiator or chain transfer agent can be employed to introduce a carbonate group onto the molecular terminal of a polymer, a method using a peroxide, and particularly a peroxycarbonate or peroxyester, as a polymerization initiator can be used preferably from the viewpoint of performance in terms of economy, heat resistance, chemical resistance and the like. According to this method, a carbonate group derived from peroxycarbonate, an ester group derived from peroxyester, or a haloformyl group obtained by converting these functional groups can be introduced onto the polymer terminal. Among these polymerization initiators, the use of peroxycarbonate is more preferable since it allows the polymerization temperature to be lowered and the initiation reaction is not accompanied by side reactions.

Although various methods can be employed to introduce a haloformyl group onto the molecular terminal of a polymer, a haloformyl group can be introduced by heating the carbonate group of a fluorine-containing polymer having a carbonate group on a terminal thereof as previously described to cause the carbonate group to undergo thermal decomposition (decarboxylation).

Examples of peroxycarbonates include diisopropyl peroxycarbonate, di-n-propyl peroxycarbonate, t-butyl peroxyisopropyl carbonate, t-butyl peroxymethacryloyloxyethyl carbonate, bis(4-t-butylcyclohexyl) peroxycarbonate and di-2-ethylhexyl peroxycarbonate. One type or two or more types of these compounds can be used.

Although varying according to the type (composition, etc.) and molecular weight of the target polymer, polymerization conditions and type of initiator used, the amount of peroxycarbonate used is preferably 0.05 parts by weight to 20 parts by weight and more preferably 0.1 parts by weight to 10 parts by weight based on 100 parts by weight of all polymers obtained by polymerization from the viewpoints of properly controlling the polymerization rate and ensuring an adequate polymerization rate. The content of the carbonate group on a molecular terminal of the polymer can be controlled by adjusting polymerization conditions. There are no particular limitations on the method used to add the polymerization initiator, and it may be added all at once at the start of polymerization or may be added continuously during the course of polymerization. The addition method is suitably selected according to the decomposition reactivity of the polymerization initiator and the polymerization temperature.

The number of terminal functional groups per $10^6$ main chain carbon atoms in the fluorine-containing polymer (C) is preferably 150 to 3,000, more preferably 200 to 2,000 and even more preferably 300 to 1,000 from the viewpoints of ensuring adequate interlayer adhesion, ensuring adequate heat resistance without inviting a decrease in interlayer adhesion attributable to usage and environmental conditions, and preventing the occurrence of defective adhesion, coloring and foaming when processing at high temperatures as well as the occurrence of separation, coloring, foaming and elution attributable to decomposition during use at high temperatures. In addition, as long as the aforementioned number of functional groups is satisfied, the fluorine-containing polymer may be a mixture of a fluorine-containing polymer having a functional group introduced therein and a fluorine-containing polymer not having a functional group introduced therein.

As has been described above, the fluorine-containing polymer (C) used in the present invention is a fluorine-containing polymer that is introduced with a functional group having reactivity with an amino group. As previously described, the fluorine-containing polymer (C) introduced with a functional group per se is able to maintain superior properties unique to fluorine-containing polymers such as heat resistance, water resistance, low friction, chemical resistance, weather resistance, antifouling or prevention of chemical permeation, and is also advantageous in terms of productivity and cost.

Moreover, as a result of containing a functional group having reactivity with an amino group in the molecular chain thereof, superior interlayer adhesion with various other materials for which interlayer adhesion was inadequate or impossible can be imparted directly to a multi-layer tube without having to carry out surface treatment or other special treatment and without having to coat with an adhesive resin and the like.

Various additives such as inorganic fillers, glass fibers, carbon fibers, metal oxide or carbon can be added to the fluorine-containing polymer (C) used in the present invention corresponding to the purpose or application within a range that does not impair the performance thereof. In addition, pigment, ultraviolet absorber and other optional additives can be mixed in addition to filler. Other resins such as fluorine-based resins or thermoplastic resins or synthetic rubber and the like can also be added in addition to these additives, thereby making it possible to improve mechanical properties, improve weather resistance, impart design properties, prevent static electricity or improve moldability and the like.

Examples of other thermoplastic resins other than the fluorine-containing polymer (C), which are other than the aliphatic polyamide (A1) and semi-aromatic polyamide (B1) defined in the present invention, include poly(meta-xylene adipamide) (Polyamide MXD6), poly(meta-xylene suberamide) (Polyamide MXD8), poly(meta-xylene azelamide) (Polyamide MXD9), poly(meta-xylene sebacamide) (Polyamide MXD10), poly(meta-xylene dodecamide) (Polyamide MXD12), poly(meta-xylene terephthalamide) (Polyamide MXDT), poly(meta-xylene isophthalamide) (Polyamide MXDI), poly(meta-xylene hexahydroterephthalamide) (Polyamide MXDT(H)), poly(meta-xylene naphthalamide) (Polyamide MXDN), poly(para-xylene adipamide) (Polyamide PXD6), poly(para-xylene suberamide) (Polyamide PXD8), poly(para-xylene azelamide) (Polyamide PXD9), poly(para-xylene sebacamide) (Polyamide PXD10), poly(para-xylene dodecamide) (Polyamide PXD12), poly(para-xylene terephthalamide) (Polyamide PXDT), poly(para-xylene isophthalamide) (Polyamide PXDI), poly(para-xylene hexahydroterephthalamide) (Polyamide PXDT(H)), poly(para-xylene naphthalamide) (Polyamide PXDN), poly(para-phenylene terephthalamide) (Polyamide PPTA), poly(para-phenylene isophthalamide) (Polyamide PPIA), poly(meta-phenylene terephthalamide) (Polyamide PMTA), poly(meta-phenylene isophthalamide) (Polyamide PMIA), poly(2,6-naphthalenedimethylene adipamide) (Polyamide 2,6-BANG), poly(2,6-naphthalenedimethylene suberamide) (Polyamide 2,6-BANS), poly(2,6-naphthalenedimethylene azelamide) (Polyamide 2,6-BAN9), poly(2,6-naphthalenedimethylene sebacamide) (Polyamide 2,6-BAN10), poly(2,6-naphthalenedimethylene dodecamide) (Polyamide 2,6-BAN12), poly(2,6-naphthalenedimethylene terephthalamide) (Polyamide 2,6-BANT), poly(2,6-naphthalenedimethylene isophthalamide) (Polyamide 2,6-BANI), poly(2,6-naphthalenedimethylene hexahydroterephthalamide) (Polyamide 2,6-BANT(H)), poly(2,6-naphthalenedimethylene naphthalamide) (Polyamide 2,6-BANN), poly(1,3-cyclohexanedimethylene adipamide) (Polyamide 1,3-BAC6), poly(1,3-cyclohexanedimethylene suberamide) (Polyamide 1,3-BAC8), poly(1,3-cyclohexanedimethylene azelamide) (Polyamide 1,3-BAC9), poly(1,3-cyclohexanedimethylene sebacamide) (Polyamide 1,3-BAC10), poly(1,3-cyclohexanedimethylene dodecamide) (Polyamide 1,3-BAC12), poly(1,3-cyclohexanedimethylene terephthalamide) (Polyamide 1,3-BACT), poly(1,3-cyclohexanedimethylene isophthalamide) (Polyamide 1,3-BACI), poly(1,3-cyclohexanedimethylene hexahydroterephthalamide) (Polyamide 1,3-BACT(H)), poly(1,3-cyclohexanedimethylene naphthalamide) (Polyamide 1,3-BACN), poly(1,4-cyclohexanedimethylene adipamide) (Polyamide 1,4-BAC6), poly(1,4-cyclohexanedimethylene suberamide) (Polyamide 1,4-BAC8), poly(1,4-cyclohexanedimethylene azelamide) (Polyamide 1,4-BAC9), poly(1,4-cyclohexanedimethylene sebacamide) (Polyamide 1,4-BAC10), poly(1,4-cyclohexanedimethylene dodecamide) (Polyamide 1,4-BAC12), poly(1,4-cyclohexanedimethylene terephthalamide) (Polyamide 1,4-BACT), poly(1,4-cyclohexanedimethylene isophthalamide) (Polyamide 1,4-BACI), poly(1,4-cyclohexanedimethylene hexahydroterephthalamide) (Polyamide 1,4-BACT(H)), poly(1,4-cyclohexanedimethylene naphthalamide) (Polyamide 1,4-BACN), poly(4,4'-methylenebiscyclohexylene adipamide) (Polyamide PACM6), poly(4,4'-methylenebiscyclohexylene suberamide) (Polyamide PACM8), poly(4,4'-methylenebiscyclohexylene azelamide) (Polyamide PACM9), poly(4,4'-methylenebiscyclohexylene sebacamide) (Polyamide PACM10), poly(4,4'-methylenebiscyclohexylene dodecamide) (Polyamide PACM12), poly(4,4'-methylenebiscyclohexylene tetradecamide) (Polyamide PACM14), poly(4,4?-methylenebiscyclohexylene hexadecamide) (Polyamide PACM16), poly(4,4'-methylenebiscyclohexylene octadecamide) (Polyamide PACM18), poly(4,4'-methylenebiscyclohexylene terephthalamide) (Polyamide PACMT), poly(4,4'-methylenebiscyclohexylene isophthalamide) (Polyamide PACMI), poly(4,4'-methylenebiscyclohexylene hexahydroterephthalamide) (Polyamide PACMT(H)), poly(4,4'-methylenebiscyclohexylene naphthalamide) (Polyamide PACMN), poly(4,4'-methylenebis(2-methyl-cyclohexylene) adipamide) (Polyamide MACM6), poly(4,4'-methylenebis(2-methyl-cyclohexylene) suberamide) (Polyamide MACM8), poly(4,4'-methylenebis(2-methyl-cyclohexylene) azelamide) (Polyamide MACM9), poly(4,4'-methylenebis(2-methyl-cyclohexylene) sebacamide) (Polyamide MACM10), poly(4,4'-methylenebis(2-methyl-cyclohexylene) dodecamide) (Polyamide MACM12), poly(4,4'-methylenebis(2-methyl-cyclohexylene) tetradecamide) (Polyamide MACM14), poly(4,4'-methylenebis(2-methyl-cyclohexylene) hexadecamide) (Polyamide MACM16), poly(4,4'-methylenebis(2-methyl-cyclohexylene) octadecamide) (Polyamide MACM18), poly(4,4'-methylenebis(2-methyl-cyclohexylene) terephthalamide) (Polyamide MACMT), poly(4,4'-methylenebis(2-methyl-cyclohexylene) isophthalamide) (Polyamide MACMI), poly(4,4'-methylenebis(2-methyl-cyclohexylene) hexahydroterephthalamide) (Polyamide MACMT(H)), poly(4,4'-methylenebis(2-methyl-cyclohexylene) naphthalamide) (Polyamide MACMN), poly(4,4'-propylenebiscyclohexylene adipamide) (Polyamide PACP6), poly(4,4'-propylenebiscyclohexylene suberamide) (Polyamide PACP8), poly(4,4'-propylenebiscyclohexylene azelamide) (Polyamide PACP9), poly(4,4'-propylenebiscyclohexylene sebacamide) (Polyamide PACP10), poly(4,4'-propylenebiscyclohexylene dodecamide) (Polyamide PACP12), poly(4,4'-propylenebiscyclohexylene tetradecamide) (Polyamide PACP14), poly(4,4'-propylenebiscyclohexylene hexadecamide) (Polyamide PACP16), poly(4,4'-propylenebiscyclohexylene octadecamide) (Polyamide PACP18), poly(4,4'-propylenebiscyclohexylene terephthalamide) (Polyamide PACPT), poly(4,4'-propylenebiscyclohexylene isophthalamide) (Polyamide PACPI), poly(4,4'-propylenebiscyclohexylene hexahydroterephthalamide) (Polyamide PACPT(H)), poly(4,4'-propylenebiscyclohexylene naphthalamide) (Polyamide PACPN), poly(isophorone adipamide) (Polyamide IPD6), poly(isophorone suberamide) (Polyamide IPD8), poly(isophorone azelamide) (Polyamide IPD9), poly(isophorone sebacamide) (Polyamide poly(isophorone dodecamide) (Polyamide IPD12), poly(isophorone terephthalamide) (Polyamide IPDT), poly(isophorone isophthalamide) (Polyamide IPDI), poly(isophorone hexahydroterephthalamide) (Polyamide IPDT(H)), poly(isophorone naphthalamide) (Polyamide IPDN), poly(tetramethylene terephthalamide) (Polyamide 4T), poly(tetramethylene isophthalamide) (Polyamide 4I), poly(tetramethylene hexahydroterephthalamide) (Polyamide (4T(H)), poly(tetramethylene naphthalamide) (Polyamide 4N), poly(pentamethylene terephthalamide) (Polyamide 5T), poly(pentamethylene isophthalamide) (Polyamide 5I), poly(pentamethylene hexahydroterephthalamide) (Polyamide 5T(H)), poly(pentamethylene naphthalamide) (Polyamide 5N), poly(hexamethylene terephthalamide) (Polyamide 6T), poly(pentamethylene isophthalamide) (Polyamide 6I), poly(pentamethylene hexahydroterephthalamide) (Polyamide 6T(H)), poly(pentamethylene naphthalamide) (Polyamide 6N), poly(2-methylpentamethylene terephthalamide) (Polyamide M5T), poly(2-methylpentamethylene isophthalamide) (Polyamide M5I), poly(2-methylpentamethylene hexahydroterephthalamide) (Polyamide M5T(H)), poly(2-methylpentamethylene naphthalamide) (Polyamide M5N), poly(nonamethylene isophthalamide) (Polyamide 9I), poly(nonamethylene hexahydroterephthalamide (Polyamide 9T(H)), poly(2-methyloctamethylene isophthalamide) (Polyamide M8I), poly(2-methyloctamethylene hexahydroterephthalamide) (Polyamide M8T(H)), poly(trimethylhexamethylene terephthalamide) (Polyamide TMHT), poly(trimethylhexamethylene isophthalamide) (Polyamide TMHI), poly(trimethylhexamethylene hexahydroterephthalamide) (Polyamide TMHT(H)), poly(trimethylhexamethylene naphthalamide) (Polyamide TMHN), poly(decamethylene terephthalamide) (Polyamide 10T), poly(decamethylene isophthalamide) (Polyamide 10I), poly(decamethylene hexahydroterephthalamide) (Polyamide 10T(H)), poly(decamethylene naphthalamide) (Polyamide 10N), poly(undecamethylene terephthalamide) (Polyamide 11T), poly(undecamethylene isophthalamide) (Polyamide 11I), poly(undecamethylene hexahydroterephthalamide (Polyamide 11T(H)), poly(undecamethylene naphthalamide) (Polyamide 11N), poly(dodecamethylene terephthalamide) (Polyamide 12T), poly(dodecamethylene isophthalamide) (Polyamide 12I), poly(dodecamethylene hexahydroterephthalamide) (Polyamide 12T(H)), poly(dodecamethylene naphthalamide) (Polyamide 12N) and copolymers using a plurality of types of raw materials of these polyamide and/or raw materials of the aforementioned aliphatic polyamide (A1).

Examples of fluorine-containing polymers other than those defined in the present invention (here, other than those defined in the present invention refer to fluorine-containing polymers not containing a functional group having reactivity with an amino group) include fluorine-containing polymers such as polyvinylidene fluoride (PVDF), polyvinyl fluoride (PVF), polytetrafluoroethylene (PTFE), polychlorotrifluoroethylene (PCTFE), tetrafluoroethylene-perfluoro(alkylvinylether) copolymer (PFA), tetrafluoroethylene-hexafluoropropylene copolymer (FEP), tetrafluoroethylene-perfluoro(alkylvinylether)-hexafluoropropylene copolymer, ethylene-tetrafluoroethylene copolymer (ETFE), ethylene-tetrafluoroethylene-hexafluoropropylene copolymer (EFEP), vinylidene fluoride-tetrafluoroethylene copolymer, vinylidene fluoride-hexafluoropropylene copolymer, vinylidene fluoride-perfluoro(alkylvinylether) copolymer, tetrafluoroethylene-hexafluoropropylene-vinylidene fluoride copolymer (THV), vinylidene fluoride-perfluoro(alkylvinylether)-tetrafluoroethylene copolymer, tetrafluoroethylene-hexafluoropropylene-vinylidene fluoride-perfluoro(alkylvinylether) copolymer, ethylene-chlorotrifluoroethylene copolymer (ECTFE), chlorotrifluoroethylene-tetrafluoroethylene copolymer, vinylidene fluoride-chlorotrifluoro ethylene copolymer, chlorotrifluoroethylene-perfluoro(alkylvinylether) copolymer, chlorotrifluoroethylene-hexafluoropropylene copolymer, chlorotrifluoroethylene-tetrafluoroethylene-hexafluoropropylene copolymer, chlorotrifluoroethylene-tetrafluoroethylene-vinylidene fluoride copolymer, chlorotrifluoroethylene-perfluoro(alkylvinylether)-tetrafluoroethylene copolymer (CPT), chlorotrifluoroethylene-perfluoro(alkylvinylether)-hexafluoropropylene copolymer, chlorotrifluoroethylene-tetrafluoroethylene-hexafluoropropylene-perfluoro(alkylvinylether) copolymer, chlorotrifluoroethylene-tetrafluoroethylene-vinylidene fluoride-perfluoro(alkylvinylether) copolymer, chlorotrifluoroethylene-tetrafluoroethylene-vinylidene fluoride-hexafluoropropylene copolymer, and chlorotrifluoroethylene-tetrafluoroethylene-vinylidene fluoride-perfluoro(alkylvinylether)-hexafluoropropylene copolymer. Arranging a layer comprising a fluorine-containing polymer not containing a functional group to the inside of the (c) layer comprising the fluorine-containing polymer (C) containing a functional group having reactivity with an amino group makes it possible to realize low-temperature impact resistance, prevention of chemical permeation and resistance to cracking caused by environmental stress, while also being economically advantageous.

Moreover, additional examples include polyolefin-based resins such as high-density polyethylene (HDPE), medium-density polyethylene (MDPE), low-density polyethylene (LDPE), linear low-density polyethylene (LLDPE), ultra-high-molecular weight polyethylene (UHMWPE), polypropylene (PP), polybutene (PB), polymethylpentene (TPX), ethylene-propylene copolymer (EPR), ethylene-butene copolymer (EBR), ethylene-vinyl acetate copolymer (EVA), ethylene-vinyl acetate ketone copolymer (EVOH), ethylene-acrylic acid copolymer (EAA), ethylene-methacrylic acid copolymer (EMAA), ethylene-methyl acrylate copolymer (EMA), ethylene-methyl methacrylate copolymer (EMMA) or ethylene-ethyl acrylate copolymer (EEA), polystyrene-based resins such as polystyrene (PS), syndiotactic polystyrene (SPS), methyl methacrylate-styrene copolymer (MS), methyl methacrylate-styrene-polybutadiene (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (SEBS) or styrene-ethylene-propylene-styrene copolymer (SEPS), carboxyl groups and metal salts thereof (Na, Zn, K, Ca and Mg salts) such as those of acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid or endobicyclo-[2.2.1]-5-heptene-2,3-dicarboxylic acid, acid anhydride groups such as those of maleic anhydride, itaconic anhydride, citraconic anhydride or endobicyclo-[2.2.1]-5-heptene-2,3-dicarboxylic anhydride, the aforementioned polyolefin-based resins and polystyrene-based resins containing an epoxy group or other functional group such as glycidyl acrylate, glycidyl methacrylate, glycidyl ethacrylate, glycidyl itaconate or glycidyl citraconate, polyester-based resins such as polybutylene terephthalate (PBT), polyethylene terephthalate (PET), polyethylene isophthalate (PEI), poly(ethylene terephthalate-ethylene isophthalate) copolymer (PET/PEI), polytrimethylene terephthalate (PTT), polycyclohexene dimethylene terephthalate (PCT), polyethylene naphthalate (PEN), polybutene naphthalate (PBN), polyarylate (PAR), liquid crystal polyester (LCP), polylactic acid (PLA) or polyglycolic acid (PGA), polyether-based resins such as polyacetal (POM) or polyphenylene ether (PPO), polysulfone-based resins such as polysulfone (PSU), polyethersulfone (PESU) or polyphenylsulfone (PPSU), polythioether-based resins such as polyphenylenesulfide (PPS) or polythioethersulfone (PTES), polyketone-based resins such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK) or polyether ketone ether ketone ketone (PEKEKK), polynitrile-based resins such as polyacrylonitrile (PAN), polymethacrylonitrile, acrylonitrile-styrene copolymer (AS), methacrylonitrile-styrene copolymer, acrylonitrile-butadiene-styrene copolymer (ABS) or acrylonitrile-butadiene copolymer (NBR), polymethacrylate-based resins such as polymethyl methacrylate (PMMA) or polyethyl methacrylate (PEMA), polyvinyl ester-based resins such as polyvinyl acetate (PVAc), polyvinyl chloride-based resins such as polyvinylidene chloride (PVDC), polyvinyl chloride (PVC), vinyl chloride-vinylidene chloride copolymer or vinylidene chloride-methyl acrylate copolymer, cellulose-based resins such as cellulose acetate or cellulose butyrate, polycarbonate-based resins such as polycarbonate (PC), polyimide-based resins such as thermoplastic polyimide (TPI), polyetherimide, polyesterimide, polyamide imide (PAI) or polyester amide imide, thermoplastic polyurethane-based resins, polyamide elastomers, polyurethane elastomers and polyester elastomers.

In addition, a base material other than a thermoplastic resin can be adhered, examples of which include paper, metallic materials, non-oriented, uniaxial oriented or biaxial oriented plastic films or sheets, woven fabric, non-woven fabric, metallic fiber and wood. Examples of metallic materials include materials made of a metal such as aluminum, iron, copper, nickel, gold, silver, titanium, molybdenum, magnesium, manganese, lead, tin, chromium, beryllium, tungsten or cobalt, metal oxides thereof, and alloys such as stainless steel or other alloy steel, aluminum alloy, copper alloys such as brass or bronze or nickel alloy composed of two or more types thereof.

In addition, in the multi-layer tube of the present invention, if an electrically conductive layer comprising a thermoplastic resin composition containing an electrically conductive filler is arranged as the innermost layer of the multi-layer tube, in the case of using the multi-layer tube as a chemical transport tube and the like, ignition of the chemical caused by sparking occurring due to internal friction of the chemical circulating through the line or friction with the tube wall can be prevented. At that time, as a result of a layer containing a thermoplastic resin not having electrical conductivity being arranged to the outside of the aforementioned electrically conductive layer, both low-temperature impact resistance and electrical conductivity can be realized, while also being economically advantageous.

Electrical conductivity refers to having electrical properties such that, although there is the possibility of ignition due to accumulation of static electricity in the case of a flammable liquid such as gasoline continuously contacting with an insulator in the form of resin, this static electricity is not allowed to accumulate. As a result, explosions attributable to static electricity generated during transport of a liquid such as fuel can be prevented.

The electrically conductive filler includes all fillers added for the purpose of imparting a resin with electrical conductivity, and examples thereof include granular, flake-like and fibrous fillers.

Examples of granular fillers include carbon black and graphite. Examples of flake-like fillers include aluminum flakes, nickel flakes and nickel-coated mica. In addition, examples of fibrous fillers include metal fibers such as carbon fibers, carbon-coated ceramic fibers, carbon whiskers, carbon nanotubes, aluminum fibers, copper fibers, bronze fibers or stainless steel fibers. One type or two or more types of these fillers can be used. Among these, carbon nanotubes and carbon black are preferable.

Carbon nanotubes are referred to as hollow carbon fibrils, these fibrils have an outer region, composed of a plurality of essentially continuous layers of regularly arranged carbon atoms, and an inner hollow region, and are essentially cylindrical fibrils in which each layer and the hollow region are arranged essentially concentrically around the cylindrical axis of the fibril. Moreover, the regularly arranged carbon atoms of the aforementioned outer region are preferably graphitic and the diameter of the aforementioned hollow region is preferably 2 nm to 20 nm. The outer diameter of carbon nanotubes is preferably 3.5 nm to 70 nm and more preferably 4 nm to 60 nm from the viewpoints of imparting adequate dispersibility in resin and favorable electrical conductivity to the resulting resin molded product. The aspect ratio (referred to as the ratio of length to outer diameter) is preferably 5 or more, more preferably 100 or more and even more preferably 500 or more. As a result of satisfying the aforementioned aspect ratio, an electrically conductive network is easily formed and superior electrical conductivity can be demonstrated while adding only a small amount of carbon nanotubes.

The carbon black includes all carbon black commonly used to impart electrical conductivity, and preferable examples of carbon black include, but are not limited to, acetylene black obtained by incomplete combustion of acetylene gas, furnace black such as Ketjen black produced by incomplete furnace combustion when using crude oil as raw material, oil black, naphthalene black, thermal black, lamp black, channel black, roll black and disk black. Among these, acetylene black and furnace black are preferable.

In addition, various types of carbon black powder are produced from carbon black that have different properties such as particle diameter, surface area, DBP oil absorption or ash content. Although there are no particular limitations on the properties of the carbon black, that having a favorable linear structure and large cohesive density is preferable. The incorporation of a large amount of carbon black is not preferable from the viewpoint of impact resistance, and the average particle diameter is preferably 500 nm or less, more preferably 5 nm to 100 nm and even more preferably 10 nm to 70 nm from the viewpoint of obtaining superior electrical conductivity with a smaller amount of carbon black, while surface area (as determined by the BET method) is preferably 10 $m^2$/g or more, more preferably 30 $m^2$/g or more and even more preferably 50 $m^2$/g or more, and DBP (dibutyl phthalate) oil absorption is preferably 50 ml/100 g or more, more preferably 100 ml/100 g or more and even more preferably 150 ml/100 g or more. In addition, the ash content is preferably 0.5% by weight or less and more preferably 0.3% by weight or less. DBP oil absorption as referred to here is the value measured using the method defined in ASTM D-2414. In addition, the volatile matter content of carbon black is preferably less than 1.0% by weight.

These electrically conductive fillers may be subjected to surface treatment with a titanate-based, aluminum-based or silane-based surface treatment agent. In addition, granulated electrically conductive filler can also be used in order to improve melt-kneading workability.

Although unable to be uniformly defined as a result of varying according to the type of electrically conductive filler used, the content of the electrically conductive filler is typically preferably 1 part by weight to 30 parts by weight based on 100 parts of thermoplastic resin from the viewpoint of the balance among electrical conductivity, fluidity, mechanical strength and the like.

In addition, the surface specific resistance of a melt extrusion product of the electrically conductive filler is preferably $10^8$ Ω/square or less and more preferably $10^6$ Ω/square or less from the viewpoint of obtaining adequate antistatic performance. However, addition of the aforementioned electrically conductive filler easily invites decreases in strength and fluidity. Consequently, the content of the aforementioned electrically conductive filler is made to be as low as possible provided the target level of electrical conductivity is obtained.

Examples of methods used to produce the multi-layer tube include a method of melt-extruding using a number of extruding machines corresponding to the number of layers or number of materials followed by laminating simultaneously inside or outside a die (co-extrusion method), and a method of preliminarily producing a single-layer tube or multi-layer tube produced according to the aforementioned method, and then sequentially integrating the resin and laminating on the outside using an adhesive as necessary (coating method). The multi-layer tube of the present invention is preferably produced according to the co-extrusion method in which a tube having a multilayered structure is produced in a single step by co-extruding each type of material in the molten state and then subjecting both to thermal fusion bonding (melt adhesion).

In addition, in the case the resulting multi-layer tube has a complex shape or is used in the form of a molded product by subjecting to heat bending after molding, the target molded product can be obtained by carrying out heat treatment for 0.01 hours to 10 hours after forming the multi-layer tube at a temperature lower than the lowest melting point of the melting points of the resins that compose the tube in order to remove residual strain of the molded product.

The multi-layer tube preferably has a wavy region. A wavy region refers to a region formed into a waveform shape, bellowed shape, accordion shape or corrugated shape. The wavy region may be provided over the entire length of the multi-layer tube or provided only partially in a suitable intermediate region. The wavy region can be easily formed by first forming a straight tube and then subjecting the tube to molding to form into a prescribed wavy shape. The presence of this wavy region enables the multi-layer tube to absorb impacts and facilitates mounting. Moreover, the wavy region can also be fitted with a necessary component such as a connector or can be formed into an L-shape or U-shape by bending processing.

A solid or sponge-like protective member (protector) can be arranged on all or a portion of the outer periphery of the multi-layer tube molded in this manner in consideration of damage caused by flying stones, wear with other components and fire resistance, and examples of materials composing the protective member include natural rubber (NR), butadiene rubber (BR), isoprene rubber (IR), butyl rubber (IIR), chloroprene rubber (CR), carboxylated butadiene rubber (XBR), carboxylated chloroprene rubber (XCR), epichlorhydrin rubber (ECO), acrylonitrile butadiene rubber (NBR), hydrogenated acrylonitrile butadiene rubber (HNBR), carboxylated acrylonitrile butadiene rubber (XNBR), mixtures of NBR and polyvinyl chloride, acrylonitrile isoprene rubber (NIR), chlorinated polyethylene rubber (CM), chlorosulfonated polyethylene rubber (CSM), ethylene propylene rubber (EPR), ethylene propylene diene rubber (EPDM), ethylene vinyl acetate rubber (EVM), mixed rubber of NBR and EPDM, acrylic rubber (ACM), ethylene acrylic rubber (AEM), acrylate butadiene rubber (ABR), styrene butadiene rubber (SBR), carboxylated styrene butadiene rubber (XSBR), styrene isoprene rubber (SIR), styrene isoprene butadiene rubber (SIBR), urethane rubber, silicone rubber (MQ, VMQ), fluororubber (FKM, FFKM), fluorosilicone rubber (FVMQ) and vinyl chloride-based, olefin-based, ester-based, urethane-based and amide-based thermoplastic elastomers. The protective member may be in the form of a sponge-like porous body produced by a known technique. The use of the protective member in the form of a porous body enables the formation of a protective member that is lightweight and demonstrates superior thermal insulating properties. In addition, material costs can also be reduced. Alternatively, the strength of the protective member may be improved by adding glass fiber and the like. There are no particular limitations on the shape of the protective member, and normally has a block-like shape having an indentation into which a tubular member or multi-layer tube is inserted. In the case of a tubular member, the multi-layer tube may be subsequently inserted into a preliminarily fabricated tubular member, or the tubular member can be extrusion-coated on the multi-layer tube followed by adhering the two components to produce the protective member. In order to adhere the two components, by coating an adhesive on the inner surface of the protective member or on the aforementioned indented surface, inserting or fitting the multi-layer tube therein and adhering the two components, a structure is formed in which the multi-layer tube and protective member are integrated into a single unit. In addition, the protective member can also be reinforced with metal and the like.

Although the outer diameter of the multi-layer tube is designed to a wall thickness that prevents increases in the amount of chemical permeation in consideration of the flow rate of a chemical (such as a fuel in the manner of alcohol-containing gasoline), is able to maintain the burst pressure of an ordinary tube, and is able to maintain flexibility to a degree that facilitates tube assembly work and results in favorable vibration resistance during use, there are no particular limitations thereon. Outer diameter is preferably 4 mm to 300 mm, inner diameter is preferably 3 mm to 250 mm, and wall thickness is preferably 0.5 mm to 25 mm.

The multi-layer tube of the present invention can be used in various types of applications, including mechanical components such as automobile parts, internal combustion engine applications or power tool housings, as well as industrial materials, building materials, electrical and electronic components, health care applications, foods, home and office supplies, construction material components and furniture parts.

In addition, the multi-layer tube of the present invention is preferable for use as a liquid chemical transport tube due to its superior prevention of chemical permeation. Examples of liquid chemicals include aromatic hydrocarbon-based solvents such as benzene, toluene or xylene, alcohol- and phenol-based solvents such as methanol, ethanol, propanol, butanol, pentanol, ethylene glycol, propylene glycol, diethylene glycol, phenol, cresol, polyethylene glycol or polypropylene glycol, ether-based solvents such as dimethyl ether, dipropyl ether, methyl t-butyl ether, ethyl t-butyl ether, dioxane or tetrahydrofuran, halogen-based solvents such as chloroform, methylene chloride, trichloroethylene, ethylene dichloride, perchloroethylene, monochloroethane, dichloroethane, tetrachloroethane, perchloroethane or chlorobenzene, ketone-based solvents such as acetone, methyl ethyl ketone, diethyl ketone or acetophenone, gasoline, kerosene, diesel gasoline, alcohol-containing gasoline, ethyl t-butyl ether-blended, oxygen-containing gasoline, amine-containing gasoline, sour gasoline, castor oil-based brake fluid, glycol ether-based brake fluid, borate ester-based brake fluid, cold weather brake fluid, silicone-based brake fluid, mineral oil-based brake fluid, power steering oil, hydrogen sulfide-containing oil, window washer fluid, engine coolant, urea solutions, pharmaceutical agents, ink and paint. The multi-layer tube of the present invention is preferable for use as a tube used to transport the aforementioned liquid chemicals, and specific examples thereof include fuel tubes such as a feed tube, return tube, evaporation tube, fuel filler tube, ORVR tube, reserve tube or vent tube, oil tube, oil drilling tube, brake tube, window washer fluid tube, engine coolant tube (LLC) tube, reserve tank tube, urea solution transport tube, cooling water or coolant cooler tube, air-conditioner coolant tube, heater tube, road heating tube, floor heating tube, infrastructure supply tube, fire extinguisher or extinguishing equipment tube, medical cooling equipment tube, ink, paint spraying tube and other liquid chemical tubes. The multi-layer tube of the present invention is used particularly preferably as a fuel tube.

EXAMPLES

Although the following provides a detailed explanation of the present invention by indicating examples and comparative examples thereof, the present invention is not limited thereto.

Analysis and measurement methods used in the examples and comparative examples as well as materials used in the examples and comparative examples are indicated below.

Properties of polyamide-based resins were measured according to the methods indicated below.

[Relative Viscosity]

Relative viscosity was measured basically in compliance with JIS K-6920 under conditions of 96% sulfuric acid, a polyamide concentration of 1% and temperature of 25° C.

[Terminal Amino Group Concentration of Aliphatic Polyamides (A1), (A11) and (A12)]

A prescribed amount of polyamide sample was placed in an Erlenmeyer flask equipped with a stopcock, and after adding 40 mL of a preliminarily prepared phenol/methanol solvent (volume ratio: 9/1), the solution was titrated with 0.05 N hydrochloric acid using thymol blue for the indicator to determine the terminal amino group concentration.

[Terminal Carboxyl Group Concentration of Aliphatic Polyamides (A1), (A11) and A(12)]

A prescribed amount of polyamide sample was placed in a three-mouth pear-shaped flask, and after adding 40 mL of benzyl alcohol, the flask was immersed in an oil bath set to 180° C. in the presence of flowing nitrogen. After dissolving by stirring with a stirring motor attached to the upper portion of the flask, the solution was titrated with 0.05 N sodium hydroxide solution using phenolphthalein for the indicator to determine the terminal carboxyl group concentration.

[Total Concentration of Carboxyl Group and Acid Anhydride Group of Elastomer Polymer (A2) Containing Unsaturated Compound Having Carboxyl Group and/or Acid Anhydride Group]

A prescribed amount of elastomer polymer sample was placed in a three-mouth pear-shaped flask followed by dissolving in 170 mL of toluene, further adding 30 mL of ethanol, and titrating the prepared sample solution with 0.1 N KOH-ethanol solution using phenolphthalein for the indicator to determine the total concentration of the carboxyl group and acid anhydride group.

Properties of fluorine-containing polymers were measured according to the methods indicated below.

[Fluorine-Containing Polymer Composition]

Fluorine-containing polymer composition was measured by melt NMR analysis, fluorine content analysis and infrared absorption spectrum.

Properties of multi-layer tubes were measured according to the methods indicated below.

[Low-Temperature Impact Resistance]

An impact test was carried out at −40° C. according to the method described in SAE J-2260 7.5.

[Prevention of Chemical (Alcohol-Containing Gasoline) Permeation]

One end of a tube cut to a length of 200 mm was sealed followed by filling the tube with alcohol-containing gasoline obtained by mixing Fuel C (volume ratio of isooctane/toluene=50/50) and ethanol at a volume ratio of 90/10, and sealing the remaining end of the tube. Subsequently, the total weight of the filled tube was measured followed by placing the test tube in an oven at 60° C. and measuring the change in weight each day. The permeated amount of alcohol-containing gasoline (g/m$^2$·day) was calculated by dividing the weight change per day by the tube inner layer surface area.

[Interlayer Adhesion]

A tube cut to a length of 200 mm was further cut in half in the longitudinal direction to prepare a test piece. A 90° peel test was carried out at a pulling speed of 50 mm/min using a universal tester (Tensilon UTM III-200 manufactured by Orientec Co., Ltd.). Interlayer adhesion was evaluated by reading peel strength from the local maximum of an S—S curve.

[Interlayer Adhesion Durability]

A tube cut to a length of 200 mm was placed in an oven at 150° C. and treated for 30 minutes. The interlayer adhesion of the tube after removing from the oven was evaluated in accordance with the method described above. Peel strength after heat treatment of 20 N/cm or more was judged to indicate superior interlayer adhesion durability.

Materials Used in Examples and Comparative Examples

Aliphatic Polyamides (A1), (A11) and (A12):

Production of Polyamide 12 ((A1-1) or (A11-1))

20.0 kg of dodecanelactam, 0.5 kg of water and 49.3 g of 5-amino-1,3,3-trimethylcyclohexanemethylamine were charged into a pressure-resistant reaction vessel having an internal volume of 70 liters and equipped with a stirrer, and after replacing the inside of the polymerization tank with nitrogen, the polymerization tank was heated to 180° C. followed by stirring at that temperature so that the reaction system became homogeneous. Next, the temperature inside the polymerization tank was raised to 270° C. and polymerization was carried out for 2 hours while stirring and regulating the pressure inside the tank to 3.5 MPa. Subsequently, the pressure was returned to normal pressure over the course of about 2 hours followed by reducing the pressure to 53 kPa and carrying out polymerization for 5 hours under reduced pressure. Next, nitrogen was introduced into the autoclave, and after restoring the pressure to normal pressure, the reaction product was extracted from a nozzle in the bottom of the pressure vessel in the form of a strand which was then cut to obtain pellets. The pellets were dried under reduced pressure to obtain Polyamide 12 having a relative viscosity of 2.17, terminal amino group concentration of 38 μeq/g, and terminal carboxyl group concentration of 21 μeq/g (this Polyamide 12 will hereinafter be referred to as (A1-1) or (A11-1)). The terminal amino group concentration [A1] (μeq/g) and terminal carboxyl group concentration [B1] (μeq/g) of Polyamide 12 ((A1-1) or (A11-1)) satisfy the relationship of [A1]>[B1]+10.

Production of Polyamide 12 ((A1-2) or (A12-1))

Polyamide A12 having a relative viscosity of 2.15, terminal amino group concentration of 93 µeq/g and terminal carboxyl group concentration of 18 µeq/g was obtained using the same method as in the production of Polyamide A12 (A1-1) with the exception of changing the 49.3 g of 5-amino-1,3,3-trimethylcyclohexanemethylamine used in the production of Polyamide 12 (A1-2) to 92.0 g of polyethyleneimine (Epomin SP-12, Nippon Shokubai Co., Ltd.) (this Polyamide 12 will hereinafter be referred to as (A1-2) or (A12-1)). The terminal amino group concentration [A1] ([A12]) (µeq/g) and the terminal carboxyl group concentration [B1] ([B12]) (µeq/g) of Polyamide 12 ((A1-2) or (A12-1)) satisfy the relationships of [A1]>[B1]+10 and [A12]>[B12]+40.

Production of Polyamide 610 ((A1-3) or (A12-2))

17.6 kg of a 50% by weight aqueous solution of an equimolar salt of 1,6-hexanediamine and sebacic acid and 63.8 g of 1,6-hexanediamine were charged into a pressure-resistant reaction vessel having an internal volume of 70 liters and equipped with a stirrer, and after replacing the inside of the polymerization tank with nitrogen, the polymerization tank was heated to 220° C. followed by stirring at that temperature so that the reaction system became homogeneous. Next, the temperature inside the polymerization tank was raised to 270° C. and polymerization was carried out for 2 hours while stirring and regulating the pressure inside the tank to 1.7 MPa. Subsequently, the pressure was returned to normal pressure over the course of about 2 hours followed by reducing the pressure to 53 kPa and carrying out polymerization for 4 hours under reduced pressure. Next, nitrogen was introduced into the autoclave, and after restoring the pressure to normal pressure, the reaction product was extracted from a nozzle in the bottom of the pressure vessel in the form of a strand which was then cut to obtain pellets. The pellets were dried under reduced pressure to obtain Polyamide 610 having a relative viscosity of 2.48, terminal amino group concentration of 73 µeq/g, and terminal carboxyl group concentration of 14 µeq/g (this Polyamide 610 will hereinafter be referred to as (A1-3) or (A12-2)). The terminal amino group concentration [A1] ([A12]) (µeq/g) and terminal carboxyl group concentration [B1] ([B12]) (µeq/g) of Polyamide 610 ((A1-3) or (A12-2)) satisfy the relationships of [A1]>[B1]+10 and [A12]>[B12]+40.

Production of Polyamide 612 ((A1-4) or (A12-3))

Polyamide 612 having a relative viscosity of 2.52, terminal amino group concentration of 67 µeq/g and terminal carboxyl group concentration of 15 µeq/g was obtained using the same method as in the production of Polyamide 610 (A1-3) with the exception of changing the 17.6 g of a 50% by weight aqueous solution of an equimolar salt of 1,6-hexanediamine and sebacic acid used in the production of Polyamide 610 (A1-3) to 20.0 kg of a 50% by weight aqueous solution of an equimolar salt of 1,6-hexanediamine and dodecanedioic acid, and changing the amount of 1,6-hexanediamine added from 63.8 g to 70.0 g (this Polyamide 612 will hereinafter be referred to as (A1-4) or (A12-3)). The terminal amino group concentration [A1] ([A12]) (µeq/g) and the terminal carboxyl group concentration [B1] ([B12]) (µeq/g) of Polyamide 612 ((A1-4) or (A12-3)) satisfy the relationships of [A1]>[B1]+10 and [A12]>[B12]+40.

Production of Polyamide 12 (A11-2)

Polyamide 12 having a relative viscosity of 2.37, terminal amino group concentration of 29 µeq/g and terminal carboxyl group concentration of 11 µeq/g was obtained using the same method as in the production of Polyamide 12 (A1-1) with the exception of changing the duration of polymerization from 5 hours to 7 hours in the production of Polyamide 12 (A1-1) (this Polyamide 12 will hereinafter be referred to as (A11-2)). The terminal amino group concentration [A1] ([A12]) (µeq/g) and the terminal carboxyl group concentration [B1] ([B12]) (µeq/g) of Polyamide 12 (A11-2) satisfy the relationship of [A1]>[B1]+10.

Production of Polyamide 12 (A12-4)

Polyamide 12 having a relative viscosity of 1.85, terminal amino group concentration of 75 µeq/g and terminal carboxyl group concentration of 29 µeq/g was obtained using the same method as in the production of Polyamide 12 (A1-1) with the exception of changing the amount of 5-amino-1,3,3-trimethylcyclohexanemethylamine from 49.3 g used in the production of Polyamide 12 (A1-1) to 90.8 g and changing the duration of postpolymerization from 5 hours to 4 hours (this Polyamide 12 will hereinafter be referred to as (A12-4)). The terminal amino group concentration [A12] (µeq/g) and the terminal carboxyl group concentration [B12] (µeq/g) of Polyamide 12 (A12-4) satisfy the relationship of [A12]>[B12]+40.

Production of Polyamide 6 (A12-5)

20.0 kg of caprolactam, 1 kg of water and 60.0 g of 5-amino-1,3,3-trimethylcyclohexanemethylamine were placed in a pressure-resistant reaction vessel having an internal volume of 70 liters and equipped with a stirrer followed by heating to 100° C. and stirring at that temperature so that the reaction system became homogeneous. Continuing, the temperature was raised to 260° C. followed by stirring for 1 hour at a pressure of 2.5 MPa. Subsequently, the pressure was released followed by carrying out polymerization for 2 hours at 260° C. under normal pressure while allowing moisture to evaporate from the reaction vessel, and further carrying out a polymerization reaction for 4 hours at 260° C. under reduced pressure of 53 kPa. Following completion of the reaction, the reaction product extracted from a nozzle in the bottom of the pressure vessel in the form of a strand was cooled by introducing into a water tank and then cut to obtain pellets. After immersing the pellets in hot water and removing unreacted monomer by extraction, the pellets were dried under reduced pressure to obtain Polyamide 6 having a relative viscosity of 2.50, terminal amino group concentration of 90 µeq/g, and terminal carboxyl group concentration of 42 µeq/g (this Polyamide 6 will hereinafter be referred to as (A12-5)). The terminal amino group concentration [A12] (µeq/g) and terminal carboxyl group concentration [B12] (µeq/g) of Polyamide 6 (A12-5) satisfy the relationship of [A12]>[B12]+40.

Production of Polyamide 6 (A12-6)

Polyamide 6 having a relative viscosity of 2.70, terminal amino group concentration of 112 µeq/g and terminal carboxyl group concentration of 25 µeq/g was obtained using the same method as in the production of Polyamide 6 (A12-5) with the exception of changing the 60.0 g of 5-amino-1,3,3-trimethylcyclohexanemethylamine used in the production of Polyamide 6 (A12-5) to 70.2 g of polyethyleneimine (Epomin SP-12, Nippon Shokubai Co., Ltd.) (this Polyamide 6 will hereinafter be referred to as (A12-6)). The terminal amino group concentration [A12] (µeq/g) and the terminal carboxyl group concentration [B12] (µeq/g) of Polyamide 6 (A12-6) satisfy the relationship of [A12]>[B12]+40.

Production of Polyamide 12 ((A1-5) or (A11-3))

Polyamide A12 having a relative viscosity of 2.25, terminal amino group concentration of 20 µeq/g and terminal carboxyl group concentration of 32 µeq/g was obtained using the same method as in the production of Polyamide A12 (A1-1) with the exception of changing the 49.3 g of 5-amino-1,3,3-timethylcyclohexanemethylamine used in the production of Polyamide 12 (A1-1) to 66.0 g of stearic acid (this Polyamide 12 will hereinafter be referred to as (A1-5) or (A11-3)). The terminal amino group concentration [A1] (μeq/g) and the terminal carboxyl group concentration [B1] (μeq/g) of Polyamide 12 (A1-5) do not satisfy the relationship of [A1]>[B1]+10.

Elastomer Copolymer (A2) Containing an Unsaturated Compound Having a Carboxyl Group and/or Acid Anhydride Group Maleic anhydride-modified ethylene-1-butene copolymer (A2-1) (Tafmer MH5020, Mitsui Chemicals, Inc., acid anhydride group concentration: 100 μeq/g)

Maleic anhydride-modified ethylene-1-butene copolymer (A2-2) (Tafmer MH5010, Mitsui Chemicals, Inc., acid anhydride group concentration: 50 μeq/g) Maleic anhydride-modified ethylene-1-butene copolymer (A2-3) (Tafmer MH7007, Mitsui Chemicals, Inc., acid anhydride group concentration: 25 μeq/g)

Aliphatic Polyamide Composition (A):

Production of Polyamide 12 Composition (A-1)

An impact resistance improver in the form of maleic anhydride-modified ethylene-1-butene copolymer (A2-1), an antioxidant in the form of triethylene glycol-bis[3-(3-t-butyl-5-methyl-4-hydroxyphenyl)propionate] (Irganox 245, BASF Japan, Ltd.) and a phosphorous-based processing stabilizer in the form of tris(2,4-di-t-butylphenyl)phosphite (Irgafos 168, BASF Japan, Ltd.) were preliminarily mixed with Polyamide 12 (A1-1), followed by supplying to a twin-screw melt kneader (Model TEX44, Japan Steel Works, Ltd.) while injecting a plasticizer in the form of benzenesulfonic acid butyl amide with a constant volume pump at an intermediate location of the cylinder of the twin-screw melt kneader, melt-kneading at a cylinder temperature from 180° C. to 270° C. and extruding the molten resin in the form of a strand, followed by cooling, cutting and vacuum-drying to obtain pellets of a Polyamide 12 composition containing 0.8 parts by weight of antioxidant and 0.2 parts by weight of phosphorous-based processing stabilizer based on a total of 100 parts of Polyamide 12 (A1-1), maleic anhydride-modified ethylene-1-butene copolymer (A2-1) and plasticizer at a ratio of 82.5:15.0:2.5 (weight ratio) (this Polyamide 12 composition will hereinafter be referred to as (A-1)). When the terminal amino group concentration of Polyamide 12 per g of the Polyamide 12 composition (A-1) is defined as [X] (μeq/g), and the total concentration of the carboxyl group and acid anhydride group in maleic anhydride-modified ethylene-1-butene copolymer (A2-1) per g of the Polyamide 12 composition (A-1) is defined as [Y], the product of [X]×[Y] is 470.3 (μeq/g)$^2$.

Production of Polyamide 12 Composition (A-2)

Pellets of a Polyamide 12 composition containing 0.8 parts by weight of antioxidant and 0.2 parts by weight of phosphorous-based processing stabilizer based on a total of 100 parts by weight of Polyamide 12 (A11-2), Polyamide 12 (A12-4), maleic anhydride-modified ethylene-1-butene copolymer (A2-1) and plasticizer at a ratio of 57.25:24.75:15.0:2.5 (weight ratio) were obtained using the same method as in the production of Polyamide 12 composition (A-1) with the exception of changing Polyamide 12 (A1-1) used in the production of Polyamide 12 composition (A-1) to a mixture of (A11-2) and (A12-4) (this Polyamide 12 composition will hereinafter be referred to as (A-2)). When the terminal amino group concentration of Polyamide 12 (A11-2) and (A12-4) per g of the Polyamide 12 composition (A-2) is defined as [X] (μeq/g) and the total concentration of the carboxyl group and acid anhydride group in maleic anhydride-modified ethylene-1-butene copolymer (A2-1) per g of the Polyamide 12 composition (A-2) is defined as [Y], the product of [X]×[Y] is 529.7 (μeq/g)$^2$.

Production of Polyamide 12 Composition (A-3)

Pellets of a Polyamide 12 composition containing 0.8 parts by weight of antioxidant and 0.2 parts by weight of phosphorous-based processing stabilizer based on a total of 100 parts by weight of Polyamide 12 (A11-3), Polyamide 12 (A12-4), maleic anhydride-modified ethylene-1-butene copolymer (A2-1) and plasticizer at a ratio of 49.5:33.0:15.0:2.5 (weight ratio) were obtained using the same method as in the production of Polyamide 12 composition (A-1) with the exception of changing Polyamide 12 (A1-1) used in the production of Polyamide 12 composition (A-1) to a mixture of (A11-3) and (A12-4) (this Polyamide 12 composition will hereinafter be referred to as (A-3)). When the terminal amino group concentration of Polyamide 12 (A11-3) and (A12-4) per g of the Polyamide 12 composition (A-3) is defined as [X] (μeq/g), and the total concentration of the carboxyl group and acid anhydride group in maleic anhydride-modified ethylene-1-butene copolymer (A2-1) per g of the Polyamide 12 composition (A-3) is defined as [Y], the product of [X]×[Y] is 519.8 (μeq/g)$^2$.

Production of Polyamide 12 Composition (A-4)

Pellets of a Polyamide 12 composition containing 0.8 parts by weight of antioxidant and 0.2 parts by weight of phosphorous-based processing stabilizer based on a total of 100 parts by weight of Polyamide 12 (A1-2), maleic anhydride-modified ethylene-1-butene copolymer (A2-1) and plasticizer at a ratio of 82.5:15.0:2.5 (weight ratio) were obtained using the same method as in the production of Polyamide 12 composition (A-1) with the exception of changing Polyamide 12 (A1-1) used in the production of Polyamide 12 composition (A-1) to (A1-2) (this Polyamide 12 composition will hereinafter be referred to as (A-4)). When the terminal amino group concentration of Polyamide 12 (A1-2) per g of the Polyamide 12 composition (A-4) is defined as [X] (μeq/g), and the total concentration of the carboxyl group and acid anhydride group in maleic anhydride-modified ethylene-1-butene copolymer (A2-1) per g of the Polyamide 12 composition (A-4) is defined as [Y], the product of [X]×[Y] is 1150.9 (μeq/g)$^2$.

Production of Polyamide 12 Composition (A-5)

Pellets of a Polyamide 12 composition containing 0.8 parts by weight of antioxidant and 0.2 parts by weight of phosphorous-based processing stabilizer based on a total of 100 parts by weight of Polyamide 12 (A11-3), Polyamide 12 (A12-1), maleic anhydride-modified ethylene-1-butene copolymer (A2-1) and plasticizer at a ratio of 16.5:66.0:15.0:2.5 (weight ratio) were obtained using the same method as in the production of Polyamide 12 composition (A-1) with the exception of changing Polyamide 12 (A1-1) used in the production of Polyamide 12 composition (A-1) to a mixture of (A11-3) and (A12-1) (this Polyamide 12 composition will hereinafter be referred to as (A-5)). When the terminal amino group concentration of Polyamide 12 (A11-3) and (A12-1) per g of the Polyamide 12 composition (A-5) is defined as [X] (μeq/g), and the total concentration of the carboxyl group and acid anhydride group in maleic anhydride-modified ethylene-1-butene copolymer (A2-1) per g of the Polyamide 12 composition (A-5) is defined as [Y], the product of [X]×[Y] is 970.2 (μeq/g)$^2$.

Production of Polyamide 12 Composition (A-6)

Pellets of a Polyamide 12 composition containing 0.8 parts by weight of antioxidant and 0.2 parts by weight of phosphorous-based processing stabilizer based on a total of 100 parts by weight of Polyamide 12 (A11-1), Polyamide 6

(A12-5), maleic anhydride-modified ethylene-1-butene copolymer (A2-1) and plasticizer at a ratio of 72.5:10.0:15.0:2.5 (weight ratio) were obtained using the same method as in the production of Polyamide 12 composition (A-1) with the exception of adding Polyamide 6 (A12-5) to Polyamide 12 (A-1) used in the production of Polyamide 12 composition (A-1) and using a mixture of (A-1) and (A12-5) (this Polyamide 12 composition will hereinafter be referred to as (A-6)). When the terminal amino group concentration of Polyamide 12 (A11-1) and (A12-5) per g of the Polyamide 12 composition (A-6) is defined as [X] (μeq/g), and the total concentration of the carboxyl group and acid anhydride group in maleic anhydride-modified ethylene-1-butene copolymer (A2-1) per g of the Polyamide 12 composition (A-6) is defined as [Y], the product of [X]×[Y] is 548.3 (μeq/g)$^2$.

Production of Polyamide 12 Composition (A-7)

Pellets of a Polyamide 12 composition containing 0.8 parts by weight of antioxidant and 0.2 parts by weight of phosphorous-based processing stabilizer based on a total of 100 parts by weight of Polyamide 12 (A11-1), Polyamide 6 (A12-6), maleic anhydride-modified ethylene-1-butene copolymer (A2-1) and plasticizer at a ratio of 72.5:10.0:15.0:2.5 (weight ratio) were obtained using the same method as in the production of Polyamide 12 composition (A-6) with the exception of changing Polyamide 6 (A12-5) used in the production of Polyamide 12 composition (A-6) to (A12-6) (this Polyamide 12 composition will hereinafter be referred to as (A-7)). When the terminal amino group concentration of Polyamide 12 (A11-1) and (A12-6) per g of the Polyamide 12 composition (A-7) is defined as [X] (μeq/g), and the total concentration of the carboxyl group and acid anhydride group in maleic anhydride-modified ethylene-1-butene copolymer (A2-1) per g of the Polyamide 12 composition (A-7) is defined as [Y], the product of [X]×[Y] is 581.3 (μeq/g)$^2$.

Production of Polyamide 12 Composition (A-8)

Pellets of a Polyamide 12 composition containing 0.8 parts by weight of antioxidant and 0.2 parts by weight of phosphorous-based processing stabilizer based on a total of 100 parts by weight of Polyamide 12 (A11-1), Polyamide 610 (A12-2), maleic anhydride-modified ethylene-1-butene copolymer (A2-1) and plasticizer at a ratio of 72.5:10.0:15.0:2.5 (weight ratio) were obtained using the same method as in the production of Polyamide 12 composition (A-6) with the exception of changing Polyamide 12 (A12-5) used in the production of Polyamide 12 composition (A-6) to Polyamide 610 (A12-2) (this Polyamide 12 composition will hereinafter be referred to as (A-8)). When the terminal amino group concentration of Polyamide 12 (A11-1) and Polyamide 610 (A12-2) per g of the Polyamide 12 composition (A-8) is defined as [X] (μeq/g), and the total concentration of the carboxyl group and acid anhydride group in maleic anhydride-modified ethylene-1-butene copolymer (A2-1) per g of the Polyamide 12 composition (A-8) is defined as [Y], the product of [X]×[Y] is 522.8 (μeq/g)$^2$.

Production of Polyamide 12 Composition (A-9)

Pellets of a Polyamide 12 composition containing 0.8 parts by weight of antioxidant and 0.2 parts by weight of phosphorous-based processing stabilizer based on a total of 100 parts by weight of Polyamide 12 (A11-1), Polyamide 612 (A12-3), maleic anhydride-modified ethylene-1-butene copolymer (A2-1) and plasticizer at a ratio of 72.5:10.0:15.0:2.5 (weight ratio) were obtained using the same method as in the production of Polyamide 12 composition (A-6) with the exception of changing Polyamide 6 (A12-5) used in the production of Polyamide 12 composition (A-6) to Polyamide 612 (A12-3) (this Polyamide 12 composition will hereinafter be referred to as (A-9)). When the terminal amino group concentration of Polyamide 12 (A11-1) and Polyamide 612 (A12-3) per g of the Polyamide 12 composition (A-9) is defined as [X] (μeq/g), and the total concentration of the carboxyl group and acid anhydride group in maleic anhydride-modified ethylene-1-butene copolymer (A2-1) per g of the Polyamide 12 composition (A-9) is defined as [Y], the product of [X]×[Y] is 510.8 (μeq/g)$^2$.

Production of Polyamide Composition (A-10)

Pellets of a Polyamide 610 composition containing 0.8 parts by weight of antioxidant and 0.2 parts by weight of phosphorous-based processing stabilizer based on a total of 100 parts by weight of Polyamide 610 (A1-3), maleic anhydride-modified ethylene-1-butene copolymer (A2-1) and plasticizer at a ratio of 82.5:15.0:2.5 (weight ratio) were obtained using the same method as in the production of Polyamide 12 composition (A-1) with the exception of changing Polyamide 12 (A1-1) used in the production of Polyamide 12 composition (A-1) to Polyamide 610 (A1-3) (this Polyamide 610 composition will hereinafter be referred to as (A-10)). When the terminal amino group concentration of Polyamide 610 (A1-3) per g of the Polyamide 610 composition (A-10) is defined as [X] (μeq/g), and the total concentration of the carboxyl group and acid anhydride group in maleic anhydride-modified ethylene-1-butene copolymer (A2-1) per g of the Polyamide 610 composition (A-10) is defined as [Y], the product of [X]×[Y] is 903.4 (μeq/g)$^2$.

Production of Polyamide 612 Composition (A-11)

Pellets of a Polyamide 612 composition containing 0.8 parts by weight of antioxidant and 0.2 parts by weight of phosphorous-based processing stabilizer based on a total of 100 parts by weight of Polyamide 612 (A1-4), maleic anhydride-modified ethylene-1-butene copolymer (A2-1) and plasticizer at a ratio of 82.5:15.0:2.5 (weight ratio) were obtained using the same method as in the production of Polyamide 12 composition (A-1) with the exception of changing Polyamide 12 (A1-1) used in the production of Polyamide 12 composition (A-1) to Polyamide 612 (A1-4) (this Polyamide 612 composition will hereinafter be referred to as (A-11)). When the terminal amino group concentration of Polyamide 612 (A1-4) per g of the Polyamide 612 composition (A-11) is defined as [X] (μeq/g), and the total concentration of the carboxyl group and acid anhydride group in maleic anhydride-modified ethylene-1-butene copolymer (A2-1) per g of the Polyamide 612 composition (A-11) is defined as [Y], the product of [X]×[Y] is 804.4 (μeq/g)$^2$.

Production of Polyamide 12 Composition (A-12)

Pellets of a Polyamide 12 composition containing 0.8 parts by weight of antioxidant and 0.2 parts by weight of phosphorous-based processing stabilizer based on a total of 100 parts by weight of Polyamide 12 (A1-1), maleic anhydride-modified ethylene-1-butene copolymer (A2-1) and plasticizer at a ratio of 82.5:15.0:2.5 (weight ratio) were obtained using the same method as in the production of Polyamide 12 composition (A-1) with the exception of changing the maleic anhydride-modified ethylene-1-butane copolymer (A2-1) to (A2-2) (this Polyamide 12 composition will hereinafter be referred to as (A-12)). When the terminal amino group concentration of Polyamide 12 (A1-1) per g of the Polyamide 12 composition (A-12) is defined as [X] (μeq/g), and the total concentration of the carboxyl group and acid anhydride group in maleic anhydride-modified ethylene-1-butene copolymer (A2-1) per g of the Polyamide 12 composition (A-12) is defined as [Y], the product of [X]×[Y] is 235.1 (μeq/g)$^2$.

Production of Polyamide 12 Composition (A-13)

Pellets of a Polyamide 12 composition containing 0.8 parts by weight of antioxidant and 0.2 parts by weight of phosphorous-based processing stabilizer based on a total of 100 parts by weight of Polyamide 12 (A1-5), maleic anhydride-modified ethylene-1-butene copolymer (A2-1) and plasticizer at a ratio of 87.5:10.0:2.5 (weight ratio) were obtained using the same method as in the production of Polyamide 12 composition (A-1) with the exception of changing Polyamide 12 (A1-1) used in the production of Polyamide 12 composition (A-1) to (A1-5) (this Polyamide 12 composition will hereinafter be referred to as (A-13)). When the terminal amino group concentration of Polyamide 12 (A1-5) per g of the Polyamide 12 composition (A-13) is defined as [X] (μeq/g), and the total concentration of the carboxyl group and acid anhydride group in maleic anhydride-modified ethylene-1-butene copolymer (A2-1) per g of the Polyamide 12 composition (A-13) is defined as [Y], the product of [X]×[Y] is 175.0 (μeq/g)$^2$.

Production of Polyamide 12 Composition (A-14)

Pellets of a Polyamide 12 composition containing 0.8 parts by weight of antioxidant and 0.2 parts by weight of phosphorous-based processing stabilizer based on a total of 100 parts by weight of Polyamide 12 (A1-5), maleic anhydride-modified ethylene-1-butene copolymer (A2-2) and plasticizer at a ratio of 82.5:15.0:2.5 (weight ratio) were obtained using the same method as in the production of Polyamide 12 composition (A-13) with the exception of changing maleic anhydride-modified ethylene-1-butene copolymer (A2-1) used in the production of Polyamide 12 composition (A-13) to (A2-2) (this Polyamide 12 composition will hereinafter be referred to as (A-14)). When the terminal amino group concentration of Polyamide 12 (A1-5) per g of the Polyamide 12 composition (A-14) is defined as [X] (μeq/g), and the total concentration of the carboxyl group and acid anhydride group in maleic anhydride-modified ethylene-1-butene copolymer (A2-2) per g of the Polyamide 12 composition (A-14) is defined as [Y], the product of [X]×[Y] is 123.8 (μeq/g)$^2$.

Production of Polyamide Composition (A-15)

Pellets of a Polyamide 12 composition containing 0.8 parts by weight of antioxidant and 0.2 parts by weight of phosphorous-based processing stabilizer based on a total of 100 parts by weight of Polyamide 12 (A1-1), maleic anhydride-modified ethylene-1-butene copolymer (A2-3) and plasticizer at a ratio of 82.5:15.0:2.5 (weight ratio) were obtained using the same method as in the production of Polyamide 12 composition (A-1) with the exception of changing maleic anhydride-modified ethylene-1-butene copolymer (A2-1) used in the production of Polyamide 12 composition (A-1) to (A2-3) (this Polyamide 12 composition will hereinafter be referred to as (A-15)). When the terminal amino group concentration of Polyamide 12 (A1-5) per g of the Polyamide 12 composition (A-15) is defined as [X] (μeq/g), and the total concentration of the carboxyl group and acid anhydride group in maleic anhydride-modified ethylene-1-butene copolymer (A2-3) per g of the Polyamide 12 composition (A-15) is defined as [Y], the product of [X]×[Y] is 117.6 (μeq/g)$^2$.

Production of Polyamide 12 Composition (A-16)

Pellets of a Polyamide 12 composition containing 0.8 parts by weight of antioxidant and 0.2 parts by weight of phosphorous-based processing stabilizer based on a total of 100 parts by weight of Polyamide 12 (A1-1) and maleic anhydride-modified ethylene-1-butene copolymer (A2-1) at a ratio of 85.0:15.0 (weight ratio) were obtained using the same method as in the production of Polyamide 12 composition (A-1) with the exception of not using a plasticizer in the production of Polyamide 12 composition (A-1) (this Polyamide 12 composition will hereinafter be referred to as (A-16)). When the terminal amino group concentration of Polyamide 12 (A1-1) per g of the Polyamide 12 composition (A-16) is defined as [X] (μeq/g), and the total concentration of the carboxyl group and acid anhydride group in maleic anhydride-modified ethylene-1-butene copolymer (A2-1) per g of the Polyamide 12 composition (A-16) is defined as [Y], the product of [X]×[Y] is 484.5 (μeq/g)$^2$.

Production of Polyamide Composition (A-17)

Pellets of a Polyamide 12 composition containing 0.8 parts by weight of antioxidant and 0.2 parts by weight of phosphorous-based processing stabilizer based on a total of 100 parts by weight of Polyamide 12 (A1-5) and maleic anhydride-modified ethylene-1-butene copolymer (A2-1) at a ratio of 80.0:20.0 (weight ratio) were obtained using the same method as in the production of Polyamide 12 composition (A-1) with the exception of not using a plasticizer in the production of Polyamide 12 composition (A-1) (this Polyamide 12 composition will hereinafter be referred to as (A-17)). When the terminal amino group concentration of Polyamide 12 (A1-1) per g of the Polyamide 12 composition (A-17) is defined as [X] (μeq/g), and the total concentration of the carboxyl group and acid anhydride group in maleic anhydride-modified ethylene-1-butene copolymer (A2-1) per g of the Polyamide 12 composition (A-17) is defined as [Y], the product of [X]×[Y] is 608.0 (μeq/g)$^2$.

Production of Polyamide 12 Composition (A-18)

Pellets of a Polyamide 12 composition containing 0.8 parts by weight of antioxidant and 0.2 parts by weight of phosphorous-based processing stabilizer based on a total of 100 parts by weight of Polyamide 12 (A11-1), Polyamide 6 (A12-5) and maleic anhydride-modified ethylene-1-butene copolymer (A2-1) at a ratio of 70.0:10.0:20.0 (weight ratio) were obtained using the same method as in the production of Polyamide 12 composition (A-6) with the exception not using a plasticizer in the production of Polyamide 12 composition (A-6) (this Polyamide 12 composition will hereinafter be referred to as (A-18)). When the terminal amino group concentration of Polyamide 12 (A11-1) and (A12-5) per g of the Polyamide 12 composition (A-18) is defined as [X] (μeq/g), and the total concentration of the carboxyl group and acid anhydride group in maleic anhydride-modified ethylene-1-butene copolymer (A2-1) per g of the Polyamide 12 composition (A-18) is defined as [Y], the product of [X]×[Y] is 712.0 (μeq/g)$^2$.

Production of Polyamide Composition (A-19)

Pellets of a Polyamide 12 composition containing 0.8 parts by weight of antioxidant and 0.2 parts by weight of phosphorous-based processing stabilizer based on a total of 100 parts by weight of Polyamide 12 (A11-1), Polyamide 6 (A12-5) and maleic anhydride-modified ethylene-1-butene copolymer (A2-1) at a ratio of 75.0:10.0:15.0 (weight ratio) were obtained using the same method as in the production of Polyamide 12 composition (A-6) with the exception of not using a plasticizer in the production of Polyamide 12 composition (A-6) (this Polyamide 12 composition will hereinafter be referred to as (A-19)). When the terminal amino group concentration of Polyamide 12 (A11-1) and (A12-5) per g of the Polyamide 12 composition (A-19) is defined as [X] (μeq/g), and the total concentration of the carboxyl group and acid anhydride group in maleic anhydride-modified ethylene-1-butene copolymer (A2-1) per g of the Polyamide 12 composition (A-19) is defined as [Y], the product of [X]×[Y] is 562.5 (μeq/g)$^2$.

Semi-Aromatic Polyamide (B1):

Production of Semi-Aromatic Polyamide (B1-1)

4.939 kg (29.7 mol) of terephthalic acid, 2.374 kg (15.0 mol) of 1,9-nonanediamine, 2.374 kg (15.0 mol) of 2-methyl-1,8-octanediamine, 65.9 g (0.54 mol) of benzoic acid, 9.8 g (0.1% by weight based on raw materials) of sodium hypophosphite monohydrate and 6.0 L of distilled water were placed in an autoclave followed by replacing the air inside the autoclave with nitrogen. After stirring for 30 minutes at 100° C., the internal temperature was raised to 190° C. over the course of 2 hours. At this time, the pressure inside the autoclave increased to 2.0 MPa. After continuing to react for 1 hour while in this state, the temperature was raised to 230° C. and subsequently held at a temperature of 230° C. for 2 hours followed by gradually releasing water vapor and allowing to react while holding the pressure at 2.0 MPa. Next, pressure was lowered to 1.0 MPa over the course of 30 minutes followed by allowing to additionally react for 1 hour to obtain a prepolymer. This prepolymer was then dried for 12 hours at 100° C. under reduced pressure, crushed to a size of 2 mm or less and subjected to solid phase polymerization for 8 hours at 210° C. and 0.013 kPa to obtain a semi-aromatic polyamide having a melting point of 265° C. and relative viscosity of 2.38 (Polyamide 9T:M8T=50:50 mol %) (this semi-aromatic polyamide will hereinafter be referred to as (B1-1)).

Production of Semi-Aromatic Polyamide (B1-2)

A semi-aromatic polyamide having a melting point of 305° C. and relative viscosity of 2.34 (Polyamide 9T:M8T=85:15 mol %) was obtained using the same method as in the production of semi-aromatic polyamide (B1-1) with the exception of changing the 2.374 kg (15.0 mol) of 1,9-nonanediamine and 2.374 kg (15.0 mol) of 2-methyl-1,8-octanediamine used in the production of semi-aromatic polyamide (B1-1) to 4.036 kg (25.5 mol) of 1,9-nonanediamine and 0.712 kg (4.5 mol) of 2-methyl-1,8-octanediamine, and changing the solid phase polymerization temperature from 210° C. to 240° C. (this semi-aromatic polyamide will hereinafter be referred to as (B1-2)).

Production of Semi-Aromatic Polyamide (B1-3)

A semi-aromatic polyamide having a melting point of 275° C. and relative viscosity of 2.37 (Polyamide 9N:M8N=50:50 mol %) was obtained using the same method as in the production of semi-aromatic polyamide (B1-1) with the exception of changing the 4.939 kg (29.7 mol) of terephthalic acid used in the production of semi-aromatic polyamide (B1-1) to 6.427 kg (29.7 mol) of 2,6-naphthalenedicarboxylic acid (this semi-aromatic polyamide will hereinafter be referred to as (B1-3)).

Production of Semi-Aromatic Polyamide (B1-4)

A semi-aromatic polyamide having a melting point of 265° C. and relative viscosity of 2.16 (Polyamide 9T:M8T=50:50 mol %) was obtained using the same method as in the production of semi-aromatic polyamide (B1-1) with the exception of changing the duration of solid phase polymerization from 8 hours in the production of semi-aromatic polyamide (B1-1) to 6 hours (this semi-aromatic polyamide will hereinafter be referred to as (B1-4)).

Production of Semi-Aromatic Polyamide (B1-5)

A semi-aromatic polyamide having a melting point of 315° C. and relative viscosity of 2.28 (Polyamide 6T:6I:66=65:25:10 mol %) was obtained using the same method as in the production of semi-aromatic polyamide (B1-1) with the exception of changing the 4.939 kg (29.7 mol) of terephthalic acid, 2.374 kg (15.0 mol) of 1,9-nonanediamine and 2.374 kg (15.0 mol) of 2-methyl-1,8-octanediamine used in the production of semi-aromatic polyamide (B1-1) to 3.240 kg (19.5 mol) of terephthalic acid, 1.246 kg (7.5 mol) of isophthalic acid, 0.438 kg (3.0 mol) of adipic acid and 3.718 kg (32.0 mol) of 1,6-hexanediamine, changing the polymerization temperature to 230° C. and changing the solid phase polymerization temperature to 250° C. (this semi-aromatic polyamide will hereinafter be referred to as (B1-5)). The semi-aromatic polyamide (B1-5) does not contain a 1,9-nonanediamine unit or 2-methyl-1,8-octanediamine unit as diamine units.

Semi-Aromatic Polyamide Composition (B):

Production of Semi-Aromatic Polyamide Composition (B-1)

An impact resistance improver in the form of maleic anhydride-modified ethylene-1-butene copolymer (A2-1), an antioxidant in the form of triethylene glycol-bis[3-(3-t-butyl-5-methyl-4-hydroxyphenyl)propionate] (Irganox 245, BASF Japan, Ltd.) and a phosphorous-based processing stabilizer in the form of tris(2,4-di-t-butylphenyl)phosphite (Irgafos 168, BASF Japan, Ltd.) were preliminarily mixed with semi-aromatic polyamide (B1-1), followed by supplying to a twin-screw melt kneader (Model TEX44, Japan Steel Works, Ltd.), melt-kneading at a cylinder temperature from 220° C. to 300° C. and extruding the molten resin in the form of a strand, followed by introducing into a water tank, cooling, cutting and vacuum-drying to obtain pellets of a semi-aromatic polyamide composition containing 0.8 parts by weight of antioxidant and 0.2 parts by weight of phosphorous-based processing stabilizer based on a total of 100 parts by weight of 90% by weight of semi-aromatic polyamide and 10% by weight of impact resistance improver (this semi-aromatic polyamide composition will hereinafter be referred to as (B-1)).

Production of Semi-Aromatic Polymer Composition (13-2)

Pellets of a semi-aromatic polyamide composition containing 0.8 parts by weight of antioxidant and 0.2 parts by weight of phosphorous-based processing stabilizer based on a total of 100 parts by weight of 90% by weight of semi-aromatic polyamide and 10% by weight of impact resistance improver were obtained using the same method as in the production of semi-aromatic polyamide composition (B-1) with the exception of changing the semi-aromatic polyamide (B1-1) used in the production of semi-aromatic polyamide composition (B-1) to (31-2) and changing the cylinder temperature from 300° C. to 340° C. (this semi-aromatic polyamide composition will hereinafter be referred to as (13-2)).

Production of Semi-Aromatic Polyamide Composition (B-3)

Pellets of a semi-aromatic polyamide composition containing 0.8 parts by weight of antioxidant and 02 parts by weight of phosphorous-based processing stabilizer based on a total of 100 parts by weight of 90% by weight of semi-aromatic polyamide and 10% by weight of impact resistance improver were obtained using the same method as in the production of semi-aromatic polyamide composition (B-1) with the exception of changing the semi-aromatic polyamide (B1-1) used in the production of semi-aromatic polyamide composition (B-1) to (B1-3) and changing the cylinder temperature from 300° C. to 310° C. (this semi-aromatic polyamide composition will hereinafter be referred to as (B-3)).

Production of Electrically Conductive Semi-Aromatic Polyamide (B-4)

Impact resistance improvers in the form of maleic anhydride-modified ethylene-1-butene copolymer (A2-2) and ethylene-1-butene copolymer (Tanner A-0550, Mitsui Chemicals, Inc.), an electrically conductive filler in the form of a carbon black (Ketjen Black EC600JD, Lion Corp.), an antioxidant in the form of triethylene glycol-bis[3-(3-t-butyl-5-methyl-4-hydroxyphenyl)propionate] (Irganox 245, BASF Japan, Ltd.) and a phosphorous-based processing stabilizer in the form of tris(2,4-di-t-butylphenyl)phosphite (Irgafos 168, BASF Japan, Ltd.) were preliminarily mixed with semi-aromatic polyamide (B1-4), followed by supplying to a twin-screw melt kneader (Model TEX44, Japan Steel Works, Ltd.), melt-kneading at a cylinder temperature from 240° C. to 310° C. and extruding the molten resin in the form of a strand, followed by introducing into a water tank, cooling, cutting and vacuum-drying to obtain pellets of an electrically conductive semi-aromatic polyamide composition containing 0.8 parts by weight of antioxidant and 0.2 parts by weight of phosphorous-based processing stabilizer based on a total of 100 parts by weight of 68% by weight of semi-aromatic polyamide, 25% by weight of impact resistance improver and 7% by weight of electrically conductive filler (this semi-aromatic polyamide composition will hereinafter be referred to as (B-4)).

Production of Semi-Aromatic Polyamide Composition (B-5)

Pellets of a semi-aromatic polyamide composition containing 0.8 parts by weight of antioxidant and 0.2 parts by weight of phosphorous-based processing stabilizer based on a total of 100 parts by weight of 90% by weight of semi-aromatic polyamide and 10% by weight of impact resistance improver were obtained using the same method as in the production of semi-aromatic polyamide composition (B-1) with the exception of changing the semi-aromatic polyamide (B1-1) used in the production of semi-aromatic polyamide composition (B-1) to (B1-5) and changing the cylinder temperature from 300° C. to 350° C. (this semi-aromatic polyamide composition will hereinafter be referred to as (B-5)).

Fluorine-Containing Polymer (C):

Production of Fluorine-Containing Polymer (C-1)

A polymerization tank having an internal volume of 100 L and equipped with a stirrer was degassed and charged with 92.1 kg of 1-hydrotridecafluorohexane, 16.3 kg of 1,3-dichloro-1,1,2,2,3-pentafluoropropane, 73 g of (perfluoroethyl)ethylene $CH_2=CH(CF_2)_2F$ and 10.1 g of itaconic anhydride (IAH) followed by injecting 9.6 kg of tetrafluoroethylene (TFE) and 0.7 kg of ethylene (E) under pressure, raising the temperature inside the polymerization tank to 66° C. and charging the tank with 433 cm$^3$ of a polymerization initiator in the form of 1,3-dichloro-1,1,2,2,3-pentafluoropropane solution containing 1% by weight of t-butylperoxypivalate to initiate polymerization.

A monomer mixed gas of TFE and E at a ratio of 60:40 (molar ratio) was continuously charged into the tank so as to maintain a constant pressure during polymerization. In addition, an amount of (perfluoroethyl)ethylene equivalent to 2.0 mol % and an amount of IAH equivalent to 0.5 mol % based on the total number of moles of TFE charged into the tank during polymerization were continuously charged into the tank. The temperature inside the polymerization tank was lowered to room temperature at the point 8.0 kg of the monomer mixed gas and 63 g of IAH has been charged into the tank 5.5 hours after the start of polymerization followed by purging the tank to return the pressure to normal pressure.

The resulting slurry-like fluorine-containing polymer was placed in a 200 L granulation tank charged with 75.0 kg of water followed by granulating while distilling off the solvent by raising the temperature to 105° C. while stirring. The resulting granules were then dried for 5 hours at 150° C. to obtain 8.3 kg of granules of a fluorine-containing polymer.

The composition of the fluorine-containing polymer was such that the ratio of a polymer unit based on TFE, a polymer unit based on E, a polymer unit based on $CH_2=CH(CF_2)_2F$ and a polymer unit based on IAH was 58.5:39.0:2.0:0.5 (molar ratio), and the melting point thereof was 240° C. These granules were melted at 280° C. and residence time of 2 minutes using an extruder to obtain pellets of the fluorine-containing polymer (this fluorine-containing polymer will hereinafter be referred to as (C-1)). The fluorine-containing polymer (C-1) has a carboxyl group for the functional group that has reactivity with an amino group.

Production of Fluorine-Containing Polymer (C-2)

Pellets of an electrically conductive fluorine-containing polymer were obtained by preliminarily mixing 100 parts by weight of fluorine-containing polymer (C-1) and 13 parts by weight of carbon black (Denka Co., Ltd.), supplying to a twin-screw melt kneader (Model TEM-48S, Toshiba Machine Co., Ltd.), melt-kneading at a cylinder temperature from 240° C. to 300° C. and extruding the molten resin in the form of a strand, followed by introducing into a water tank to cool the discharged strand with water, cutting the strand with a pelletizer and drying for 10 hours with a dryer at 120° C. to remove moisture and obtain pellets of an electrically conductive fluorine-containing polymer (this electrically conductive fluorine-containing polymer will hereinafter be referred to as (C-2)).

Production of Fluorine-Containing Polymer (C-3)

7.6 kg of a fluorine-containing polymer were obtained using the same method as in the production of fluorine-containing polymer (C-1) with the exception of not charging itaconic anhydride (IAH) in the production of fluorine-containing polymer (C-1).

The composition of the fluorine-containing polymer was such that the ratio of a polymer unit based on TFE, a polymer unit based on E, a polymer unit based on $CH_2=CH(CF_2)_2F$ and a polymer unit based on IAH was 58.8:39.2:2.0 (molar ratio), and the melting point thereof was 242° C. These granules were melted at 280° C. and residence time of 2 minutes using an extruder to obtain pellets of the fluorine-containing polymer (this fluorine-containing polymer will hereinafter be referred to as (C-3)).

Production of Fluorine-Containing Polymer (C-4)

Pellets of an electrically conductive fluorine-containing polymer were obtained using the same method as in the production of the electrically conductive fluorine-containing polymer (C-2) with the exception of changing the fluorine-containing polymer (C-1) used in the production of the electrically conducive fluorine-containing polymer (C-2) to (C-3) (this electrically conductive fluorine-containing polymer will hereinafter be referred to as (C-4)).

Production of Fluorine-Containing Polymer (C-5)

A polymerization tank having an internal volume of 100 L and equipped with a stirrer was degassed and charged with 42.5 kg of 1,3-dichloro-1,1,2,2,3-pentafluoropropane, $CF_2=CFOCF_2CF_2CF_3$ (perfluoro(propyl vinyl ether): PPVE), 2.13 kg of 1,1,2,4,4,5,5,6,6,6-decafluoro-3-oxahex-1-ene) and 51.0 kg of hexafluoropropylene (HFP). Next, the temperature inside the polymerization tank was raised to 50° C. followed by charging the tank with 4.25 kg of tetrafluoroethylene (TFE) and raising the pressure to 1.0 MPa/G. The tank was then charged with 340 cm$^3$ of a polymerization initiator in the form of a 1,3-dichloro-1,1,2,2,3-pentafluoropropane solution containing 0.3% by weight of (perfluorobutyryl)peroxide to initiate polymerization followed by charging the tank with 340 cm$^3$ of the polymerization initiator solution every ten minutes thereafter.

During polymerization, the tank was continuously charged with TFE so as to maintain the pressure at 1.0 MPa/G. In addition, an amount of 1,3-dichloro-1,1,2,2,3-pentafluoropropane solution containing 0.3% by weight of 5-norbornene-2,3-dicarboxylic anhydride (NAH) equivalent to 0.1 mol % based on the number of moles of TFE charged during polymerization was continuously charged into the polymerization tank.

The temperature inside the polymerization tank was lowered to room temperature and the tank was purged to return the pressure to normal pressure at the point 8.5 kg of TFE had been charged into the tank 5 hours after the start of polymerization.

The resulting slurry-like fluorine-containing polymer was placed in a 200 L granulation tank charged with 75.0 kg of water followed by granulating while distilling off the solvent by raising the temperature to 105° C. while stirring. The resulting granules were then dried for 5 hours at 150° C. to obtain 7.5 kg of granules of a fluorine-containing polymer.

The composition of the fluorine-containing polymer was such that the ratio of a polymer unit based on TFE, a polymer unit based on PPVE, a polymer unit based on HFP and a polymer unit based on NAH was 91.2:1.5:7.2:0.1 (mol %), and the melting point thereof was 262° C. These granules were melted at 300° C. and residence time of 2 minutes using an extruder to obtain pellets of the fluorine-containing polymer (this fluorine-containing polymer will hereinafter be referred to as (C-5)).

Production of Fluorine-Containing Polymer (C-6)

7.6 kg of a fluorine-containing polymer were obtained using the same method as in the production of the fluorine-containing polymer (C-5) with the exception of not charging the tank with the 1,3-dichloro-1,1,2,2,3-pentafluoropropane solution containing 0.3% by weight of 5-norbornene-2,3-dicarboxylic anhydride (NAH) used in the production of the fluorine-containing polymer (C-5).

The composition of the fluorine-containing polymer was such that the ratio of a polymer unit based on TFE, a polymer unit based on PPVE and a polymer unit based on HFP was 91.5:1.5:7.0 (mol %), and the melting point thereof was 257° C. These granules were melted at 300° C. and residence time of 2 minutes using an extruder to obtain pellets of the fluorine-containing polymer (this fluorine-containing polymer will hereinafter be referred to as (C-6)).

Production of Electrically Conductive Fluorine-Containing Polymer (C-7)

An electrically conductive fluorine-containing polymer were obtained using the same method as in the production of the fluorine-containing polymer (C-2) with the exception of changing the fluorine-containing polymer (C-1) used in the production of the electrically conductive fluorine-containing polymer (C-2) to (C-6), changing the 13 parts by weight of carbon black to 11 parts by weight, and changing the cylinder temperature from 300° C. to 320° C. (this electrically conductive fluorine-containing polymer will hereinafter be referred to as (C-7)).

Production of Fluorine-Containing Polymer (C-8)

After charging 51.5 kg of demineralized pure water into a jacketed polymerization tank equipped with a stirrer and able to house 174 kg of water and adequately replacing the space inside the tank with pure nitrogen gas, the nitrogen gas was removed by drawing a vacuum. Next, 40.6 kg of octafluorocyclobutane, 1.6 kg of chlorotrifluoroethylene (CTFE), 4.5 kg of tetrafluoroethylene (TFE) and 2.8 kg of perfluoro(propylvinylether) (PPVE) were injected under pressure. 0.090 kg of a chain transfer agent in the form of n-propyl alcohol were added followed by adjusting the temperature to 35° C. and beginning stirring. 0.44 kg of a methanol solution containing 50% by weight of a polymerization initiator in the form of di-n-propylperoxydicarbonate were added thereto to initiate polymerization. During polymerization, after polymerizing while additionally charging a mixed monomer prepared to have the same composition as the desired copolymer composition so as to maintain the pressure inside the tank at 0.66 MPa, residual gas in the tank was evacuated and the polymer formed was removed, washed with demineralized pure water and dried to obtain 30.5 kg of a fluorine-containing polymer in the form of a granular powder.

The composition of the fluorine-containing polymer was such that the molar ratio of a polymer unit based on CTFE, a polymer unit based on TFE and a polymer unit based on PPVE was 24.4:73.1:2.5, and the number of carbonate terminal groups derived from the polymerization initiator of the fluorine-containing polymer was 170. In addition, the melting point was 241° C.

These granules were melted at 290° C. and residence time of 2 minutes using an extruder to obtain pellets of the fluorine-containing polymer (this fluorine-containing polymer will hereinafter be referred to as (C-8)).

Production of Fluorine-Containing Polymer (C-9)

29.8 kg of a fluorine-containing polymer were obtained using the same method as in the production of the fluorine-containing polymer (C-8) with the exception of not charging the methanol solution containing 50% by weight of di-n-propylperoxydicarbonate used in the production of the fluorine-containing polymer (C-8).

The composition of the fluorine-containing polymer was such that the molar ratio of a polymer unit based on CTFE, a polymer unit based on TFE and a polymer unit based on PPVE was 24.4:73.1:2.5 and the melting point was 241° C.

These granules were melted at 290° C. and residence time of 2 minutes using an extruder to obtain pellets of the fluorine-containing polymer (this fluorine-containing polymer will hereinafter be referred to as (C-9)).

Production of Electrically Conductive Fluorine-Containing Polymer (C-10)

Pellets of an electrically conductive fluorine-containing polymer were obtained using the same method as in the production of the electrically conductive fluorine-containing polymer (C-7) with the exception of changing the fluorine-containing polymer (C-6) used in the production of the electrically conductive fluorine-containing polymer (C-7) to (C-9) and changing the cylinder temperature from 320° C. to 300° C. (this fluorine-containing polymer will hereinafter be referred to as (C-10)).

Example 1

Using the previously indicated Polyamide 12 composition (A-1) and the semi-aromatic polyamide composition (B-1), (A-1) was melted at an extrusion temperature of 270° C. and (B-1) was melted at an extrusion temperature of 300° C. using separate Plabor (Research Laboratory of Plastics Technology Co., Ltd.) two-layer tube-forming machines, and the discharged molten resins were joined with an adapter to form a multi-layered hollow body. Continuing, the multi-layered hollow body was cooled with a sizing die for controlling dimensions followed by drawing the hollow body to obtain a multi-layer tube having an inner diameter of 6 mm, outer diameter of 8 mm and layer configuration of (a)/(b) of 0.75/0.25 mm when defining the layer composed of (A-1) (outermost layer) as the (a) layer and the layer composed of (B-1) (innermost layer) as the (b) layer. The results of measuring the properties of this multi-layer tube are shown in Table 1.

Example 2

A multi-layer tube having the layer configuration shown in Table 1 was obtained using the same method as Example 1 with the exception of changing the Polyamide 12 composition (A-1) used in Example 1 to (A-2). The results of measuring the properties of this multi-layer tube are shown in Table 1.

Example 3

A multi-layer tube having the layer configuration shown in Table 1 was obtained using the same method as Example 1 with the exception of changing the Polyamide 12 composition (A-1) used in Example 1 to (A-3). The results of measuring the properties of this multi-layer tube are shown in Table 1.

Example 4

A multi-layer tube having the layer configuration shown in Table 1 was obtained using the same method as Example 1 with the exception of changing the Polyamide 12 composition (A-1) used in Example 1 to (A-4). The results of measuring the properties of this multi-layer tube are shown in Table 1.

Example 5

A multi-layer tube having the layer configuration shown in Table 1 was obtained using the same method as Example 1 with the exception of changing the Polyamide 12 composition (A-1) used in Example 1 to (A-5). The results of measuring the properties of this multi-layer tube are shown in Table 1.

Example 6

A multi-layer tube having the layer configuration shown in Table 1 was obtained using the same method as Example 1 with the exception of changing the Polyamide 12 composition (A-1) used in Example 1 to (A-6). The results of measuring the properties of this multi-layer tube are shown in Table 1.

Example 7

A multi-layer tube having the layer configuration shown in Table 1 was obtained using the same method as Example 1 with the exception of changing the Polyamide 12 composition (A-1) used in Example 1 to (A-7). The results of measuring the properties of this multi-layer tube are shown in Table 1.

Example 8

A multi-layer tube having the layer configuration shown in Table 1 was obtained using the same method as Example 1 with the exception of changing the Polyamide 12 composition (A-1) used in Example 1 to (A-8). The results of measuring the properties of this multi-layer tube are shown in Table 1.

Example 9

A multi-layer tube having the layer configuration shown in Table 1 was obtained using the same method as Example 1 with the exception of changing the Polyamide 12 composition (A-1) used in Example 1 to (A-9). The results of measuring the properties of this multi-layer tube are shown in Table 1.

Example 10

A multi-layer tube having the layer configuration shown in Table 1 was obtained using the same method as Example 1 with the exception of changing the Polyamide 12 composition (A-1) used in Example 1 to Polyamide 610 (A-10). The results of measuring the properties of this multi-layer tube are shown in Table 1.

Example 11

A multi-layer tube having the layer configuration shown in Table 1 was obtained using the same method as Example 1 with the exception of changing the Polyamide 12 composition (A-1) used in Example 1 to Polyamide 612 (A-11). The results of measuring the properties of this multi-layer tube are shown in Table 1.

Example 12

A multi-layer tube having the layer configuration shown in Table 1 was obtained using the same method as Example 1 with the exception of changing the Polyamide 12 composition (A-1) used in Example 1 to (A-12). The results of measuring the properties of this multi-layer tube are shown in Table 1.

Example 13

A multi-layer tube having the layer configuration shown in Table 1 was obtained using the same method as Example 1 with the exception of changing semi-aromatic polyamide composition (B-1) used in Example 1 to (B-2) and changing the extrusion temperature of (B-2) to 340° C. The results of measuring the properties of this multi-layer tube are shown in Table 1.

Example 14

A multi-layer tube having the layer configuration shown in Table 1 was obtained using the same method as Example 1 with the exception of changing semi-aromatic polyamide composition (B-1) used in Example 1 to (B-3) and changing the extrusion temperature of (B-3) to 310° C. The results of measuring the properties of this multi-layer tube are shown in Table 1.

Example 15

A multi-layer tube having the layer configuration shown in Table 1 was obtained using the same method as Example 1 with the exception of changing semi-aromatic polyamide composition (B-1) used in Example 1 to electrically conductive semi-aromatic polyamide composition (B-4) and changing the extrusion temperature of (B-4) to 310° C. The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 16

Using the previously indicated Polyamide 12 composition (A-1), the semi-aromatic polyamide composition (B-1) and the electrically conductive semi-aromatic polyamide composition (B-4), (A-1) was melted at an extrusion temperature of 260° C., (B-1) was melted at an extrusion temperature of 300° C. and (B-4) was melted at an extrusion temperature of 310° C. using separate Plabor (Research Laboratory of Plastics Technology Co., Ltd.) three-layer tube-forming machines, and the discharged molten resins were joined with an adapter to form a multi-layered hollow body. Continuing, the multi-layered hollow body was cooled with a sizing die for controlling dimensions followed by drawing the hollow body to obtain a multi-layer tube having an inner diameter of 6 mm, outer diameter of 8 mm and layer configuration of (a)/(b)/(b') of 0.75/0.15/0.10 mm when defining the layer composed of (A-1) (outermost layer) as the (a) layer, the layer composed of (B-1) (intermediate layer) as the (b) layer and the layer composed of (B-4) (innermost layer) as the (b') layer. The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 17

A multi-layer tube having the layer configuration shown in Table 1 was obtained using the same method as Example 16 with the exception of changing semi-aromatic polyamide composition (B-1) used in Example 16 to (B-3) and changing the extrusion temperature of (B-3) to 310° C. The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 18

A multi-layer tube having an inner diameter of 6 mm, outer diameter of 8 mm and layer configuration of (a)/(b)/(c) of 0.70/0.15/0.15 mm when defining the layer composed of (A-1) (outermost layer) as the (a) layer, the layer composed of (B-1) (intermediate layer) as the (b) layer, and the layer composed of (C-1) (innermost layer) as the (c) layer was obtained by using the previously indicated Polyamide 12 composition (A-1), semi-aromatic polyamide composition (B-1) and fluorine-containing polymer (C-1), melting (A-1) at an extrusion temperature of 260° C., (B-1) at an extrusion temperature of 300° C. and (C-1) at an extrusion temperature of 280° C. using separate Plabor (Research Laboratory of Plastics Technology Co., Ltd.) three-layer tube-forming machines and joining the discharged molten resin with an adapter, followed by cooling with a sizing die for controlling dimensions and drawing the hollow body. The results of measuring the properties of this multi-layer tube are shown in Table 1.

Example 19

A multi-layer tube having the layer configuration shown in Table 1 was obtained in the same manner as Example 18 with the exception of changing the semi-aromatic polyamide composition (B-1) used in Example 18 to (B-3) and changing the extrusion temperature of (B-3) to 310° C. The results of measuring the properties of this multi-layer tube are shown in Table 1.

Example 20

A multi-layer tube having the layer configuration shown in Table 1 was obtained in the same manner as Example 18 with the exception of changing the fluorine-containing polymer (C-1) used in Example 18 to electrically conductive fluorine-containing polymer (C-2) and changing the extrusion temperature of (C-2) to 300° C. The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 21

A multi-layer tube having the layer configuration shown in Table 1 was obtained in the same manner as Example 18 with the exception of changing the fluorine-containing polymer (C-1) used in Example 18 to (C-5) and changing the extrusion temperature of (C-5) to 300° C. The results of measuring the properties of this multi-layer tube are shown in Table 1.

Example 22

A multi-layer tube having the layer configuration shown in Table 1 was obtained in the same manner as Example 18 with the exception of changing the fluorine-containing polymer (C-1) used in Example 18 to (C-8) and changing the extrusion temperature of (C-8) to 290° C. The results of measuring the properties of this multi-layer tube are shown in Table 1.

Example 23

A multi-layer tube having an inner diameter of 6 mm, outer diameter of 8 mm and layer configuration of (a)/(b)/(c)/(c') of 0.65/0.15/0.10/0.10 mm when defining the layer composed of (A-1) (outermost layer) as the (a) layer, defining the layer composed of (B-1) (intermediate layer) as the (b) layer, defining the layer composed of (C-1) as the (c) layer, and defining the layer composed of (C-2) (innermost layer) as the (c') layer was obtained by using the previously indicated Polyamide 12 composition (A-1), semi-aromatic polyamide composition (B-1), fluorine-containing polymer (C-1) and electrically conductive fluorine-containing polymer (C-2), melting (A-1) at an extrusion temperature of 260° C., (B-1) at an extrusion temperature of 300° C., (C-1) at an extrusion temperature of 280° C. and (C-2) at an extrusion temperature of 300° C. using separate Plabor (Research Laboratory of Plastics Technology Co., Ltd.) four-layer tube-forming machines and joining the discharged molten resin with an adapter, followed by cooling with a sizing die for controlling dimensions and drawing the hollow body. The results of measuring the properties of this multi-layer tube are shown in Table 1. In addition, when the electrical conductivity of this multi-layer tube was measured basically in compliance with SAE J-2260, it was determined to be $10^6$ ΩI/square or less, thereby confirming superior antistatic performance.

Example 24

A multi-layer tube having the layer configuration shown in Table 1 was obtained in the same manner as Example 23 with the exception of changing the semi-aromatic polyamide composition (B-1) used in Example 23 to (B-3) and changing the extrusion temperature of (B-3) to 310° C. The results of measuring the properties of this multi-layer tube are shown in Table 1.

Example 25

A multi-layer tube having the layer configuration shown in Table 1 was obtained in the same manner as Example 23 with the exception of changing the electrically conductive fluorine-containing polymer (C-2) used in Example 23 to (C-3) and changing the extrusion temperature of (C-8) to 280° C. The results of measuring the properties of this multi-layer tube are shown in Table 1.

Example 26

A multi-layer tube having the layer configuration shown in Table 1 was obtained in the same manner as Example 23 with the exception of changing the electrically conductive fluorine-containing polymer (C-2) used in Example 23 to (C-4). The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 27

A multi-layer tube having the layer configuration shown in Table 1 was obtained in the same manner as Example 23 with the exception of changing the fluorine-containing polymer (C-1) used in Example 23 to (C-5), changing the electrically conductive fluorine-containing polymer (C-2) to the fluorine-containing polymer (C-6) and changing the extrusion temperature of (C-5) to 300° C. The results of measuring the properties of this multi-layer tube are shown in Table 1.

Example 28

A multi-layer tube having the layer configuration shown in Table 1 was obtained in the same manner as Example 23 with the exception of changing the fluorine-containing polymer (C-1) used in Example 23 to (C-5), changing the electrically conductive fluorine-containing polymer (C-2) to (C-7), changing the extrusion temperature of (C-5) to 300° C. and changing the extrusion temperature of (C-7) to 320° C. The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 29

A multi-layer tube having the layer configuration shown in Table 1 was obtained in the same manner as Example 23 with the exception of changing the fluorine-containing polymer (C-1) used in Example 23 to (C-8), changing the electrically conductive fluorine-containing polymer (C-2) to the fluorine-containing polymer (C-9), changing the extrusion temperature of (C-8) to 290° C. and changing the extrusion temperature of (C-9) to 290° C. The results of measuring the properties of this multi-layer tube are shown in Table 1.

Example 30

A multi-layer tube having the layer configuration shown in Table 1 was obtained in the same manner as Example 23 with the exception of changing the fluorine-containing polymer (C-1) used in Example 23 to (C-8), changing the electrically conductive fluorine-containing polymer (C-2) to (C-10) and changing the extrusion temperature of (C-8) to 290° C. The results of measuring the properties of this multi-layer tube are shown in Table 1. In addition, when the electrical conductivity of this multi-layer tube was measured basically in compliance with SAE J-2260, it was determined to be $10^6$ Ω/square or less, thereby confirming superior antistatic performance.

Example 31

A multi-layer tube having the layer configuration shown in Table 1 was obtained in the same manner as Example 1 with the exception of changing the Polyamide 12 composition (A-1) used in Example 1 to (A-16). The results of measuring the properties of this multi-layer tube are shown in Table 1.

Example 32

A multi-layer tube having the layer configuration shown in Table 1 was obtained in the same manner as Example 1 with the exception of changing the Polyamide 12 composition (A-1) used in Example 1 to (A-17). The results of measuring the properties of this multi-layer tube are shown in Table 1.

Example 33

A multi-layer tube having the layer configuration shown in Table 1 was obtained in the same manner as Example 1 with the exception of changing the Polyamide 12 composition (A-1) used in Example 1 to (A-18). The results of measuring the properties of this multi-layer tube are shown in Table 1.

Example 34

A multi-layer tube having the layer configuration shown in Table 1 was obtained in the same manner as Example 1 with the exception of changing the Polyamide 12 composition (A-1) used in Example 1 to (A-19). The results of measuring the properties of this multi-layer tube are shown in Table 1.

Comparative Example 1

A single-layer multi-layer tube shown in Table 1 was obtained in the same manner as Example 1 with the exception of not using the semi-aromatic polyamide composition (B-1) used in Example 1. The results of measuring the properties of this single-layer multi-layer tube are shown in Table 1.

Comparative Example 2

A single-layer multi-layer tube shown in Table 1 was obtained in the same manner as Example 1 with the exception of not using the Polyamide 12 composition (A-1) used in Example 1. The results of measuring the properties of this single-layer multi-layer tube are shown in Table 1.

Comparative Example 3

A multi-layer tube having the layer configuration shown in Table 1 was obtained in the same manner as Example 1 with the exception of changing the Polyamide 12 composition (A-1) used in Example 1 to (A-13). The results of measuring the properties of this multi-layer tube are shown in Table 1.

Comparative Example 4

A multi-layer tube having the layer configuration shown in Table 1 was obtained in the same manner as Example 1 with the exception of changing the Polyamide 12 composition (A-1) used in Example 1 to (A-14). The results of measuring the properties of this multi-layer tube are shown in Table 1.

Comparative Example 5

A multi-layer tube having the layer configuration shown in Table 1 was obtained in the same manner as Example 1 with the exception of changing the Polyamide 12 composition (A-1) used in Example 1 to (A-15). The results of measuring the properties of this multi-layer tube are shown in Table 1.

Comparative Example 6

A multi-layer tube having the layer configuration shown in Table 1 was obtained in the same manner as Example 1 with the exception of changing the semi-aromatic polyamide composition (B-1) used in Example 1 to (B-5) and changing the extrusion temperature of (B-5) to 350° C. The results of measuring the properties of this multi-layer tube are shown in Table 1.

Comparative Example 7

A multi-layer tube having the layer configuration shown in Table 1 was obtained in the same manner as Example 16 with the exception of changing the Polyamide 12 composition (A-1) used in Example 16 to (A-13). The results of measuring the properties of this multi-layer tube are shown in Table 1.

Comparative Example 8

A multi-layer tube having the layer configuration shown in Table 1 was obtained in the same manner as Example 18 with the exception of changing the Polyamide 12 composition (A-1) used in Example 18 to (A-13). The results of measuring the properties of this multi-layer tube are shown in Table 1.

Comparative Example 9

A multi-layer tube having the layer configuration shown in Table 1 was obtained in the same manner as Example 18 with the exception of changing the semi-aromatic polyamide composition (B-1) used in Example 18 to (B-5) and changing the extrusion temperature of (B-5) to 350° C. The results of measuring the properties of this multi-layer tube are shown in Table 1.

Comparative Example 10

A multi-layer tube having the layer configuration shown in Table 1 was obtained in the same manner as Example 23 with the exception of changing the Polyamide 12 composition (A-1) used in Example 23 to (A-13). The results of measuring the properties of this multi-layer tube are shown in Table 1.

Comparative Example 11

A multi-layer tube having the layer configuration shown in Table 1 was obtained in the same manner as Example 23 with the exception of changing the semi-aromatic polyamide composition (B-1) used in Example 23 to (B-5) and changing the extrusion temperature of (B-5) to 350° C. The results of measuring the properties of this multi-layer tube are shown in Table 1.

TABLE 1

| | Aliphatic polyamide composition | | | | | | Terminal amino group | Carboxyl group and acid anhydride group | | Outermost layer | |
|---|---|---|---|---|---|---|---|---|---|---|---|
| | Aliphatic polyamide (A1) or (A11) | Wt % | Aliphatic polyamide (A12) | Wt % | Modified elastomer (A2) | Wt % | concentration [X] [µeq/g] | concentration [Y] [µeq/g] | [X] × [Y] [(µeq/g)$^3$] | Type | Thickness [mm] |
| Example 1 | A1-1 | 82.5 | — | — | A2-1 | 15.0 | 31.4 | 15.0 | 470.3 | A-1 | 0.75 |
| Example 2 | A11-2 | 57.8 | A12-4 | 24.8 | A2-1 | 15.0 | 35.3 | 15.0 | 529.7 | A-2 | 0.75 |
| Example 3 | A11-3 | 49.5 | A12-4 | 33.0 | A2-1 | 15.0 | 34.7 | 15.0 | 519.8 | A-3 | 0.75 |
| Example 4 | A1-2 | 82.5 | — | — | A2-1 | 15.0 | 76.7 | 15.0 | 1150.0 | A-4 | 0.75 |
| Example 5 | A11-3 | 16.5 | A12-1 | 66.0 | A2-1 | 15.0 | 64.7 | 15.0 | 970.2 | A-5 | 0.75 |
| Example 6 | A11-1 | 72.5 | A12-5 | 10.0 | A2-1 | 15.0 | 36.5 | 15.0 | 548.3 | A-6 | 0.75 |
| Example 7 | A11-1 | 72.5 | A12-6 | 10.0 | A2-1 | 15.0 | 38.8 | 15.0 | 581.3 | A-7 | 0.75 |
| Example 8 | A11-1 | 72.5 | A12-2 | 10.0 | A2-1 | 15.0 | 34.9 | 15.0 | 522.8 | A-8 | 0.75 |

TABLE 1-continued

| | | | | | | | | | | | |
|---|---|---|---|---|---|---|---|---|---|---|---|
| Example 9 | A11-1 | 72.5 | A12-3 | 10.0 | A2-1 | 15.0 | 34.1 | 15.0 | 510.8 | A-9 | 0.75 |
| Example 10 | A1-3 | 62.5 | — | — | A2-1 | 15.0 | 60.2 | 15.0 | 903.4 | A-10 | 0.75 |
| Example 11 | A1-4 | 82.5 | — | — | A2-1 | 15.0 | 53.6 | 15.0 | 804.4 | A-11 | 0.75 |
| Example 12 | A1-1 | 82.5 | — | — | A2-2 | 15.0 | 31.4 | 7.5 | 235.1 | A-12 | 0.75 |
| Example 13 | A1-1 | 82.5 | — | — | A2-1 | 15.0 | 31.4 | 15.0 | 470.3 | A-1 | 0.75 |
| Example 14 | A1-1 | 82.5 | — | — | A2-1 | 15.0 | 31.4 | 15.0 | 470.3 | A-1 | 0.75 |
| Example 15 | A1-1 | 82.5 | — | — | A2-1 | 15.0 | 31.4 | 15.0 | 470.3 | A-1 | 0.75 |
| Example 16 | A1-1 | 82.5 | — | — | A2-1 | 15.0 | 31.4 | 15.0 | 470.3 | A-1 | 0.75 |
| Example 17 | A1-1 | 82.5 | — | — | A2-1 | 15.0 | 31.4 | 15.0 | 470.3 | A-1 | 0.75 |
| Example 18 | A1-1 | 82.5 | — | — | A2-1 | 15.0 | 31.4 | 15.0 | 470.3 | A-1 | 0.70 |
| Example 19 | A1-1 | 82.5 | — | — | A2-1 | 15.0 | 31.4 | 15.0 | 470.3 | A-1 | 0.70 |
| Example 20 | A1-1 | 82.5 | — | — | A2-1 | 15.0 | 31.4 | 15.0 | 470.3 | A-1 | 0.70 |
| Example 21 | A1-1 | 82.5 | — | — | A2-1 | 15.0 | 31.4 | 15.0 | 470.3 | A-1 | 0.70 |
| Example 22 | A1-1 | 82.5 | — | — | A2-1 | 15.0 | 31.4 | 15.0 | 470.3 | A-1 | 0.70 |
| Example 23 | A1-1 | 82.5 | — | — | A2-1 | 15.0 | 31.4 | 15.0 | 470.3 | A-1 | 0.65 |
| Example 24 | A1-1 | 82.5 | — | — | A2-1 | 15.0 | 31.4 | 15.0 | 470.3 | A-1 | 0.65 |
| Example 25 | A1-1 | 82.5 | — | — | A2-1 | 15.0 | 31.4 | 15.0 | 470.3 | A-1 | 0.65 |
| Example 26 | A1-1 | 82.5 | — | — | A2-1 | 15.0 | 31.4 | 15.0 | 470.3 | A-1 | 0.65 |
| Example 27 | A1-1 | 82.5 | — | — | A2-1 | 15.0 | 31.4 | 15.0 | 470.3 | A-1 | 0.65 |
| Example 28 | A1-1 | 82.5 | — | — | A2-1 | 15.0 | 31.4 | 15.0 | 470.3 | A-1 | 0.65 |
| Example 29 | A1-1 | 82.5 | — | — | A2-1 | 15.0 | 31.4 | 15.0 | 470.3 | A-1 | 0.65 |
| Example 30 | A1-1 | 82.5 | — | — | A2-1 | 15.0 | 31.4 | 15.0 | 470.3 | A-1 | 0.65 |
| Example 31 | A1-1 | 85.0 | — | — | A2-1 | 15.0 | 32.3 | 15.0 | 484.5 | A-16 | 0.75 |
| Example 32 | A1-1 | 80.0 | — | — | A2-1 | 20.0 | 30.4 | 20.0 | 608.0 | A-17 | 0.75 |
| Example 33 | A11-1 | 70.0 | A12-5 | 10.0 | A2-1 | 20.0 | 35.6 | 20.0 | 712.0 | A-18 | 0.75 |
| Example 34 | A11-1 | 75.0 | A12-5 | 10.0 | A2-1 | 15.0 | 37.5 | 15.0 | 562.5 | A-19 | 0.75 |
| Comparative Example 1 | A1-1 | 82.5 | — | — | A2-1 | 15.0 | 31.4 | 15.0 | 470.3 | A-1 | 1.00 |
| Comparative Example 2 | — | — | — | — | — | — | — | — | — | — | — |
| Comparative Example 3 | A1-5 | 87.5 | — | — | A2-1 | 10.0 | 17.5 | 10.0 | 175.0 | A-13 | 0.75 |
| Comparative Example 4 | A1-5 | 82.5 | — | — | A2-2 | 15.0 | 16.5 | 7.5 | 123.8 | A-14 | 0.75 |
| Comparative Example 5 | A1-1 | 82.5 | — | — | A2-3 | 15.0 | 31.4 | 3.8 | 117.6 | A-15 | 0.75 |
| Comparative Example 6 | A1-1 | 82.5 | — | — | A2-1 | 15.0 | 31.4 | 15.0 | 470.3 | A-1 | 0.75 |
| Comparative Example 7 | A1-5 | 87.5 | — | — | A2-1 | 10.0 | 17.5 | 10.0 | 175.0 | A-13 | 0.75 |
| Comparative Example 8 | A1-5 | 87.5 | — | — | A2-1 | 10.0 | 17.5 | 10.0 | 175.0 | A-13 | 0.70 |
| Comparative Example 9 | A1-1 | 82.5 | — | — | A2-1 | 15.0 | 31.4 | 15.0 | 470.3 | A-1 | 0.70 |
| Comparative Example 10 | A1-5 | 87.5 | — | — | A2-1 | 10.0 | 17.5 | 10.0 | 175.0 | A-13 | 0.65 |
| Comparative Example 11 | A1-1 | 82.5 | — | — | A2-1 | 15.0 | 31.4 | 15.0 | 470.3 | A-1 | 0.65 |

| | Intermediate layer | | Inner layer | | Innermost layer | | Low-temperature Impact resistance (−40° C.) (no. of burst | Alcohol-containing gasoline permeation | Peel strength [N/cm] | |
|---|---|---|---|---|---|---|---|---|---|---|
| | Type | Thickness [mm] | Type | Thickness [mm] | Type | Thickness [mm] | samples/no. of test samples) | [g/m$^2$ · day] | Initial | After heat treatment |
| Example 1 | — | — | — | — | B-1 | 0.25 | 0/10 | 9.5 | 40 | 25 |
| Example 2 | — | — | — | — | B-1 | 0.25 | 0/10 | 9.5 | 41 | 27 |
| Example 3 | — | — | — | — | B-1 | 0.25 | 0/10 | 9.5 | 38 | 22 |
| Example 4 | — | — | — | — | B-1 | 0.25 | 0/10 | 9.5 | 49 | 30 |
| Example 5 | — | — | — | — | B-1 | 0.25 | 0/10 | 9.5 | 48 | 28 |
| Example 6 | — | — | — | — | B-1 | 0.25 | 0/10 | 9.5 | 50 | 37 |
| Example 7 | — | — | — | — | B-1 | 0.25 | 0/10 | 9.5 | 53 | 39 |
| Example 8 | — | — | — | — | B-1 | 0.25 | 0/10 | 9.5 | 49 | 37 |
| Example 9 | — | — | — | — | B-1 | 0.25 | 0/10 | 9.5 | 48 | 36 |
| Example 10 | — | — | — | — | B-1 | 0.25 | 0/10 | 8.5 | 49 | 33 |
| Example 11 | — | — | — | — | B-1 | 0.25 | 0/10 | 8.5 | 47 | 30 |
| Example 12 | — | — | — | — | B-1 | 0.25 | 0/10 | 9.5 | 36 | 23 |
| Example 13 | — | — | — | — | B-2 | 0.25 | 0/10 | 4.0 | 37 | 24 |
| Example 14 | — | — | — | — | B-3 | 0.25 | 0/10 | 2.0 | 38 | 24 |
| Example 15 | — | — | — | — | B-4 | 0.25 | 0/10 | 9.5 | 39 | 24 |
| Example 16 | — | — | B-1 | 0.15 | B-4 | 0.10 | 0/10 | 9.5 | 40 | 25 |
| Example 17 | — | — | B-3 | 0.15 | B-4 | 0.10 | 0/10 | 3.0 | 37 | 23 |
| Example 18 | — | — | B-1 | 0.15 | C-1 | 0.15 | 0/10 | 7.5 | 40 | 24 |
| Example 19 | — | — | B-3 | 0.15 | C-1 | 0.15 | 0/10 | 3.0 | 37 | 23 |
| Example 20 | — | — | B-1 | 0.15 | C-2 | 0.15 | 0/10 | 7.5 | 41 | 25 |
| Example 21 | — | — | B-1 | 0.15 | C-5 | 0.15 | 0/10 | 3.0 | 39 | 24 |
| Example 22 | — | — | B-1 | 0.15 | C-8 | 0.15 | 0/10 | 2.0 | 39 | 24 |
| Example 23 | B-1 | 0.15 | C-1 | 0.10 | C-2 | 0.10 | 0/10 | 6.5 | 38 | 25 |

TABLE 1-continued

| | | | | | | | | | | |
|---|---|---|---|---|---|---|---|---|---|---|
| Example 24 | B-3 | 0.15 | C-1 | 0.10 | C-2 | 0.10 | 0/10 | 1.5 | 36 | 23 |
| Example 25 | B-1 | 0.15 | C-1 | 0.10 | C-3 | 0.10 | 0/10 | 6.5 | 37 | 24 |
| Example 26 | B-1 | 0.15 | C-1 | 0.10 | C-4 | 0.10 | 0/10 | 6.5 | 38 | 23 |
| Example 27 | B-1 | 0.15 | C-5 | 0.10 | C-6 | 0.10 | 0/10 | 2.0 | 38 | 25 |
| Example 28 | B-1 | 0.15 | C-5 | 0.10 | C-7 | 0.10 | 0/10 | 2.0 | 37 | 24 |
| Example 29 | B-1 | 0.15 | C-8 | 0.10 | C-9 | 0.10 | 0/10 | 1.5 | 39 | 26 |
| Example 30 | B-1 | 0.15 | C-8 | 0.10 | C-10 | 0.10 | 0/10 | 1.5 | 37 | 25 |
| Example 31 | — | — | — | — | B-1 | 0.25 | 0/10 | 9.5 | 38 | 27 |
| Example 32 | — | — | — | — | B-1 | 0.25 | 0/10 | 9.5 | 36 | 28 |
| Example 33 | — | — | — | — | B-1 | 0.25 | 0/10 | 9.5 | 46 | 36 |
| Example 34 | — | — | — | — | B-1 | 0.25 | 0/10 | 9.5 | 59 | 41 |
| Comparative Example 1 | — | — | — | — | — | — | 0/10 | 180 | — | — |
| Comparative Example 2 | — | — | — | — | B-1 | 1.00 | 0/10 | 2.5 | — | — |
| Comparative Example 3 | — | — | — | — | B-1 | 0.25 | 0/10 | 7.5 | 2 | 16 |
| Comparative Example 4 | — | — | — | — | B-1 | 0.25 | 0/10 | 7.5 | 29 | 11 |
| Comparative Example 5 | — | — | — | — | B-1 | 0.25 | 0/10 | 7.5 | 28 | 9 |
| Comparative Example 6 | — | — | — | — | B-5 | 0.25 | 0/10 | 7.5 | 5 | 0 |
| Comparative Example 7 | — | — | B-1 | 0.15 | B-4 | 0.10 | 0/10 | 10 | 31 | 15 |
| Comparative Example 8 | — | — | B-1 | 0.15 | C-1 | 0.15 | 0/10 | 7.5 | 33 | 17 |
| Comparative Example 9 | — | — | B-5 | 0.15 | C-1 | 0.15 | 0/10 | 6.5 | 6 | 0 |
| Comparative Example 10 | B-1 | 0.15 | C-1 | 0.10 | C-2 | 0.10 | 0/10 | 6.5 | 32 | 15 |
| Comparative Example 11 | B-5 | 0.15 | C-1 | 0.10 | C-2 | 0.10 | 0/10 | 5.5 | 5 | 0 |

As is clear from Table 1, the single-layer tube of Comparative Example 1 that does not have a layer comprising the semi-aromatic polyamide composition defined in the present invention demonstrated inferior prevention of chemical permeation, and the single-layer tube of Comparative Example 2 that does not have a layer comprising the aliphatic polyamide composition defined in the present invention demonstrated inferior low-temperature impact resistance. The multi-layer tubes of Comparative Examples 3 to 5, 7, 8 and 10, which have a layer comprising an aliphatic polyamide composition for which the product of the terminal amino group concentration of the aliphatic polyamide and the total concentration of the carboxyl group and acid anhydride group of the elastomer polymer is outside the range defined in the present invention, demonstrated inferior interlayer adhesion durability. The multi-layer tubes of Comparative Examples 6, 9 and 11, which have a layer comprising a semi-aromatic polyamide composition other than that defined in the present invention, demonstrated inferior interlayer adhesion.

On the other hand, the multi-layer tubes of Examples 1 to 34 defined in the present invention clearly demonstrated favorable properties with respect to low-temperature impact resistance, prevention of chemical permeation, interlayer adhesion and interlayer adhesion durability.

The invention claimed is:

1. A multi-layer tube comprising at least two layers having an (a) layer containing an aliphatic polyamide composition (A) and a (b) layer containing a semi-aromatic polyamide composition (B); wherein, the aliphatic polyamide composition (A) contains 70% by weight to 95% by weight of an aliphatic polyamide (A1) and 5% by weight to 30% by weight of an elastomer polymer (A2) containing an unsaturated compound having a carboxyl group and/or acid anhydride group, wherein the aliphatic polyamide (A1) is such that [A1]>[B1]+10 when the concentration of the terminal amino group of the aliphatic polyamide (A1) per g of the aliphatic polyamide (A1) is defined as [A1] (µeq/g) and the concentration of the terminal carboxyl group per g of the aliphatic polyamide (A1) is defined as [B1] (µeq/g), the aliphatic polyamide composition (A) is such that [X]×[Y] is 470.3 (µeq/g)$^2$ to 1150.9 (µeq/g)$^2$ when the concentration of the terminal amino group of the aliphatic polyamide (A1) per g of the aliphatic polyamide composition (A) is defined as [X] (µeq/g) and [X] is 30.4 µeq/g to 76.7 µeq/g, and the total concentration of the carboxyl group and acid anhydride group of the elastomer polymer (A2) per g of the aliphatic polyamide composition (A) is defined as [Y] (µeq/g) and [Y] is 15.0 µeq/g to 20.0 µeq/g, the semi-aromatic polyamide composition (B) contains a semi-aromatic polyamide (B1), and the semi-aromatic polyamide (B1) comprises a diamine unit containing 60 mol % or more of a 1,9-nonanediamine unit and/or 2-methyl-1,8-octanediamine unit based on all diamine units, and a dicarboxylic acid unit containing 60 mol % or more of a terephthalic acid unit and/or naphthalenedicarboxylic acid unit based on all dicarboxylic acid units, and the (a) layer and the (b) layer are directly contacted with each other, the layer (a) is arranged as the outermost layer, and the layer (b) is arranged to the inside of the layer (a).

2. The multi-layer tube according to claim 1, wherein the aliphatic polyamide (A1) is at least one type of homopolymer selected from the group consisting of polycaproamide (Polyamide 6), polyundecaneamide (Polyamide 11), polydodecaneamide (Polyamide 12), polyhexamethylene adipamide (Polyamide 66), polyhexamethylene decamide (Polyamide 610), polyhexamethylene dodecamide (Polyamide 612), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212), and/or copolymers using a plurality of types of raw materials that form these.

3. The multi-layer tube according to claim 1, wherein
the aliphatic polyamide (A1) is an aliphatic polyamide mixture composed of at least two types of aliphatic polyamides having different terminal group concentrations,
the aliphatic polyamide mixture is such that [A1]>[B1]+10 when the concentration of the terminal amino group of the aliphatic polyamide mixture per g of the aliphatic polyamide mixture is defined as [A1] (μeq/g) and the concentration of the terminal carboxyl group per g of the aliphatic polyamide mixture is defined as [B1] (μeq/g),
an aliphatic polyamide (A11), which is one component of the aliphatic polyamide mixture, is at least one type of homopolymer selected from the group consisting of polyundecaneamide (Polyamide 11), polydodecaneamide (Polyamide 12), polynonamethylene decamide (Polyamide 910), polynonamethylene dodecamide (Polyamide 912), polydecamethylene decamide (Polyamide 1010), polydecamethylene dodecamide (Polyamide 1012) and polydodecamethylene dodecamide (Polyamide 1212), and/or copolymers using a plurality of types of raw materials that form these homopolymers, and
an aliphatic polyamide (A12), which is the remaining component of the aliphatic polyamide mixture, is such that [A12]>[B12]+40 when the concentration of the terminal amino group of the aliphatic polyamide (A12) per g of the aliphatic polyamide (A12) is defined as [A12] (μeq/g) and the concentration of the terminal carboxyl group of the aliphatic polyamide (A12) per g of the aliphatic polyamide (A12) is defined as [B12] (μeq/g), and the aliphatic polyamide (A12) is at least one type of homopolymer selected from the group consisting of polycaproamide (Polyamide 6), polyundecaneamide (Polyamide 11), polydodecaneamide (Polyamide 12), polyhexamethylene adipamide (Polyamide 66), polyhexamethylene decamide (Polyamide 610), polyhexamethylene dodecamide (Polyamide 612), polydecamethylene decamide (Polyamide 1010), polydecamethylene dodecamide (Polyamide 1012) and polydodecamethylene dodecamide (Polyamide 1212), and/or copolymers using a plurality of types of raw materials that form these homopolymers.

4. The multi-layer tube according to claim 1, wherein the semi-aromatic polyamide composition (B) contains an elastomer polymer containing an unsaturated compound having a carboxyl group and/or acid anhydride group.

5. The multi-layer tube according to claim 1, wherein the semi-aromatic polyamide composition (B) is an electrically conductive semi-aromatic polyamide composition (B) imparted with electrical conductivity.

6. The multi-layer tube according to claim 1, wherein the (b) layer containing the semi-aromatic polyamide composition (B) is arranged as the innermost layer.

7. The multi-layer tube according to claim 1, wherein an electrically conductive layer comprising a thermoplastic resin composition containing an electrically conductive filler is arranged as the innermost layer of the multi-layer tube.

8. The multi-layer tube according to claim 1, which is produced by co-extrusion molding.

9. The multi-layer tube according to claim 1, which is used as a fuel tube.

10. The multi-layer tube according to claim 2, wherein the semi-aromatic polyamide composition (B) contains an elastomer polymer containing an unsaturated compound having a carboxyl group and/or acid anhydride group.

11. The multi-layer tube according to claim 3, wherein the semi-aromatic polyamide composition (B) contains an elastomer polymer containing an unsaturated compound having a carboxyl group and/or acid anhydride group.

12. The multi-layer tube according to claim 2, wherein the semi-aromatic polyamide composition (B) is an electrically conductive semi-aromatic polyamide composition (B) imparted with electrical conductivity.

13. The multi-layer tube according to claim 3, wherein the semi-aromatic polyamide composition (B) is an electrically conductive semi-aromatic polyamide composition (B) imparted with electrical conductivity.

14. A multi-layer tube comprising (a) a layer containing an aliphatic polyamide composition (A), (b) a layer containing a semi-aromatic polyamide composition (B), and (c) a layer containing a fluorine-containing polymer (C) in which a functional group having reactivity with an amino group is introduced into the molecular chain, wherein
the aliphatic polyamide composition (A) contains 70% by weight to 95% by weight of an aliphatic polyamide (A1) and 5% by weight to 30% by weight of an elastomer polymer (A2) containing an unsaturated compound having a carboxyl group and/or acid anhydride group, wherein the aliphatic polyamide (A1) is such that [A1]>[B1]+10 when the concentration of the terminal amino group of the aliphatic polyamide (A1) per g of the aliphatic polyamide (A1) is defined as [A1] (μeq/g) and the concentration of the terminal carboxyl group per g of the aliphatic polyamide (A1) is defined as [B1] (μeq/g),
the aliphatic polyamide composition (A) is such that $[X] \times [Y]$ is 470.3 $(\mu eq/g)^2$ to 1150.9 $(\mu eq/g)^2$ when the concentration of the terminal amino group of the aliphatic polyamide (A1) per g of the aliphatic polyamide composition (A) is defined as [X] (μeq/g) and [X] is 30.4 (μeq/g) to 76.7 (μeq/g), and the total concentration of the carboxyl group and acid anhydride group of the elastomer polymer (A2) per g of the aliphatic polyamide composition (A) is defined as [Y] (μeq/g) and Y is 15.0 (μeq/g) to 20.0 (μeq/g),
the semi-aromatic polyamide composition (B) contains a semi-aromatic polyamide (B1), and the semi-aromatic polyamide (B1) comprises a diamine unit containing 60 mol % or more of a 1,9-nonanediamine unit and/or 2-methyl-1,8-octanediamine unit based on all diamine units, and a dicarboxylic acid unit containing 60 mol % or more of a terephthalic acid unit and/or naphthalenedicarboxylic acid unit based on all dicarboxylic acid units, and
the (a) layer and the (b) layer are directly contacted with each other, the layer (a) is arranged as the outermost layer, and the layer (b) is arranged to the inside of the layer (a).

15. The multi-layer tube according to claim 14, wherein the fluorine-containing polymer (C) is an electrically conductive fluorine-containing polymer (C) imparted with electrical conductivity.

16. The multi-layer tube according to claim 14, wherein the (c) layer is arranged to the inside of the (b) layer.

* * * * *